(12) United States Patent
Bevirt et al.

(10) Patent No.: US 12,351,324 B2
(45) Date of Patent: *Jul. 8, 2025

(54) FAULT-TOLERANT VTOL AIRCRAFT WITH REDUNDANT CONTROL SURFACES AND ACTUATORS

(71) Applicant: Joby Aero, Inc., Santa Cruz, CA (US)

(72) Inventors: JoeBen Bevirt, Santa Cruz, CA (US); Alex Stoll, Santa Cruz, CA (US); Martin van der Geest, Santa Cruz, CA (US); Scott MacAfee, Santa Cruz, CA (US); Jason Ryan, Santa Cruz, CA (US)

(73) Assignee: Joby Aero, Inc., Santa Cruz, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/667,566

(22) Filed: May 17, 2024

(65) Prior Publication Data

US 2024/0300660 A1  Sep. 12, 2024

Related U.S. Application Data

(63) Continuation of application No. 17/379,464, filed on Jul. 19, 2021, now Pat. No. 12,006,048, which is a
(Continued)

(51) Int. Cl.
*B64D 27/24* (2024.01)
*B60L 58/22* (2019.01)
*B64C 29/00* (2006.01)

(52) U.S. Cl.
CPC ............ *B64D 27/24* (2013.01); *B60L 58/22* (2019.02); *B60L 2200/10* (2013.01); *B64C 29/0033* (2013.01); *B64D 2221/00* (2013.01)

(58) Field of Classification Search
CPC .......................... B64C 27/24; B64D 2221/00
See application file for complete search history.

(56) References Cited

U.S. PATENT DOCUMENTS

| | | | |
|---|---|---|---|
| 1,386,713 | A | 8/1921 | Leinweber et al. |
| 1,496,723 | A | 6/1924 | Albert |
| | | (Continued) | |

FOREIGN PATENT DOCUMENTS

| | | |
|---|---|---|
| CN | 103363993 B | 4/2016 |
| CN | 106143926 | 11/2016 |
| | (Continued) | |

OTHER PUBLICATIONS

U.S. Appl. No. 16/428,794, now U.S. Pat. No. 11,827,347, filed May 31, 2019, ELectric Power System Architecture and Fault Tolerant VTOL Aircraft Using Same.
(Continued)

*Primary Examiner* — Christopher P Ellis
(74) *Attorney, Agent, or Firm* — SCHWEGMAN LUNDBERG & WOESSNER, P.A.

(57) ABSTRACT

A vertical takeoff and landing aircraft includes a starboard wing, a port wing, first and second tilt rotors coupled to the port and starboard wings respectively, and first and second batteries. A pair of control surfaces are arranged on a first side of the mid-sagittal plane of the aircraft, the pair comprising a first and a second control surface. A first flight actuator is electrically connected to the first battery and a second flight actuator is electrically connected to the second battery. The first and second flight actuators are mechanically connected to the first and second control surfaces respectively.

20 Claims, 34 Drawing Sheets

Related U.S. Application Data continuation-in-part of application No. 16/428,794, filed on May 31, 2019, now Pat. No. 11,827,347.

(60) Provisional application No. 62/678,275, filed on May 31, 2018, provisional application No. 63/135,387, filed on Jan. 8, 2021, provisional application No. 63/118,504, filed on Nov. 25, 2020.

(56) References Cited

U.S. PATENT DOCUMENTS

| | | |
|---|---|---|
| 1,634,167 A | 6/1927 | Wilson |
| 1,794,202 A | 2/1931 | Pickard |
| D171,509 S | 2/1954 | Lightborn et al. |
| 2,868,476 A | 1/1959 | Schlieben |
| 2,969,935 A | 1/1961 | Price |
| 2,981,339 A | 4/1961 | Kaplan |
| 3,002,712 A | 10/1961 | Beckwith |
| 3,035,789 A | 5/1962 | Young |
| 3,059,876 A | 10/1962 | Platt |
| 3,081,964 A | 3/1963 | Quenzler |
| 3,082,977 A | 3/1963 | Melvin |
| 3,089,666 A | 5/1963 | Quenzler |
| 3,136,499 A | 6/1964 | Kessler |
| 3,141,633 A | 7/1964 | Mackay |
| 3,159,361 A | 12/1964 | Weiland |
| 3,181,810 A | 5/1965 | Olson |
| 3,231,221 A | 1/1966 | Platt |
| 3,259,343 A | 7/1966 | Roppel |
| 3,350,035 A | 10/1967 | Schlieben |
| 3,360,217 A | 12/1967 | Trotter |
| 3,404,852 A | 10/1968 | Sambell et al. |
| 3,592,412 A | 7/1971 | Glatfelter |
| 3,618,875 A | 11/1971 | Kappus |
| 3,693,910 A | 9/1972 | Aldi |
| 3,795,372 A | 3/1974 | Feldman |
| 3,834,654 A | 9/1974 | Miranda |
| 3,856,238 A | 12/1974 | Malvestuto |
| 4,022,405 A | 5/1977 | Peterson |
| 4,047,840 A | 9/1977 | Ravenhall et al. |
| 4,053,125 A | 10/1977 | Ratony |
| 4,146,199 A | 3/1979 | Wenzel |
| 4,356,546 A | 10/1982 | Whiteside et al. |
| 4,387,866 A | 6/1983 | Eickmann |
| 4,434,389 A | 2/1984 | Langley et al. |
| 4,519,746 A | 5/1985 | Wainauski et al. |
| 4,784,351 A | 11/1988 | Eickmann |
| 4,799,629 A | 1/1989 | Mori |
| 4,914,657 A | 4/1990 | Walter et al. |
| 4,925,131 A | 5/1990 | Eickmann |
| 4,979,698 A | 12/1990 | Lederman |
| 4,982,914 A | 1/1991 | Eickmann |
| 5,031,858 A | 7/1991 | Schellhase et al. |
| 5,082,079 A | 1/1992 | Lissaman et al. |
| 5,085,315 A | 2/1992 | Sambell |
| 5,141,176 A | 8/1992 | Kress et al. |
| 5,184,304 A | 2/1993 | Huddle |
| 5,374,010 A | 12/1994 | Stone et al. |
| 5,405,105 A | 4/1995 | Kress |
| 5,419,514 A | 5/1995 | Duncan |
| 5,515,282 A | 5/1996 | Jackson |
| 5,715,162 A | 2/1998 | Daigle |
| 5,806,805 A | 9/1998 | Elbert et al. |
| 5,823,468 A | 10/1998 | Bothe |
| 5,839,691 A | 11/1998 | Lariviere |
| 5,842,667 A | 12/1998 | Jones |
| 5,868,351 A | 2/1999 | Stamps et al. |
| 6,098,923 A | 8/2000 | Peters, Jr. |
| 6,254,032 B1 | 7/2001 | Bucher |
| 6,260,796 B1 | 7/2001 | Klingensmith |
| 6,276,633 B1 | 8/2001 | Balayn et al. |
| 6,286,783 B1 | 9/2001 | Kuenkler |
| 6,293,491 B1 | 9/2001 | Wobben |
| 6,343,127 B1 | 1/2002 | Billoud |
| 6,402,088 B1 | 6/2002 | Syrovy et al. |
| 6,474,604 B1 | 11/2002 | Carlow |
| 6,561,455 B2 | 5/2003 | Capanna |
| 6,625,033 B1 | 9/2003 | Steinman |
| 6,655,631 B2 | 12/2003 | Austen-Brown |
| 6,719,244 B1 | 4/2004 | Gress |
| 6,745,977 B1 | 6/2004 | Long et al. |
| 6,883,748 B2 | 4/2005 | Yoeli |
| 6,892,980 B2 | 5/2005 | Kawai |
| 7,048,505 B2 | 5/2006 | Segota et al. |
| 7,118,066 B2 | 10/2006 | Allen |
| 7,147,182 B1 | 12/2006 | Flanigan |
| 7,159,817 B2 | 1/2007 | Vandermey et al. |
| 7,193,391 B2 | 3/2007 | Moore |
| 7,219,013 B1 | 5/2007 | Young et al. |
| 7,263,630 B2 | 8/2007 | Sailer |
| 7,310,573 B2 | 12/2007 | Stickling |
| 7,318,565 B2 | 1/2008 | Page |
| 7,376,088 B2 | 5/2008 | Gambardella et al. |
| 7,802,754 B2 | 9/2010 | Karem |
| 7,822,516 B2 | 10/2010 | Yanaka et al. |
| 7,857,253 B2 | 12/2010 | Yoeli |
| 7,857,254 B2 | 12/2010 | Parks |
| 7,874,513 B1 | 1/2011 | Smith |
| 8,016,226 B1 | 9/2011 | Wood |
| 8,056,866 B2 | 11/2011 | De |
| 8,152,096 B2 | 4/2012 | Smith |
| 8,275,494 B1 | 9/2012 | Roth |
| 8,376,264 B1 | 2/2013 | Hong et al. |
| 8,469,306 B2 | 6/2013 | Kuhn, Jr. |
| 8,485,464 B2 | 7/2013 | Kroo |
| 8,527,233 B2 | 9/2013 | Mcintyre |
| 8,602,347 B2 | 12/2013 | Isaac et al. |
| 8,708,273 B2 | 4/2014 | Oliver |
| 8,733,690 B2 | 5/2014 | Bevirt et al. |
| 8,800,912 B2 | 8/2014 | Oliver |
| 8,849,479 B2 | 9/2014 | Walter |
| 8,998,125 B2 | 4/2015 | Hollimon et al. |
| 9,102,401 B2 | 8/2015 | Collins et al. |
| 9,128,109 B1 | 9/2015 | Oneill |
| 9,415,870 B1 | 8/2016 | Beckman et al. |
| 9,435,661 B2 | 9/2016 | Brenner et al. |
| 9,694,911 B2 | 7/2017 | Bevirt et al. |
| 9,786,961 B2 | 10/2017 | Dyer et al. |
| 9,944,386 B1 | 4/2018 | Reichert et al. |
| 9,963,228 B2 | 5/2018 | Mccullough et al. |
| 10,046,855 B2 | 8/2018 | Bevirt et al. |
| 10,144,503 B1 | 12/2018 | Vander Lind et al. |
| 10,183,746 B2 | 1/2019 | Mccullough et al. |
| 10,246,184 B2 | 4/2019 | Ragland |
| 10,287,011 B2 | 5/2019 | Wolff et al. |
| 10,364,036 B2 | 7/2019 | Tighe et al. |
| 10,497,996 B1 | 12/2019 | Muniz et al. |
| 10,513,334 B2 | 12/2019 | Groninga et al. |
| 11,065,979 B1 | 7/2021 | Demont et al. |
| 11,312,256 B2 | 4/2022 | Vinson et al. |
| 11,588,431 B2 | 2/2023 | Bachmann et al. |
| 11,715,948 B2 | 8/2023 | Perkinson et al. |
| 11,724,600 B2 | 8/2023 | Culpin et al. |
| 11,827,347 B2 | 11/2023 | Bevirt et al. |
| 2003/0038213 A1 | 2/2003 | Yoeli |
| 2003/0062443 A1 | 4/2003 | Wagner et al. |
| 2003/0080242 A1 | 5/2003 | Kawai |
| 2003/0085319 A1 | 5/2003 | Wagner et al. |
| 2003/0094537 A1 | 5/2003 | Austen-Brown |
| 2003/0106959 A1 | 6/2003 | Fukuyama |
| 2004/0069901 A1 | 4/2004 | Nunnally |
| 2004/0126241 A1 | 7/2004 | Zha et al. |
| 2004/0195460 A1 | 10/2004 | Sailer |
| 2004/0245376 A1 | 12/2004 | Muren |
| 2005/0178879 A1 | 8/2005 | Mao |
| 2005/0230524 A1 | 10/2005 | Ishiba |
| 2006/0016930 A1 | 1/2006 | Pak |
| 2006/0097103 A1 | 5/2006 | Atmur |
| 2006/0113426 A1 | 6/2006 | Yoeli |
| 2006/0151666 A1 | 7/2006 | Vandermey et al. |
| 2006/0226281 A1 | 10/2006 | Walton |
| 2007/0221779 A1 | 9/2007 | Ikeda |
| 2008/0048065 A1 | 2/2008 | Kuntz |
| 2008/0205416 A1 | 8/2008 | Dechiara |

(56) References Cited

U.S. PATENT DOCUMENTS

| | | |
|---|---|---|
| 2008/0283673 A1 | 11/2008 | Yoeli |
| 2009/0008499 A1 | 1/2009 | Shaw |
| 2009/0084907 A1 | 4/2009 | Yoeli |
| 2009/0140102 A1 | 6/2009 | Yoeli |
| 2009/0145998 A1 | 6/2009 | Salyer |
| 2009/0159757 A1 | 6/2009 | Yoeli |
| 2009/0200431 A1 | 8/2009 | Konings et al. |
| 2009/0224095 A1 | 9/2009 | Cox et al. |
| 2009/0283629 A1 | 11/2009 | Kroetsch et al. |
| 2010/0072325 A1 | 3/2010 | Sambell |
| 2010/0076625 A1 | 3/2010 | Yoeli |
| 2010/0100260 A1 | 4/2010 | Mcintyre et al. |
| 2010/0193644 A1 | 8/2010 | Karem |
| 2010/0264257 A1 | 10/2010 | Brunken, Jr. |
| 2010/0270419 A1 | 10/2010 | Yoeli |
| 2010/0270435 A1 | 10/2010 | Karem |
| 2011/0001020 A1 | 1/2011 | Forgac |
| 2011/0042508 A1 | 2/2011 | Bevirt |
| 2011/0042509 A1 | 2/2011 | Bevirt et al. |
| 2011/0042510 A1 | 2/2011 | Bevirt et al. |
| 2011/0049306 A1 | 3/2011 | Yoeli |
| 2011/0049307 A1 | 3/2011 | Yoeli |
| 2011/0139923 A1 | 6/2011 | Papanikolopoulos et al. |
| 2011/0139939 A1 | 6/2011 | Martin et al. |
| 2011/0147533 A1 | 6/2011 | Goossen et al. |
| 2011/0315809 A1 | 12/2011 | Oliver |
| 2012/0025016 A1 | 2/2012 | Methven et al. |
| 2012/0061526 A1 | 3/2012 | Brunken, Jr. |
| 2012/0091257 A1 | 4/2012 | Wolff et al. |
| 2012/0234968 A1 | 9/2012 | Smith |
| 2013/0132548 A1 | 5/2013 | Cabos |
| 2013/0201316 A1 | 8/2013 | Binder et al. |
| 2013/0204544 A1 | 8/2013 | Thomas |
| 2014/0299708 A1 | 10/2014 | Green et al. |
| 2014/0333127 A1 | 11/2014 | Edwards |
| 2014/0358333 A1 | 12/2014 | White et al. |
| 2015/0012154 A1 | 1/2015 | Senkel et al. |
| 2015/0056058 A1 | 2/2015 | Grissom et al. |
| 2015/0102659 A1 | 4/2015 | Liffring et al. |
| 2015/0136897 A1 | 5/2015 | Seibel et al. |
| 2015/0147181 A1 | 5/2015 | Henze et al. |
| 2015/0232178 A1 | 8/2015 | Reiter |
| 2015/0266571 A1 | 9/2015 | Bevirt et al. |
| 2015/0360794 A1 | 12/2015 | Certain et al. |
| 2016/0031555 A1 | 2/2016 | Bevirt et al. |
| 2016/0031556 A1 | 2/2016 | Bevirt et al. |
| 2016/0083073 A1 | 3/2016 | Beckman |
| 2016/0094143 A1 | 3/2016 | Huang et al. |
| 2016/0112151 A1 | 4/2016 | Chedas et al. |
| 2016/0144957 A1 | 5/2016 | Claridge et al. |
| 2016/0236790 A1 | 8/2016 | Knapp et al. |
| 2016/0272312 A1 | 9/2016 | Mallard |
| 2016/0294882 A1 | 10/2016 | Michaels |
| 2016/0304194 A1 | 10/2016 | Bevirt et al. |
| 2016/0304214 A1 | 10/2016 | Himmelmann et al. |
| 2016/0340051 A1 | 11/2016 | Edwards et al. |
| 2017/0057650 A1 | 3/2017 | Walter-Robinson |
| 2017/0066531 A1 | 3/2017 | Mcadoo |
| 2017/0101176 A1 | 4/2017 | Alber et al. |
| 2017/0104385 A1 | 4/2017 | Salamon et al. |
| 2017/0253344 A1 | 9/2017 | Wangemann et al. |
| 2017/0274983 A1 | 9/2017 | Beckman et al. |
| 2017/0277152 A1 | 9/2017 | Liu et al. |
| 2017/0297431 A1 | 10/2017 | Epstein et al. |
| 2017/0313433 A1 | 11/2017 | Ozaki |
| 2017/0331323 A1 | 11/2017 | Ehrmantraut |
| 2018/0002016 A1 | 1/2018 | Mccullough et al. |
| 2018/0105279 A1 | 4/2018 | Tighe et al. |
| 2018/0118356 A1 | 5/2018 | Armstrong et al. |
| 2018/0141428 A1 | 5/2018 | Toyota et al. |
| 2018/0237148 A1 | 8/2018 | Hehn et al. |
| 2018/0244370 A1 | 8/2018 | Lombard |
| 2018/0251226 A1 | 9/2018 | Fenny et al. |
| 2018/0290736 A1 | 10/2018 | Mikic et al. |
| 2018/0319491 A1 | 11/2018 | Kearney-Fischer |
| 2018/0354615 A1 | 12/2018 | Groninga et al. |
| 2018/0356439 A1 | 12/2018 | Luo et al. |
| 2019/0013679 A1 | 1/2019 | Radun |
| 2019/0044451 A1 | 2/2019 | Huang et al. |
| 2019/0071174 A1 | 3/2019 | Burigo et al. |
| 2019/0210740 A1 | 7/2019 | Luo |
| 2019/0214161 A1 | 7/2019 | Chen et al. |
| 2019/0288533 A1 | 9/2019 | Stroppiana |
| 2019/0393809 A1 | 12/2019 | Lacaux et al. |
| 2020/0010187 A1 | 1/2020 | Bevirt et al. |
| 2020/0290742 A1 | 9/2020 | Kumar et al. |
| 2021/0309392 A1 | 10/2021 | Wiegman |
| 2021/0339881 A1 | 11/2021 | Bevirt et al. |
| 2022/0009643 A1 | 1/2022 | Datta et al. |
| 2024/0025543 A1 | 1/2024 | Bevirt et al. |

FOREIGN PATENT DOCUMENTS

| | | |
|---|---|---|
| CN | 106672223 | 5/2017 |
| CN | 107042884 A | 8/2017 |
| CN | 109421926 | 3/2019 |
| CN | 112368208 A | 2/2021 |
| DE | 102012104783 A1 | 12/2013 |
| EP | 0945841 A1 | 9/1999 |
| EP | 2669195 | 12/2013 |
| EP | 3090951 A1 | 11/2016 |
| EP | 3184425 A1 | 6/2017 |
| EP | 3366583 A1 | 8/2018 |
| EP | 3802322 A1 | 4/2021 |
| GB | 1271102 A | 4/1972 |
| GB | 201714174 | 10/2017 |
| JP | 2016088111 | 5/2016 |
| JP | 2017527059 A | 9/2017 |
| JP | 2017184504 A | 10/2017 |
| JP | 2021525673 A | 9/2021 |
| JP | 2023134581 A | 9/2023 |
| KR | 20210006972 A | 1/2021 |
| RU | 2724940 C2 | 6/2020 |
| WO | WO-03074924 A1 | 9/2003 |
| WO | WO-03086857 A1 | 10/2003 |
| WO | WO-2017009037 A1 | 1/2017 |
| WO | WO-2017108634 A1 | 6/2017 |
| WO | 2017158417 | 9/2017 |
| WO | WO-2017200609 A1 | 11/2017 |
| WO | WO-2018084261 A1 | 5/2018 |
| WO | WO-2019001203 A1 | 1/2019 |
| WO | WO-2019056053 A1 | 3/2019 |
| WO | WO-2019232472 A1 | 12/2019 |
| WO | 2022115132 | 6/2022 |

OTHER PUBLICATIONS

U.S. Appl. No. 18/481,561, filed Oct. 5, 2023, Electric Power System Architecture and Fault Tolerant VTOL Aircraft Using Same.

U.S. Appl. No. 17/379,464, now U.S. Pat. No. 12,006,048, filed Jul. 19, 2021, Electric Power System Architecture and Fault Tolerant VTOL Aircraft Using Same.

"Japanese Application Serial No. 2020-566669, Response Filed May 20, 2022 to Notification of Reasons for Refusal mailed Feb. 22, 2022", W English Claims, 12 pgs.

"Korean Application Serial No. 10-2020-7035350, Notice of Near Conclusion of Trial Examination mailed Mar. 19, 2024", With English Machine Translation, 3 pgs.

"Chinese Application Serial No. 201980036597.6, Office Action mailed Mar. 28, 2024", W English Translation, 14 pgs.

"Korean Application Serial No. 10-2023-7045172, Notice of Preliminary Rejection mailed Apr. 25, 2024", w English Translation, 14 pgs.

"Korean Application Serial No. 10-2023-7045172, Response filed Jul. 22, 2024 to Notice of Preliminary Rejection mailed Apr. 25, 2024", With English claims, 34 pgs.

"Japanese Application Serial No. 2023-111506, Response filed Aug. 6, 2024 to Notification of Reasons for Rejection mailed May 7, 2024", w current English claims, 15 pgs.

"U.S. Appl. No. 18/481,561, Response filed Aug. 20, 2024 to Non Final Office Action mailed Jun. 18, 2024", 8 pgs.

(56) References Cited

OTHER PUBLICATIONS

"U.S. Appl. No. 18/481,561, Notice of Allowance mailed Sep. 3, 2024", 5 pgs.
"U.S. Appl. No. 18/481,561, Supplemental Notice of Allowability mailed Sep. 20, 2024", 2 pgs.
"U.S. Appl. No. 16/428,794, 312 Amendment filed Oct. 5, 2023", 4 pgs.
"U.S. Appl. No. 16/428,794, Examiner Interview Summary mailed Apr. 26, 2022", 2 pgs.
"U.S. Appl. No. 16/428,794, Non Final Office Action mailed Jan. 21, 2022", 5 pgs.
"U.S. Appl. No. 16/428,794, Non Final Office Action mailed Feb. 9, 2023", 7 pgs.
"U.S. Appl. No. 16/428,794, Notice of Allowance mailed Jul. 6, 2023", 5 pgs.
"U.S. Appl. No. 16/428,794, PTO Response to Rule 312 Communication mailed Oct. 24, 2023", 2 pgs.
"U.S. Appl. No. 16/428,794, Response filed Jun. 9, 2023 to Non Final Office Action mailed Feb. 9, 2023", 12 pgs.
"U.S. Appl. No. 16/428,794, Response filed Nov. 1, 2022 to Restriction Requirement mailed Sep. 2, 2022", 6 pgs.
"U.S. Appl. No. 16/428,794, Restriction Requirement mailed Sep. 2, 2022", 5 pgs.
"U.S. Appl. No. 16/428,794, Supplemental Notice of Allowability mailed Jul. 20, 2023", 2 pgs.
"U.S. Appl. No. 17/379,464, Non Final Office Action mailed Oct. 13, 2023", 6 pgs.
"U.S. Appl. No. 17/379,464, Notice of Allowance mailed Feb. 7, 2024", 5 pgs.
"U.S. Appl. No. 17/379,464, Response filed Jan. 4, 2024 to Non-Final Office Action mailed Oct. 13, 2023", 8 pgs.
"Curtiss-Wright X-19", [Online]. Retrieved from the Internet: <https://en.wikipedia.org/wiki/Curtiss-Wright_X-19>, 4 pgs.
"European Application Serial No. 15765064.9, Extended European Search Report mailed Oct. 16, 2017", 10 pgs.
"European Application Serial No. 19812608.8, Communication Pursuant to Article 94(3) EPC mailed Jun. 28, 2023", 4 pgs.
"European Application Serial No. 19812608.8, Communication pursuant to Rule 114(2) EPC mailed Feb. 17, 2023", 6 pgs.
"European Application Serial No. 19812608.8, Extended European Search Report mailed Jan. 21, 2022", 7 pgs.
"European Application Serial No. 19812608.8, Response Filed Oct. 6, 2023 to Communication Pursuant to Article 94(3) EPC mailed Jun. 28, 2023", 9 pgs.
"European Application Serial No. 19812608.8, Response Filed Jul. 28, 2022 to Extended European Search Report mailed Jan. 21, 2022", 7 pgs.
"European Application Serial No. 19812608.8, Response to Communication pursuant to Rules 161(1) and 162 EPC filed Feb. 24, 2021", 10 pgs.
"Inclined Flat Plate", Aerodynamics of the airplane, (Feb. 13, 2016), 9 pgs.
"International Application Serial No. PCT/US2010/046500, International Search Report mailed Apr. 13, 2011", 2 pgs.
"International Application Serial No. PCT/US2010/046500, Written Opinion mailed Apr. 13, 2011", 8 pgs.
"International Application Serial No. PCT/US2015/021344, International Search Report mailed Sep. 11, 2015", 4 pgs.
"International Application Serial No. PCT/US2015/021344, Written Opinion mailed Sep. 11, 2015", 7 pgs.
"International Application Serial No. PCT/US2015/021350, International Search Report mailed Sep. 15, 2015", 5 pgs.
"International Application Serial No. PCT/US2015/021350, Written Opinion mailed Sep. 15, 2015", 13 pgs.
"International Application Serial No. PCT/US2017/059809, International Search Report mailed Jul. 31, 2018", 2 pgs.
"International Application Serial No. PCT/US2017/059809, Written Opinion mailed Jul. 31, 2018", 5 pgs.
"International Application Serial No. PCT/US2019/031863, International Search Report mailed Jul. 24, 2019", 2 pgs.
"International Application Serial No. PCT/US2019/031863, Written Opinion mailed Jul. 24, 2019", 8 pgs.
"International Application Serial No. PCT/US2019/035044, International Preliminary Report on Patentability mailed Dec. 10, 2020", 8 pgs.
"International Application Serial No. PCT/US2019/035044, International Search Report mailed Sep. 20, 2019", 2 pgs.
"International Application Serial No. PCT/US2019/035044, Written Opinion mailed Sep. 20, 2019", 6 pgs.
"International Application Serial No. PCT/US2019/035236, International Search Report mailed Aug. 20, 2019", 2 pgs.
"International Application Serial No. PCT/US2019/035236, Written Opinion mailed Aug. 20, 2019", 5 pgs.
"International Application Serial No. PCT/US2019/039247, International Search Report mailed Sep. 13, 2019", 2 pgs.
"International Application Serial No. PCT/US2019/039247, Written Opinion mailed Sep. 13, 2019", 6 pgs.
"International Application Serial No. PCT/US2019/051565, International Search Report mailed Dec. 4, 2019", 2 pgs.
"International Application Serial No. PCT/US2019/051565, Written Opinion mailed Dec. 4, 2019", 4 pgs.
"International Application Serial No. PCT/US2021/042205, International Preliminary Report on Patentability mailed Jun. 8, 2023", 8 pgs.
"International Application Serial No. PCT/US2021/042205, International Search Report mailed Mar. 21, 2022", 6 pgs.
"International Application Serial No. PCT/US2021/042205, Written Opinion mailed Mar. 21, 2022", 6 pgs.
"Japanese Application Serial No. 2020-566669, Examiners Decision of Final Refusal mailed Mar. 7, 2023", W/English Translation, 8 pgs.
"Japanese Application Serial No. 2020-566669, Notification of Reasons for Refusal mailed Feb. 22, 2022", w/English Translation, 9 pgs.
"Japanese Application Serial No. 2020-566669, Notification of Reasons for Refusal mailed Sep. 27, 2022", With English translation, 11 pgs.
"Japanese Application Serial No. 2020-566669, Response Filed Dec. 23, 2022 to Notification of Reasons for Refusal mailed Sep. 27, 2022", W/ English Claims, 10 pgs.
"Japanese Application Serial No. 2023-111506, Voluntary Amendment filed Jul. 27, 2023", W/ English Claims, 46 pgs.
"Korean Application Serial No. 10-2020-7035350, Final Office Action mailed Apr. 25, 2023", w/ English Translation, 6 pgs.
"Korean Application Serial No. 10-2020-7035350, Notice of Preliminary Rejection mailed Mar. 27, 2022", w/ English translation, 8 pgs.
"Korean Application Serial No. 10-2020-7035350, Notice of Preliminary Rejection mailed Oct. 27, 2022", With English translation, 9 pgs.
"Korean Application Serial No. 10-2020-7035350, Response Filed Dec. 26, 2022 to Notice of Preliminary Rejection mailed Oct. 27, 2022", W/ English Claims, 17 pgs.
"Korean Application Serial No. 10-2020-7035350, Response Filed May 25, 2022 to Notice of Preliminary Rejection mailed Mar. 27, 2022", With English machine translation, 29 pgs.
"Korean Application Serial No. 10-2020-7035350, Response Filed Jul. 11, 2023 to Final Office Action mailed Apr. 25, 2023", W/ English Claims, 24 pgs.
"Scalable Convergent Electric Propulsion Technology and Operations Research (SCEPTOR)", Critical Design Review, Day 1 Package, (Nov. 15, 2016), 36 pgs.
Carson, Biz, "First Look: Uber Unveils New Design For Uber Eats Delivery Drone", [Online]. Retrieved from the Internet: <https:www.forbes.com/sites/bizcarson/2019/10/28/first-look-uber-unveils-new-design-for -uber -eats-delivery-drone/#1703f8d778f2>.
Denham Jr., James W, et al., "Converging on a Precision Hover Control Strategy for the F35B Stovl Aircraft", AIAA Guidance, Navigation and Control Conference and Exhibit 18, Honolulu, Hawaii, Abstract only, (Aug. 21, 2006).
Dubois, Arthur, et al., "Design of an Electric Propulsion System for SCEPTOR", Aviation Technology, Integration, and Operations Conference, Washington, DC, (Jun. 13, 2016), 1-30.

(56) References Cited

OTHER PUBLICATIONS

Falco, Gianluca, et al., "Loose and Tight GNSS/INS Integrations: Comparison of Performance Assessed in Real Urban Scenarios", Sensors (Basel) 17(2): 225, [Online] Retrieved from the internet: <https://www.ncbi.nlm.nih.gov/pmc/articles/PMC5335985/>, (Feb. 2017).

Gold, Phillip J, et al., "Design and Pilot Evaluation of the RAH-66 Comanche Selectable Control Modes", <https://ntrs.nasa.gov/search.jsp?>, N94-13322, (Jul. 1, 1993), 419-431.

Heliciel, Mecaftux, "Airfolds Blade Profile", Propeller & Wing, [Online] Retrieved from the internet: <https://www.heliciel.com/en/aerodynamique-hydrodynamique/profils%20aile%20profil%20pale.htm>, (accessed online Jun. 2, 2021), 7 pages.

Kim, Tae, "Reduction of Tonal Propeller Noise by Means of Uneven Blade Spacing", University of California, Irvine, Thesis, (2016).

NASA, "SCEPTOR Critical Design Review", Day 1 Package, [Online] Retrieved from the Internet: <https://www.nasa.gov/aeroresearch/X-57/technical/index.html>, (Nov. 15, 2016), 1-242.

Saraf, A, et al., "Study of Flow Separation on Airfoil with Bump", International Journal of Applied, Engineering Research ISSN 09773-4562, vol. 13, No. 16, (2018), 128686-12872.

Sullivan, Brenda M, et al., "A Subject Test of Modulated Blade Spacing for Helicopter Main Rotors", Presented at the American Helicopter Society 58th Annual Forum, Montreal, Canada, (Jun. 11-13, 2002).

Yeh, Y C (BOB), "Triple-Triple Redundant 777 Primary Flight Computer", IEEE, (1996), 293- 307.

Young, Larry, "Conceptual Design Aspects of Three General Sub-Classes of Multi-Rotor Configurations: Distributed, Modular, and Hetergenerous", NASA Ames Research Center, Moffett Field Computer Science, (2015).

FAULT-TOLERANT VTOL AIRCRAFT WITH REDUNDANT CONTROL SURFACES AND ACTUATORS

CROSS REFERENCE TO RELATED APPLICATIONS

This application is a continuation of U.S. application Ser. No. 17/379,464, filed on 19 Jul. 2021, which is a continuation in part of U.S. application Ser. No. 16/428,794, filed on 31 May 2019, which claims priority to U.S. Provisional Patent Application No. 62/678,275, filed 31 May 2018, each of which is incorporated herein in its entirety by this reference.

U.S. application Ser. No. 17/379,464, filed on 19 Jul. 2021, also claims benefit to U.S. Provisional Patent Application No. 63/135,387, filed 8 Jan. 2021, and U.S. Provisional Patent Application No. 63/118,504, filed 25 Nov. 2020, each of which is incorporated herein in its entirety by this reference.

TECHNICAL FIELD

This invention relates to electric powered flight.

DESCRIPTION OF THE PREFERRED EMBODIMENTS

Figure 1A:
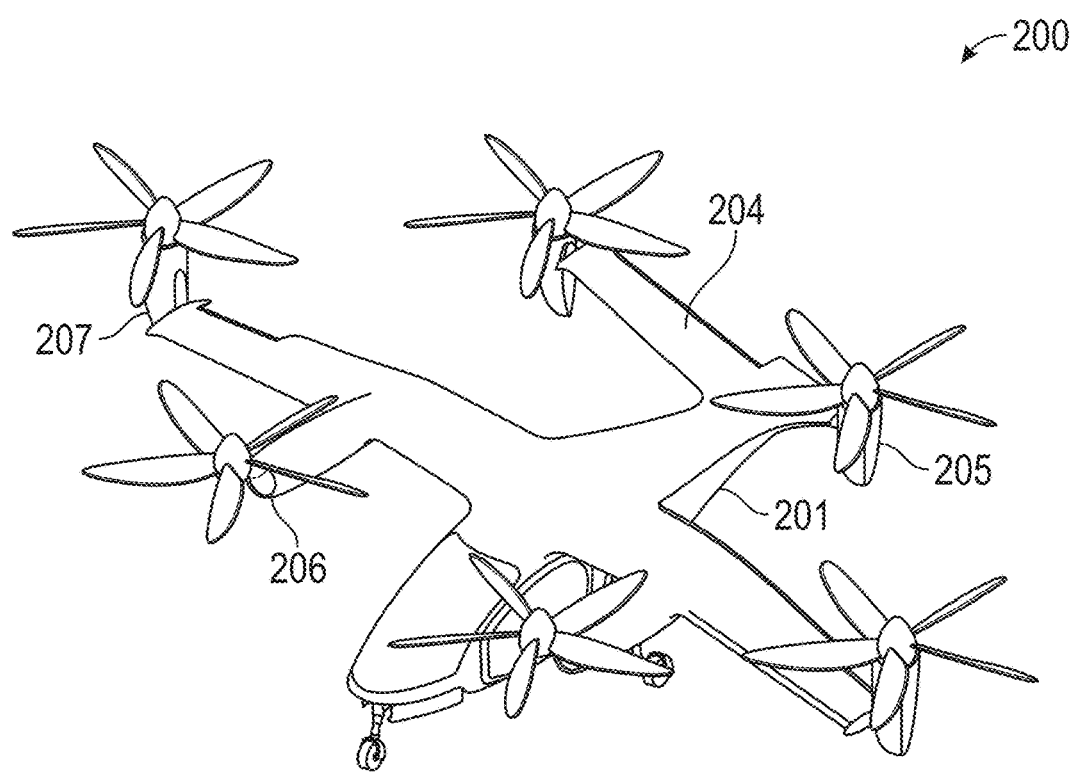
FIG. 1A to FIG. 1D are of a VTOL aircraft in a hover configuration according to some embodiments of the present invention.
Figure 1B:
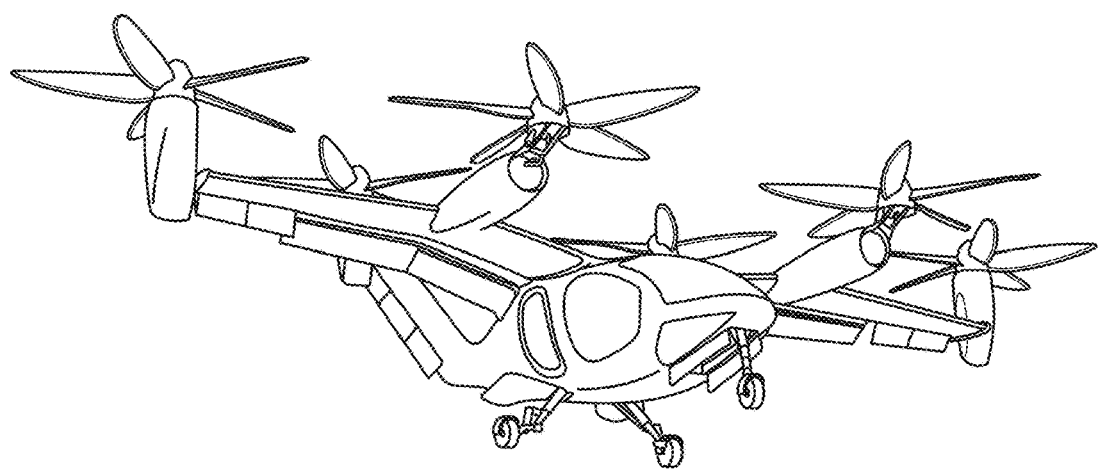
Figure 1C:
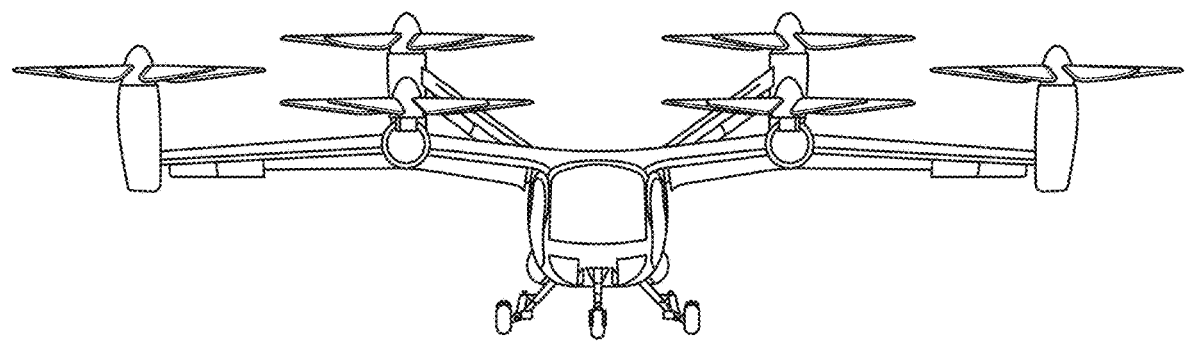

The following description of the preferred embodiments of the invention is not intended to limit the invention to these preferred embodiments, but rather to enable any person skilled in the art to make and use this invention.

1. Overview

The power system can include: a plurality of batteries, a plurality of electric propulsion units, flight computers, and power connections. The propulsion assemblies can include a motor, a propeller, and one or more inverters. The power system can optionally include a plurality of flight actuators. However, the power system can include any other suitable set of components. The power system functions to provide aircraft propulsion and/or aircraft control authority during flight.

In variants, the power system can be implemented in conjunction with the redundant power architecture and/or tiltrotor aircraft power configuration described in U.S. application Ser. No. 16/428,794, filed 31 May 2019, which is incorporated in its entirety by this reference.

In variants, the power system can be implemented in conjunction with the electric aircraft configuration described in U.S. application Ser. No. 16/409,653, filed 10 May 2019, which is incorporated in its entirety by this reference.

Motors of the power system can be integrated into a propeller and/or include an integrated inverter, or can be otherwise suitably connected to an inverter and/or propeller. Accordingly, the term "electric propulsion unit" (EPU) as referenced herein can refer to any suitable motor, propeller, and/or inverter system.

The term "rotor" as utilized herein, in relation to portions of the power system 100 or otherwise, can refer to a rotor, a propeller, and/or any other suitable rotary aerodynamic actuator. While a rotor can refer to a rotary aerodynamic actuator that makes use of an articulated or semi-rigid hub (e.g., wherein the connection of the blades to the hub can be articulated, flexible, rigid, and/or otherwise connected), and a propeller can refer to a rotary aerodynamic actuator that makes use of a rigid hub (e.g., wherein the connection of the blades to the hub can be articulated, flexible, rigid, and/or otherwise connected), no such distinction is explicit or implied when used herein, and the usage of "rotor" can refer to either configuration, and any other suitable configuration of articulated or rigid blades, and/or any other suitable configuration of blade connections to a central member or hub. Likewise, the usage of "propeller" can refer to either configuration, and any other suitable configuration of articulated or rigid blades, and/or any other suitable configuration of blade connections to a central member or hub. Accordingly, the tiltrotor aircraft can be referred to as a tilt-propeller aircraft, a tilt-prop aircraft, and/or otherwise suitably referred to or described.

The term "battery" as utilized herein, in relation to portions of the power architecture or otherwise, can refer to any suitable set or combination of battery cells, battery bricks, battery modules, battery packs, and/or other suitable portions of an energy system. Battery "cell" preferably refers to a unitary battery element, but can be otherwise defined. A battery "brick" can refer to a plurality of battery cells connected in parallel (e.g., with a common bus), but can be otherwise defined. A battery module can refer to a plurality of battery cells and/or bricks arranged in series, but can be otherwise defined. A battery pack can refer to any suitable combination or permutation of battery cells, bricks, and/or modules arranged in series and/or parallel; a set of battery cells, bricks, and/or modules enclosed within a common housing; and/or otherwise defined. One or more battery packs can collectively form an energy system, which can supply power to various aircraft endpoints.

2. Benefits

Variations of the technology can afford several benefits and/or advantages.

First, variations of the power system can prevent marginal power and/or actuator failures from escalating into a serious failure (e.g., loss of aircraft command and control ability, etc.) by utilizing multiple layers of power and/or actuator redundancy. In variations, the power system can retain control authority with a loss of any two batteries, motors (and propellers mounted thereto), flight control surfaces (or flight actuators driving said flight control surfaces), power connections, and/or any other suitable components. In an example, the power system can rely upon dual-wound motors to provide an additional degree of power redundancy (e.g., for control surface actuators) and/or electrical redundancy. In such variants, the power system can reliably enhance power system architecture for electric motors adapted for use in an aircraft. Individual batteries may be used to power a subset of two or more motors in power systems with six or more motors, for example. Each motor may be powered by two or more subsets of batteries, allowing accommodation for motor failure. Each motor may have two or more sets of windings, with each winding powered by a different battery. With a failed winding, failed battery, or failed motor in a forward flight or a vertical take-off and landing mode, power routing may be automatically altered to continue proper attitude control, and to provide sufficient thrust. With a failed motor a second motor offset from the failed motor may be powered down to facilitate attitude control.

However, the power system can include any other suitable redundancies.

Second, variations of the power system can make the aircraft robust to unplanned external damage sources (e.g., electrical or mechanical inputs). For example, components of the power system can be arranged such that flight-critical hardware (e.g., flight computers, batteries, PoE switches, etc.) are physically separated from one another (while connected via the power architecture and/or data transfer network) outside of a predetermined radius (e.g., predetermined based on a predicted, estimated, and/or historical damage radius resulting from explosive component failure, decompression, fire damage, etc.).

Third, variations of the power system can provide continuous power availability by load balancing various batteries of the aircraft. In such variants, the flight computers can command different proportions of power to various motors, motor windings, and/or flight actuators within the power architecture to shift power/current draw to batteries with the greatest remaining charger (e.g., highest SOC). However, the power architecture can otherwise ensure continuous power availability on the aircraft.

However, variations of the technology can additionally or alternatively provide any other suitable benefits and/or advantages.

3. System

The power system 100 can include: a plurality of batteries, a plurality of electric propulsion units, flight computers, and power connections (e.g., forming a power distribution architecture). The electric propulsion units (EPUs) can include a motor, a propeller, and one or more inverters. The power system can optionally include a plurality of flight actuators. However, the power system can include any other suitable set of components. The power system functions to provide aircraft propulsion and/or aircraft control authority during flight.

The power system 100 can include a plurality of batteries which function to store electrochemical energy in a rechargeable manner. The system can include any suitable number of batteries (e.g., battery packs), such as 1, 2, 3, 4, 5, 6, more than 6, a range bounded by the aforementioned values, and/or any other suitable number of battery packs as a part of a complete energy system. Battery packs can be arranged and/or distributed about the aircraft in any suitable manner. Preferably, battery packs are arranged proximal to a vertical lateral plane of the aircraft, but can be otherwise suitably arranged. Battery packs can be arranged within wings (e.g., inside of an airfoil cavity), inside nacelles, and/or in any other suitable location on the aircraft. In a specific example, the system includes a first battery pack within an inboard portion of a left wing and a second battery pack within an inboard portion of a right wing. In a second specific example, the system includes a first battery pack within an inboard nacelle of a left wing and a second battery pack within an inboard nacelle of a right wing. In a third example, one or more battery packs include a plurality of battery modules. The battery pack can include or exclude the battery pack housing/enclosures (e.g., closeouts), can be assembled into the aircraft separately from the battery pack housing/enclosures, and/or can be otherwise suitably configured. The battery pack can include any suitable cells of any suitable type, chemistry, voltage, maximum C-rate, capacity, and/or other characteristics. Battery cells can be the same or different across various battery modules/packs, or within the same battery module/pack. Battery cell types (e.g., geometries) can include cylindrical, button, prismatic, pouch, and/or any other suitable cell geometries.

The electric propulsion units (EPUs) function to rotate an airfoil to generate thrust and/or aerodynamic lift, propelling the aircraft. The EPUs (hereinafter interchangeably referenced as "propulsion assemblies") can include a motor, a propeller, and one or more inverters. However, the EPUs can include any other suitably components. The aircraft preferably includes 6 EPUs, but can additionally or alternatively include 3 EPUs, 8 EPUs, and/or any other suitable number of EPUs. The EPUs are preferably distributed symmetrically about a sagittal midplane of the aircraft, and most preferably substantially equidistant from a center of gravity of the aircraft, but can be otherwise suitably implemented.

The motor functions to generate a torque about and/or rotate about a motor axis. In variants, the motor can be connected to a propeller of an aircraft and/or integrated into the hub of a propeller. The motor can be an in-runner motor, outrunner motor, and/or any other suitable type of motor. Preferably, the motor is a large diameter motor and/or a motor designed for high-torque, low-speed operation. The motor can include a diameter of: 100 mm, 200 mm, 250 mm, 300 mm, 320 mm, 350 mm, 380 mm, 400 mm, 420 mm, 450 mm, 500 mm, greater than 500 mm, any range bounded by the aforementioned values, and/or any other suitable diameter. However, the motor can have any other suitable dimensions. The motor can have any suitable power capabilities and/or requirements. Preferably, the motor is a 3-phase motor, and more preferably is a dual-wound 3-phase motor (e.g., two sets of redundant 3-phase windings). However, the motor can include any other suitable number of phases or be otherwise constructed. The motor can have a power threshold (e.g., peak power, maximum continuous power, nominal power, max power of individual set of windings of dual-wound motor, etc.) of: less than 80 KW, 80 KW, 120 KW, 150 KW, 200 kW, 220 kW, 230 kW, 240 kW, 250 KW, 300 kW, 450 KW, 460 kW, 480 KW, 500 KW, greater than 500 kW, any range bounded by the aforementioned values, and/or any other suitable power characteristics. Accordingly, the torque/speed characteristics of the motor can be designed/selected to correspond to the aerodynamic properties of the propeller (and/or aircraft). In a specific example, the motor can be operate the rotor at a top speed of: less than 100 RPM, 100 RPM, 300 RPM, 500 RPM, 800 RPM, 1000 RPM, 1200 RPM, 1300 RPM, 1500 RPM, 1800 RPM, 2000 RPM, 2200 RPM, 2500 RPM, 3000 RPM, 5000 RPM, greater than 5000 RPM, any range bounded by the aforementioned values, and/or any appropriate speed, and can operate with a maximum torque of: less than 10 N-m, 50 N-m, 100 N-m, 500 N-m, 800 N-m, 1000 N-m, 1200 N-m, 1500 N-m, 1800 N-m, 2000 N-m, 2200 N-m, 2500 N-m, 3000 N-m, 5000 N-m, greater than 5000 N-m, any range bounded by the aforementioned values, and/or any appropriate maximum torque. However, the motor can have any suitable torque/speed characteristics, and the propeller can likewise be operated in any suitable regime of the torque-speed curve of the motor.

In a first variant of the motor ('dual wound motor variant'), electrical bussing within the motor subdivides the field coils into a first and second set of windings (e.g., 2 sets of 3 phase windings) which can be separately powered and/or separately drive rotation of the motor. Preferably, adjacent field coils are in opposing sets of windings, however the field coils can be otherwise suitably distributed to enable independent and/or separate actuation via each set of windings. Accordingly, each set of windings can be powered by a separate inverter and/or can be powered by the same inverter. The dual wound variant can provide an additional layer of redundancy, since a single point of electrical failure (either within the motor and/or at the inverter) can compromise only a single set of windings. In variants, each set of windings and/or each inverter can be powered by a separate set of power sources (e.g., separate sets of battery packs), which can similarly allow the motor to continue operating even with the loss of one or more power sources. In a specific example, the bussing divides the full electromagnetic motor circuit into equal partial motors dividing stator and windings (e.g., like 'pie slices') which are controlled by two independent phase control schemes. The electrical bussing is preferably arranged on a rear portion of the motor and/or inboard portion of the motor, but can additionally or alternately be formed on the front side, radially inward of the stator body, and/or otherwise suitably configured. The electrical bussing can include a set of motor terminals (e.g., one terminal associated with each pole of the motor for each set of windings) which connect the motor to the inverter and a set of power connections connecting the field coil terminals. However, the motor can alternatively include only a single set of windings (e.g., one set of three phase windings), include more than two sets of windings, and/or be otherwise suitably configured.

However, the EPUs can include any other suitable motor.

The inverters function to supply conditioned power to the motor and/or control the rotation of the motor based on the commands from the flight computer(s). there is preferably one inverter associated with each set of motor windings of the motors. In a specific example, each EPU can include a first and second inverter respectively associated with the first and second sets of windings of a dual-wound motor. However, the EPU can include additional inverters, which can power a motor cooling pump, cooling fan, blade pitch mechanism, and/or tilt linkage of the propulsion assembly. The inverter can be integrated into the motor, mounted to an inboard portion of the motor, separate from the motor (e.g., arranged within a nacelle, remote, etc.) and connected to the motor within the power system. However, the EPUs can include any other suitable inverters.

The propellers function to generate aerodynamic lift when driven by the rotation of the motor about the motor axis, thereby propelling the aircraft. The propellers can be mounted to the motor in a fixed and/or pivotable manner (e.g., by a blade pitch mechanism), and are configured to rotate about the motor axis. However, the propulsion assemblies can include any suitable propellers.

The propulsion assemblies can optionally include a tilt mechanism which functions to pivot and/or translate the motor (and the propeller mounted thereto). In a specific example, the tilt mechanism can be configured to transform the motor and propeller between a forward configuration, wherein the motor/propeller axis is substantially parallel with the longitudinal/roll axis of the aircraft, and a hover configuration, wherein the motor/propeller axis is substantially parallel to the vertical/yaw axis of the aircraft (e.g., and/or a gravity vector). The tilt mechanism can connect to the rear/inboard portion of the motor (and/or an inverter mounted thereto) and mount the motor to the airframe of the aircraft. In a first example, the tilt mechanism can include the linkage and/or nacelle/boom pivot described in U.S. application Ser. No. 16/409,653, filed 10 May 2019, which is incorporated herein in its entirety by this reference. In a second example, the tilt mechanism can include the linkage described in U.S. application Ser. No. 14/660,838, filed 17 Mar. 2015, which is incorporated herein in its entirety by this reference.

However, the propulsion assembly can include any other suitable tilt mechanism, and/or exclude a tilt mechanism.

The propulsion assemblies can optionally include a blade pitching mechanism which functions to change an angle of attack of the blades of an aircraft propeller (e.g., relative to a disc plane). The blade pitching mechanism can allow independent articulation of each blade, collective articulation of the blade pitch (e.g., simultaneous), cyclic articulation of the blade pitch, and/or otherwise suitably allow articulation. The blade pitching mechanism can include a rotary plate mechanism (e.g., swashplate) and/or linkage which extends through an interior of the motor. In a specific example, the blade pitching mechanism extends through an interior of a motor bearing and/or is mounted at a radial position inward of the bearing. However, the blade pitching mechanism can extend through the motor (e.g., along the motor's rotational axis, through the motor center), extend around the motor, or be otherwise arranged. The blade pitching mechanism can connect to the tilt mechanism directly and/or indirectly (e.g., mounted to the inverter housing and/or stator of the motor).

However, the set of actuators can include any other suitable blade pitching mechanism, and/or exclude a blade pitching mechanism.

The flight computer functions to generate commands that can be transmitted to and interpreted by EPU inverters and/or flight actuators to control aircraft flight. In variations including a plurality of flight computers, each of the plurality of flight computers can be a substantially identical instance of the same computer architecture and components, but can additionally or alternatively be instances of distinct computer architectures and components (e.g., generalized processors manufactured by different manufacturers). The flight computers can include: CPUs, GPUs, TPUs, ASICs, microprocessors, and/or any other suitable set of processing systems. In variations, each of the flight computers performs substantially identical operations (e.g., processing of data, issuing of commands, etc.) in parallel, and is connected (e.g., via the distribution network) to the same set of flight components. In such variations, the output of each flight computer is provided to the EPUs and/or flight actuators by way of a data distribution network (e.g., as described in U.S. application Ser. No. 16/573,837, filed 17 Sep. 2019, which is incorporated herein in its entirety by this reference).

However, the power system can be used with any suitable propulsion assemblies.

The power connections function to distribute power between the batteries and the EPUs, and can additionally or alternatively function to provide power to a (e.g., low voltage) data transfer network and/or flight actuators. Power connections can be configured in any suitable architectures. Examples of power connection architectures are shown in FIG. 11A, FIG. 12, FIG. 13, and FIG. 14. However, the power system can include any suitable distribution of power connections between any suitable power sources (e.g., batteries) and power sinks (EPUs, flight actuators, flight computers, switches, etc.).

The power connections can group the batteries into battery sets, where batteries within a battery set are connected to each component within a component set (e.g., wherein components of the same type can be divided into component sets). Examples of component sets include: battery sets, flight actuator sets, EPU sets, and/or sets of other components. Component sets preferably do not overlap with other sets of the same component type, but can alternatively overlap with other sets of the same component type. Component sets connected to a given battery set are preferably connected to each other and/or are not connected to other component sets that are connected to other battery sets, but the component sets powered by a different battery sets can alternatively overlap. The power connections between the battery set and each component set can be: a shared wire, a shared bus, different connections (e.g., wires, busses, etc.) for each battery-component connection, and/or be otherwise configured.

Figure 12:
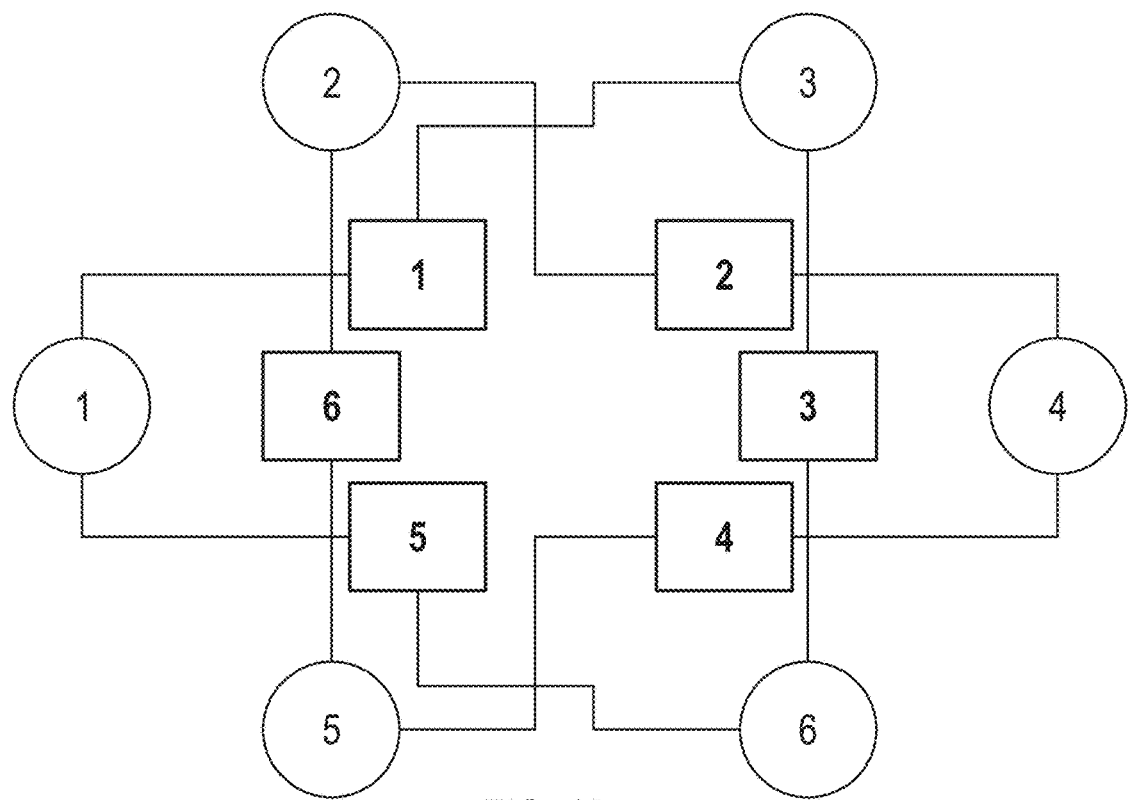
FIG. 12 is a layout of a flight power system with a hexagram architecture according to some embodiments of the present invention.
Figure 13:
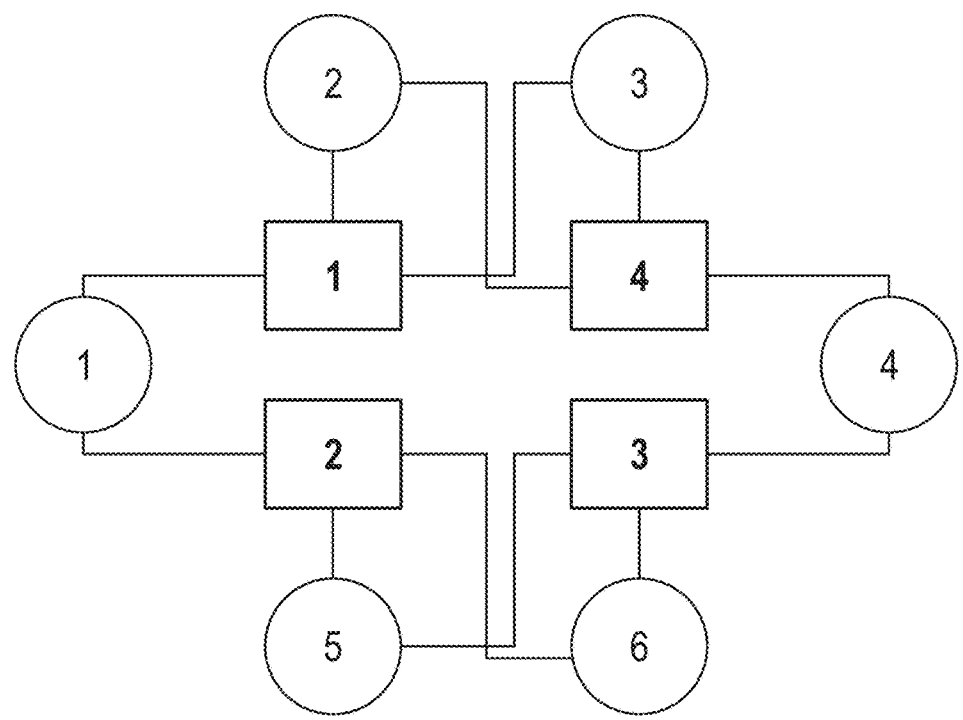
FIG. 13 is a layout of a flight power system with a star architecture according to some embodiments of the present invention.
Figure 14:
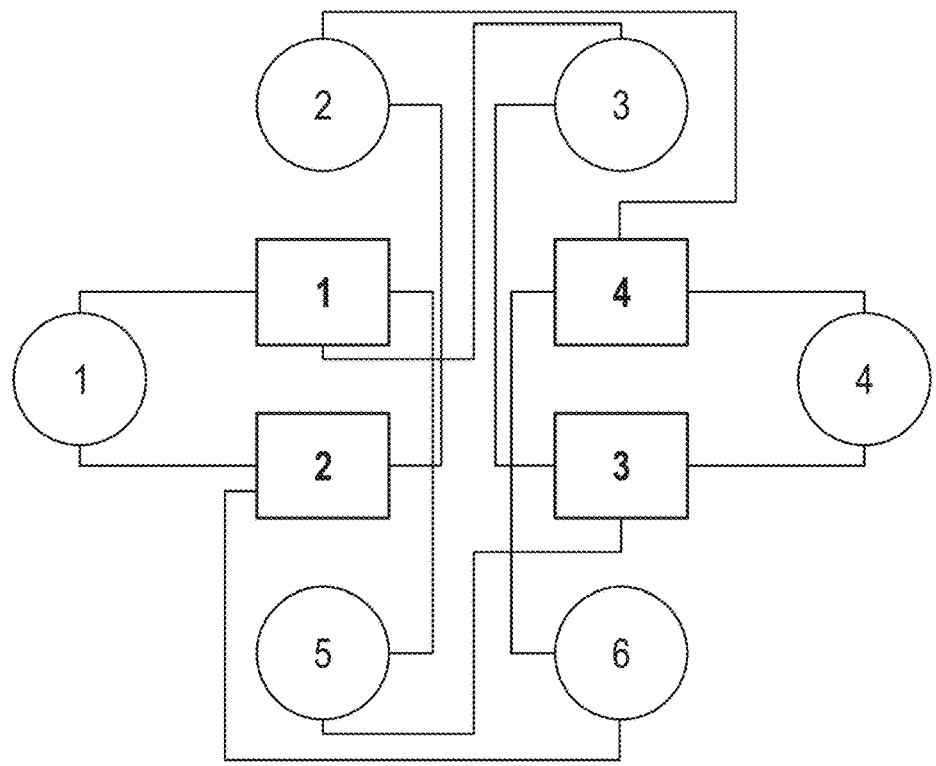
FIG. 14 is a layout of a flight power system with a mesh architecture according to some embodiments of the present invention.
Figure 16:
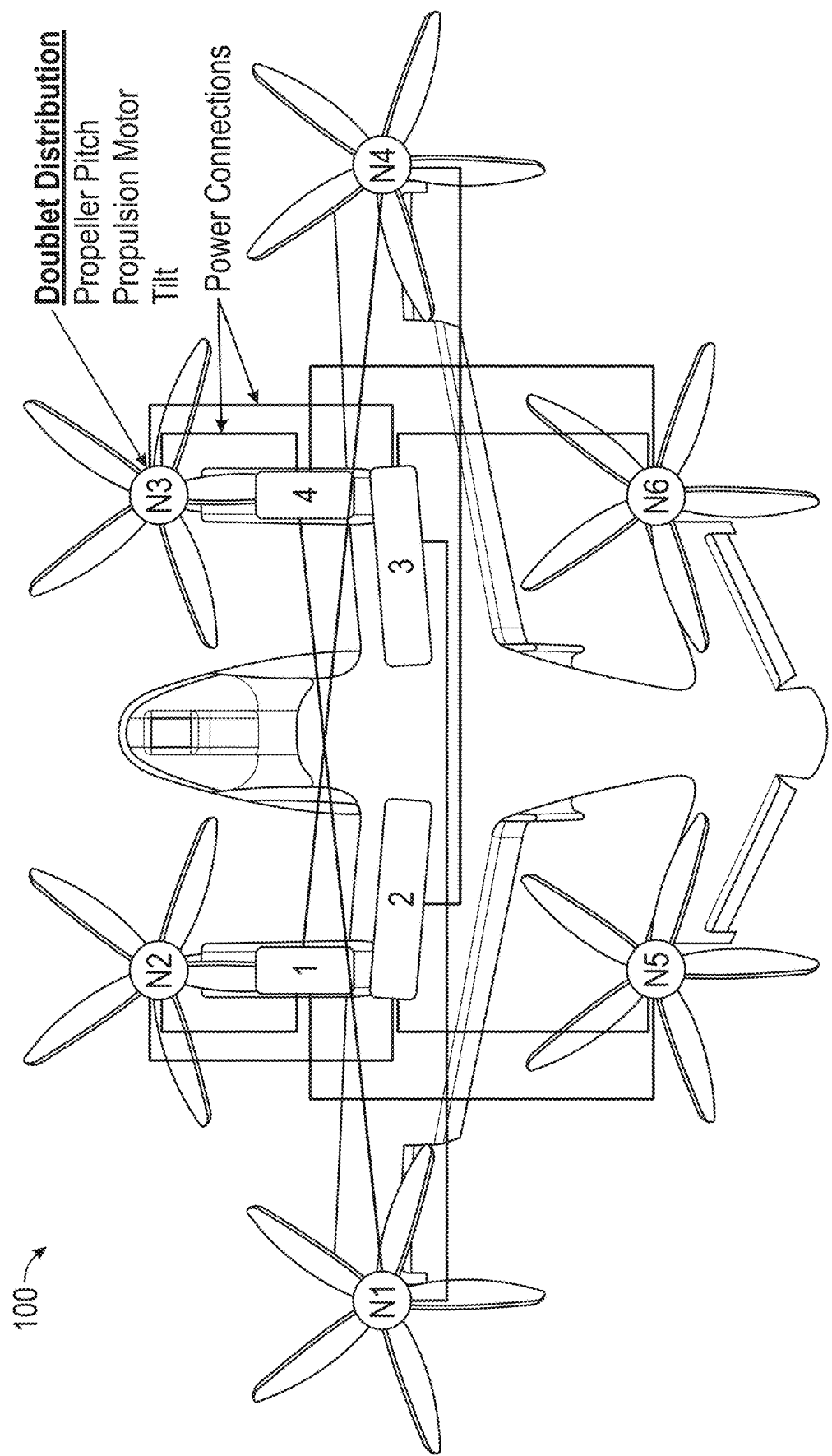
FIG. 16 is a schematic representation of a variant of a power system architecture.
Figure 23A:
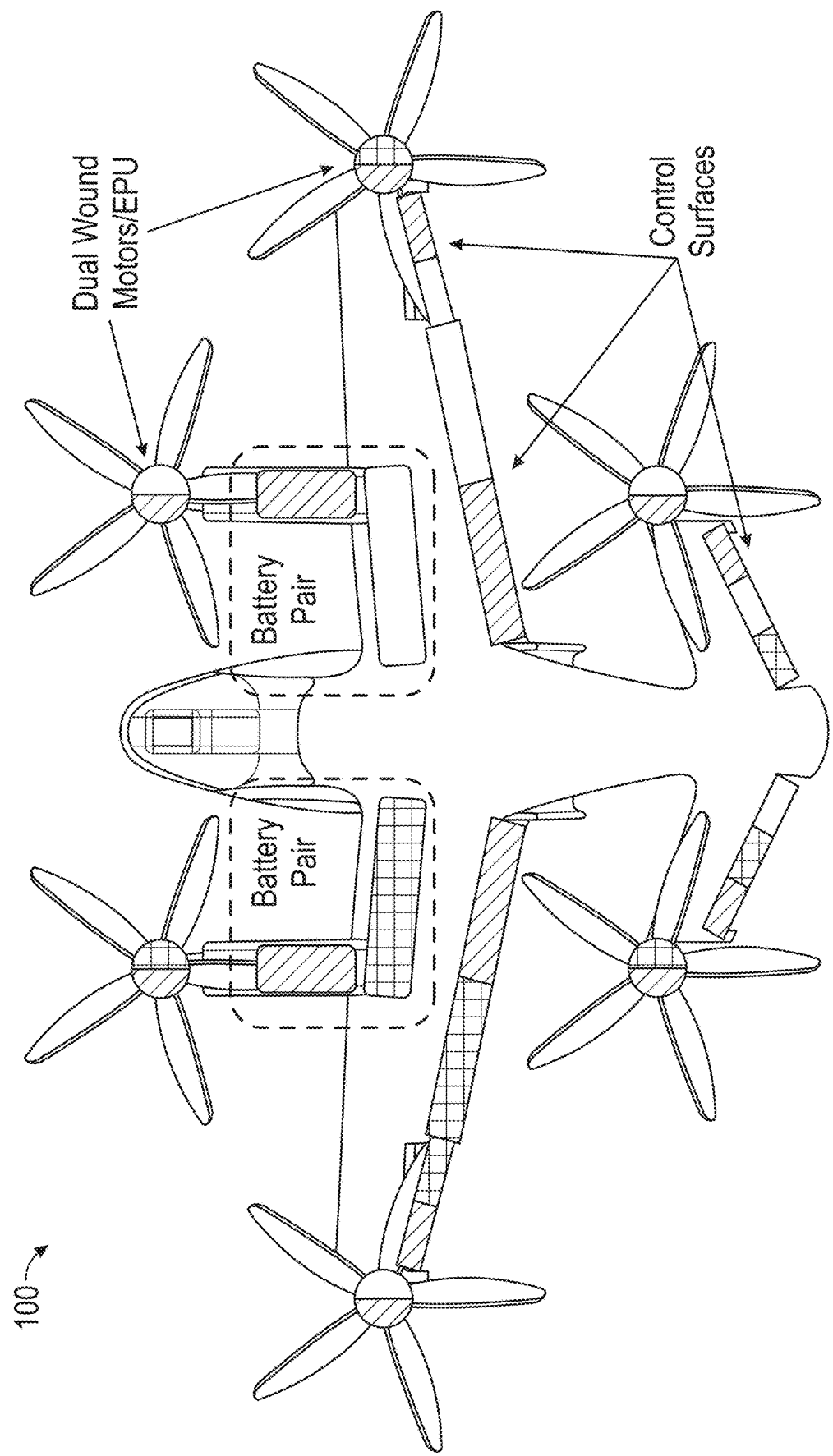
FIG. 23A to FIG. 23B schematic representations of a first and second variant of a power system architecture, respectively, illustrating powered relationships between batteries, electric propulsion units, and control surfaces.
Figure 23B:
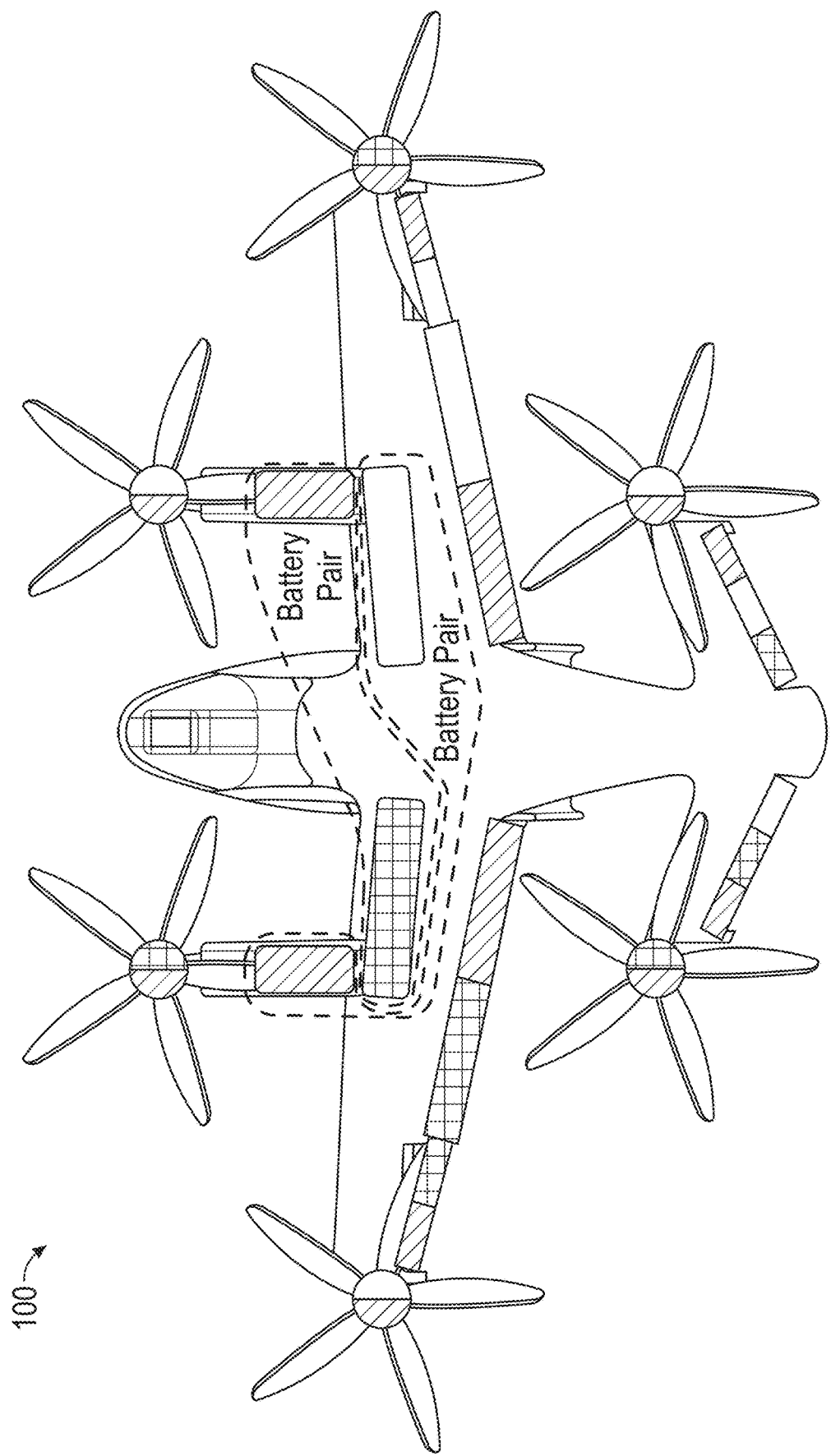

The power connections can group the batteries into various 'pairs', where paired batteries are connected to the respective windings of one or more dual wound motors and/or are connected to two different inverters of an EPU (associated in a pairwise manner with the dual windings of the motor within the EPU). Accordingly, each battery can be paired with exactly one other battery and/or can form a portion of exactly one battery pair (e.g., doublet variant, an example is shown in FIG. 16), can be paired with two batteries, can be paired with each battery, can be un-paired with one or more batteries, and/or can be otherwise suitable interconnected within the power system by the power connections. Paired batteries can be distributed on the same side (e.g., left pair, right pair, etc.; an example is shown in FIG. 23A) and/or different sides of the sagittal plane of the aircraft. Paired batteries can be respectively connected to both windings of single dual-wound motor (an example is shown in FIG. 12) and/or both windings of multiple dual-wound motors (an example is shown in FIG. 13, an example is shown in FIG. 14, with one or more motors connected to only one battery of the battery pair). In a specific example, for each dual wound motor having a first set of windings connected to the first battery of a battery pair, the second (remaining) windings are connected to the second (remaining) battery of the battery pair. Accordingly, batteries can be considered "unpaired" in the power architecture if the intersection of their respective sets of associated motors is null (e.g., no motors are connected to both batteries.).

Paired and/or unpaired batteries can be distributed about the aircraft based on: a threshold spatial offset (e.g., for impact survivability), fire vent paths, distance from passenger seats, electrically isolation (e.g., between switch sets and/or actuator sets, as described in U.S. application Ser. No. 16/428,794, filed 31 May 2019, which is incorporated in its entirety by this reference), and/or otherwise suitably distributed.

However, power connections can interconnect batteries with the EPUs and/or other components of the power system in any suitably manner.

However, the power system can include any other suitable components.

3. Redundantly Powered Aircraft

In some aspects, an aircraft may use bladed propellers powered by electric motors to provide thrust during take-off.

The propeller/motor units may be referred to as propulsion assemblies. In some aspects, the wings of the aircraft may rotate, with the leading edges facing upwards, such that the propellers provide vertical thrust for takeoff and landing. In some aspects, the motor driven propeller units on the wings may themselves rotate relative to a fixed wing, such that the propellers provide vertical thrust for take-off and landing. The rotation of the motor driven propeller units may allow for directional change of thrust by rotating both the propeller and the electric motor, thus not requiring any gimbaling, or other method, of torque drive around or through a rotating joint.

In some aspects, aircrafts according to embodiments of the present invention take off from the ground with vertical thrust from rotor assemblies that have deployed into a vertical configuration. As the aircraft begins to gain altitude, the rotor assemblies may begin to be tilted forward in order to begin forward acceleration. As the aircraft gains forward speed, airflow over the wings results in lift, such that the rotors become less important and then unnecessary for maintaining altitude using vertical thrust. Once the aircraft has reached sufficient forward speed, some or all of the blades used for providing vertical thrust during take-off may be stowed along their nacelles. In some aspects, all propulsion assemblies used for vertical take-off and landing are also used during forward flight. The nacelle supporting the propulsion assemblies may have recesses such that the blades may nest into the recesses, greatly reducing the drag of the disengaged rotor assemblies.

After take-off, the aircraft will begin a transition to forward flight by articulating the propellers from a vertical thrust orientation to a position which includes a horizontal thrust element. As the aircraft begins to move forward with speed, lift will be generated by the wings, thus requiring less vertical thrust from the rotors. As the propellers are articulated further towards the forward flight, horizontal thrust, configuration, the aircraft gains more speed.

In a first vertical configuration according to some embodiments of the present invention, as seen in a vertical take-off configuration in FIG. 1A through FIG. 1D, an aircraft 200 uses fixed wings 202, 203, which may be forward swept wings, with propulsion assemblies of the same or different types adapted for both vertical take-off and landing and for forward flight. In this configuration, the propulsion assemblies are positioned for vertical thrusting. The aircraft body 201 supports a left wing 202 and a right wing 203. Motor driven propulsion assemblies 206 along the wings may include electric motors and propellers which are adapted to articulate from a forward flight configuration to a vertical configuration using deployment mechanisms which may reside in the nacelle body, and which deploy the motor and propeller while all or most of the nacelle remains in place attached to the wing. In some aspects, the propeller blades may stow and nest into the nacelle body. The motor driven rotor assemblies 207 at the wing tips may deploy from a forward flight configuration to a vertical take-off and landing configuration along a pivot axis wherein the nacelle and the electric motor and propeller deploy in unison. Although illustrated with one mid-span propulsion assembly and one wingtip propulsion assembly per wing, in some aspects more mid-span propulsion assemblies may be present.

The aircraft body 201 extends rearward is also attached to raised rear stabilizers 204. The rear stabilizers have rear propulsion assemblies 205 attached thereto. The motor driven rotor assemblies 207 at the tips of the rear stabilizers may deploy from a forward flight configuration to a vertical take-off and landing configuration along a pivot axis wherein the nacelle and the electric motor and propeller deploy in unison.

Figure 1D:
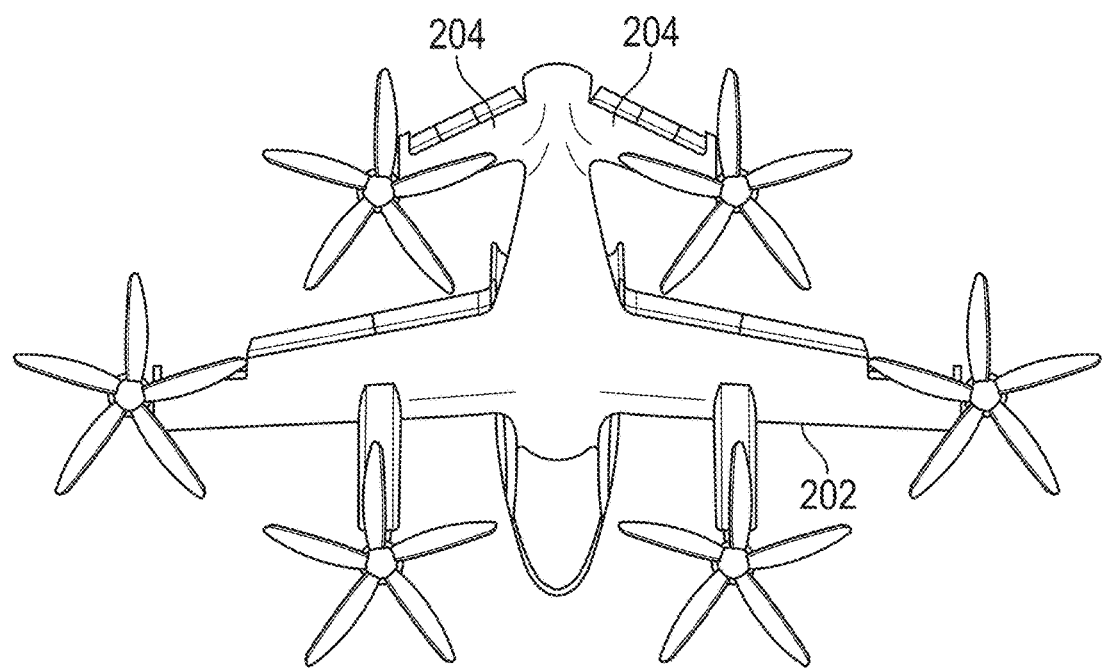
Figure 1E:
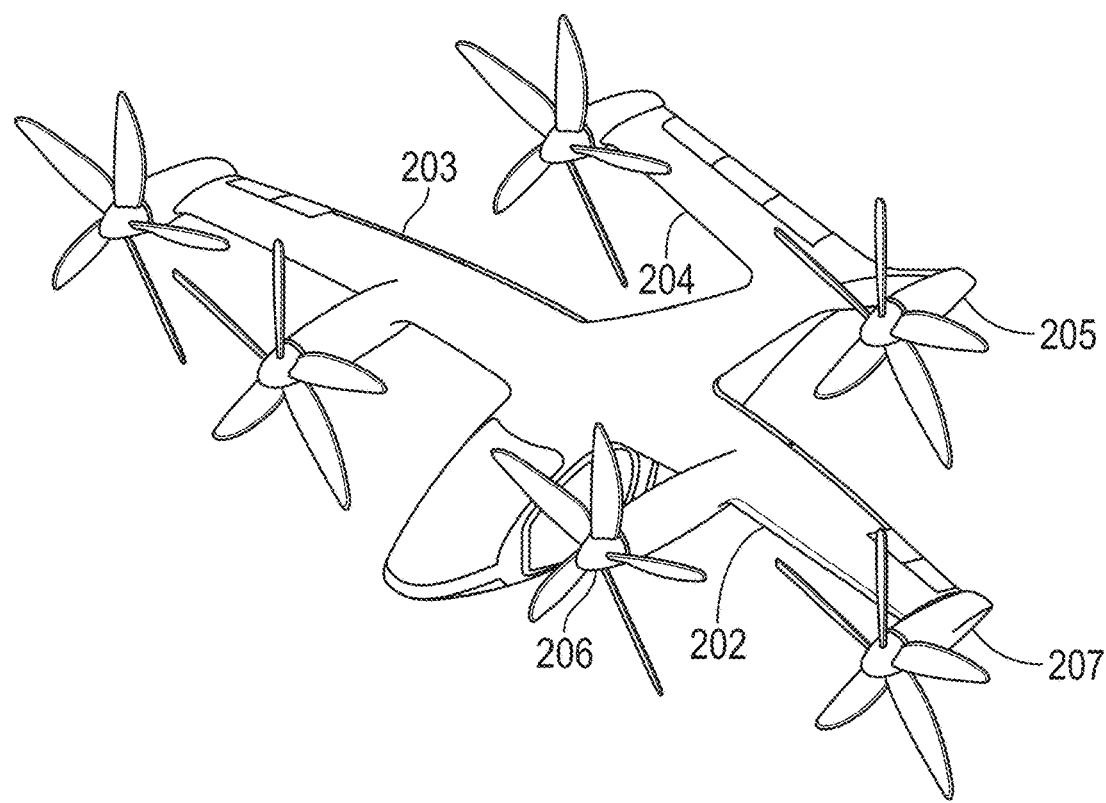
FIG. 1E to FIG. 1H are of a VTOL aircraft in a forward flight configuration according to some embodiments of the present invention.
Figure 1F:
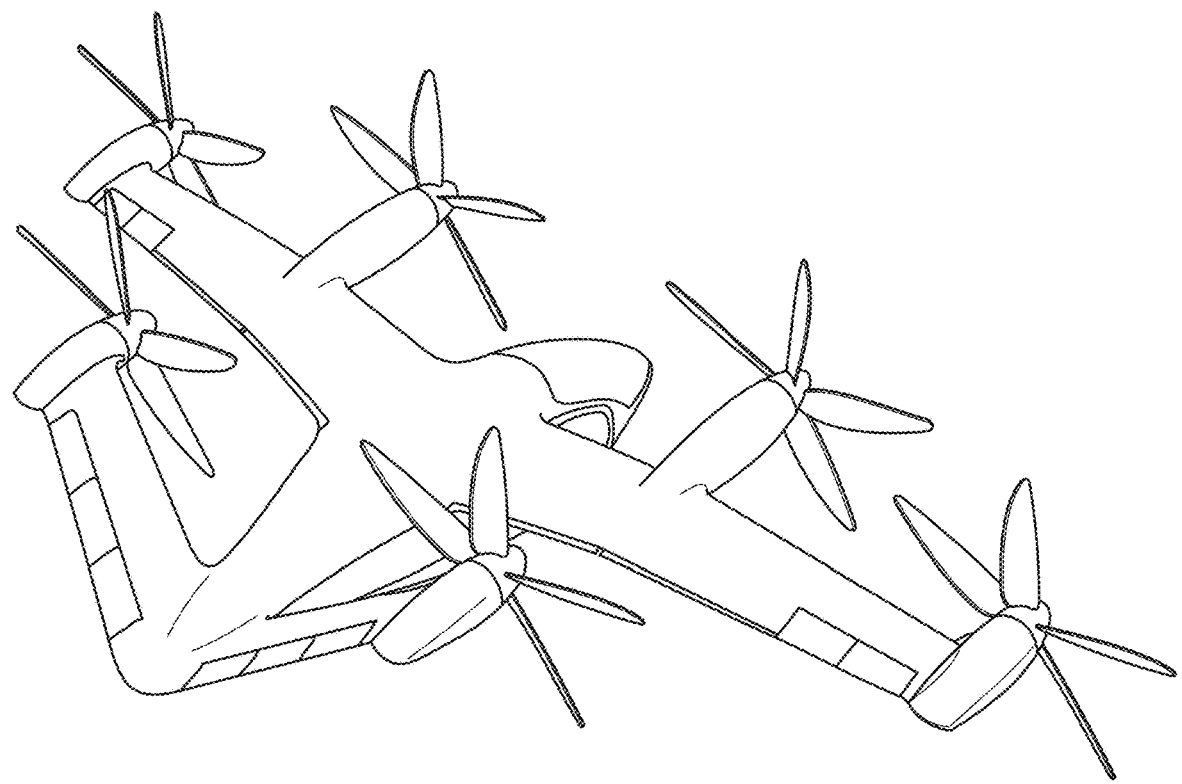

As seen in top view in FIG. 1D, the propulsion assemblies are positioned at different distances from the aircraft center of mass, in two axes. Attitude control during vertical take-off and landing may be manipulated by varying the thrust at each of the propulsion assembly locations. In the circumstance of a motor failure during vertical take-off or landing, and especially a motor failure at the wing outboard propulsion assembly, the attitude of the aircraft may be maintained by implementing fault tolerance strategies described herein.

The aircraft 200 is seen with two passenger seats side by side, as well as landing gear under the body 201. Although two passenger seats are illustrated, other numbers of passengers may be accommodated in differing embodiments of the present invention.

Figure 1G:
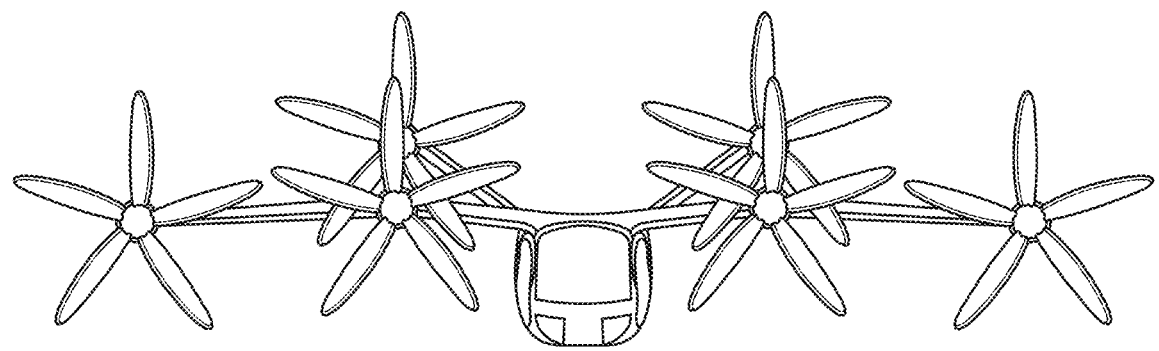
Figure 1H:
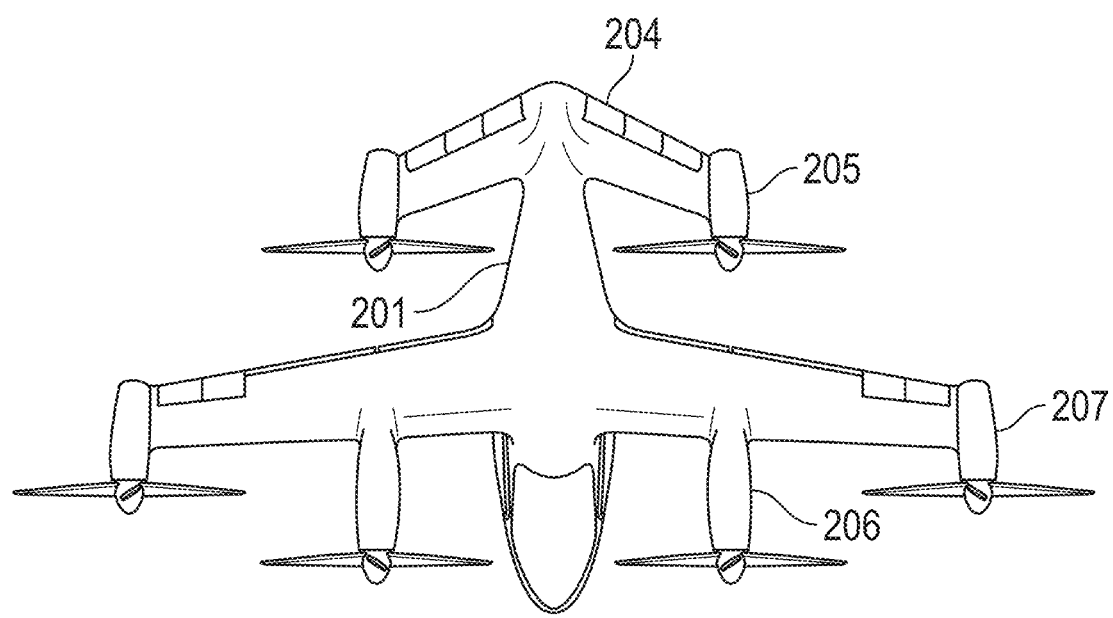
Figure 1I:
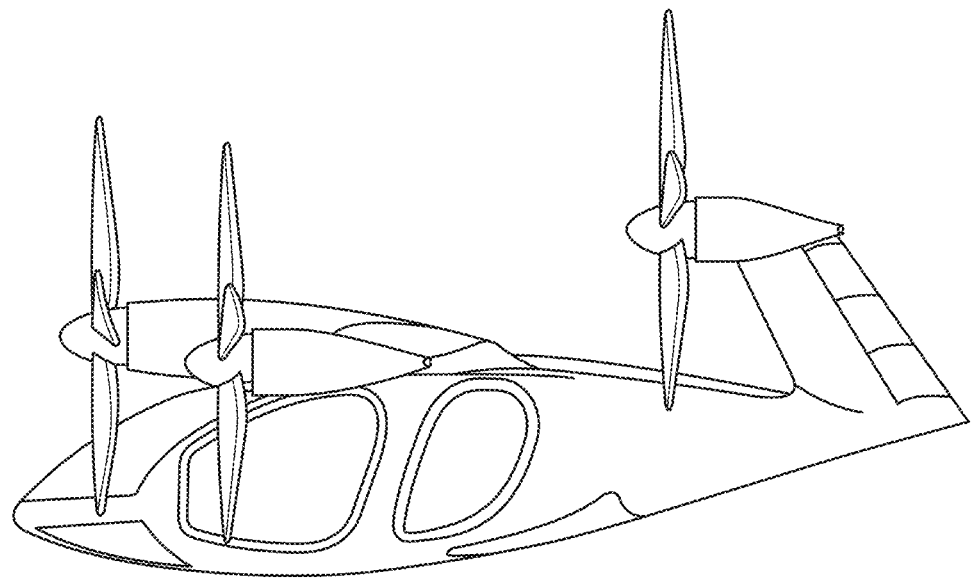
FIG. 1I to FIG. 1K are of a VTOL aircraft transitioning from a forward flight configuration to a vertical take-off and landing configuration according to some embodiments of the present invention.
Figure 1J:
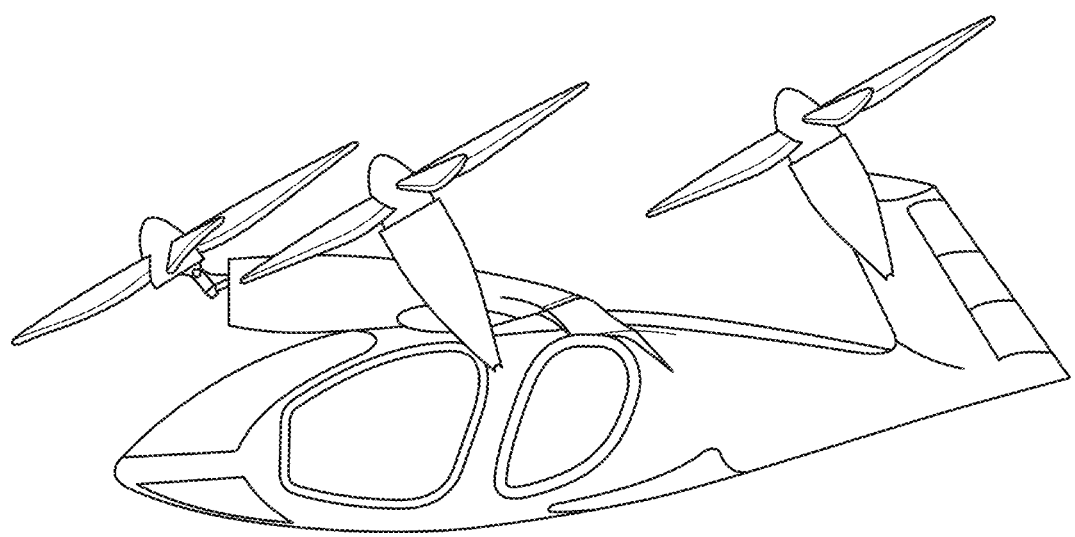
Figure 1K:
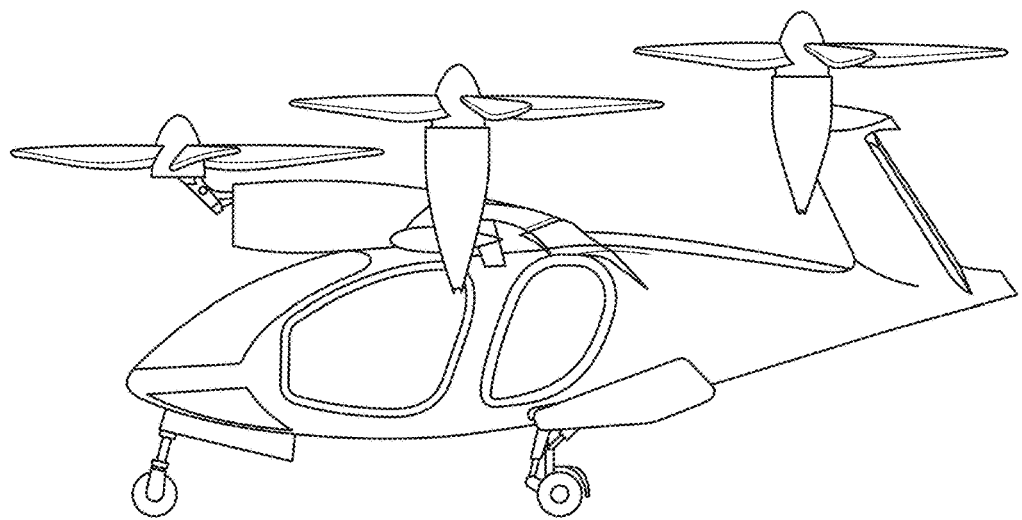

FIG. 1E through FIG. 1H illustrates the aircraft 200 in a forward flight configuration. In this configuration, the propulsion assemblies are positioned to provide forward thrust during horizontal flight. As seen in FIG. 1H, the centers of mass of the motors and of the propellers may be forward of the leading edge of the wings in the forward flight configuration. As seen in FIG. 1G, the propulsion assemblies 205 on the rear stabilizers 204 may be at a different elevation than the propulsion assemblies 206, 207 on the wings. In the circumstance of a motor failure during forward flight, the attitude of the aircraft may be maintained by implementing fault tolerance strategies described herein.

In some aspects, all or a portion of the wing mounted propulsion assemblies may be adapted to be used in a forward flight configuration, while other wing mounted propellers may be adapted to be fully stowed during regular, forward, flight. The aircraft 200 may have two propulsion assemblies on the right wing 203 and two propulsion assemblies on the left wing 202. The inboard propulsion assemblies on each wing may have wing mounted rotors that are adapted to flip up into a deployed position for vertical take-off and landing, to be moved back towards a stowed position during transition to forward flight, and then to have their blades stowed, and nested, during forward flight. The outboard propulsion assembly 207 may pivot in unison from a horizontal to a vertical thrust configuration.

Similarly, the each rear stabilizer 204 may have propulsion assemblies mounted to it, both of which are adapted to be used during vertical take-off and landing, and transition, modes. In some aspects, all of the propulsion assemblies designs are the same, with a subset used with their main blades for forward flight. In some aspects, all of the propulsion assemblies designs are the same, with all propellers used for forward flight. In some aspects, there may be a different number of propulsion assemblies units mounted to the rear stabilizer 204.

The aircraft can include any suitable set of flight actuators, which functions to transform aerodynamic forces/moments of the aircraft to affect aircraft control. Flight actuators can include control surface actuators (configured to drive control surfaces), tilt linkages (e.g., which function to transform the aircraft and/or propulsion assemblies thereon between a forward and a hover configuration), variable blade pitch actuators (e.g., for variable blade pitch rotors), and/or any other suitable actuators. Control surfaces can include flaps, elevators, ailerons, rudders, ruddervators, spoilers, slats, air brakes, and/or any other suitable control surfaces. In variants, control surfaces can include the high-lift mechanism as described in U.S. application Ser. No. 17/033,178, filed 25 Sep. 2020, which is incorporated in its entirety by this reference.

The aircraft can additionally or alternatively include landing gear (e.g., retractable landing gear, fixed landing gear), which functions to structurally support the aircraft when it is in contact with the ground and/or maneuver the aircraft during taxi.

However, the power architecture can be integrated into and/or implemented in conjunction with any suitable aircraft.

Figure 10:
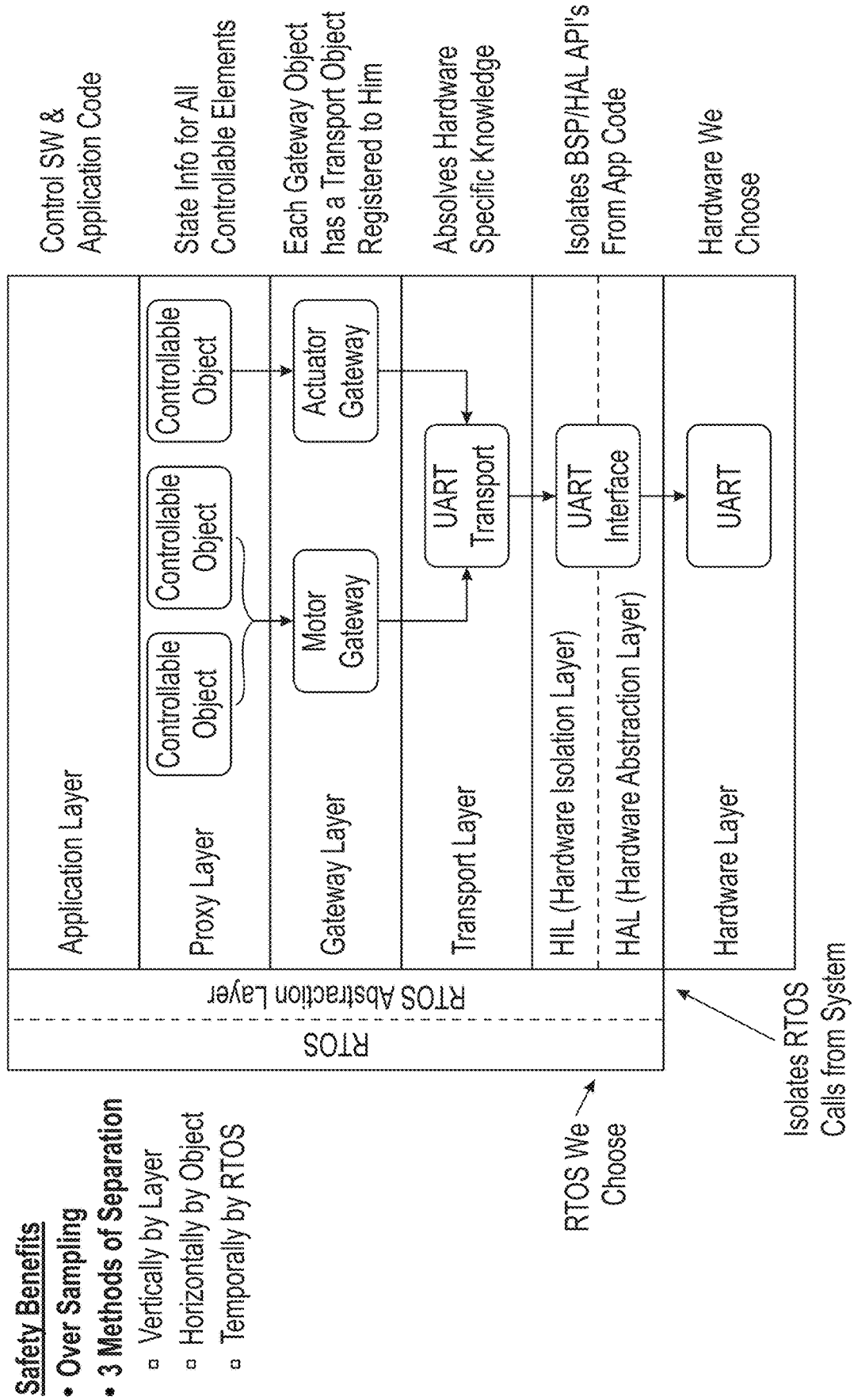
FIG. 10 illustrates flight control software architecture according to some embodiments of the present invention.
Figure 20:
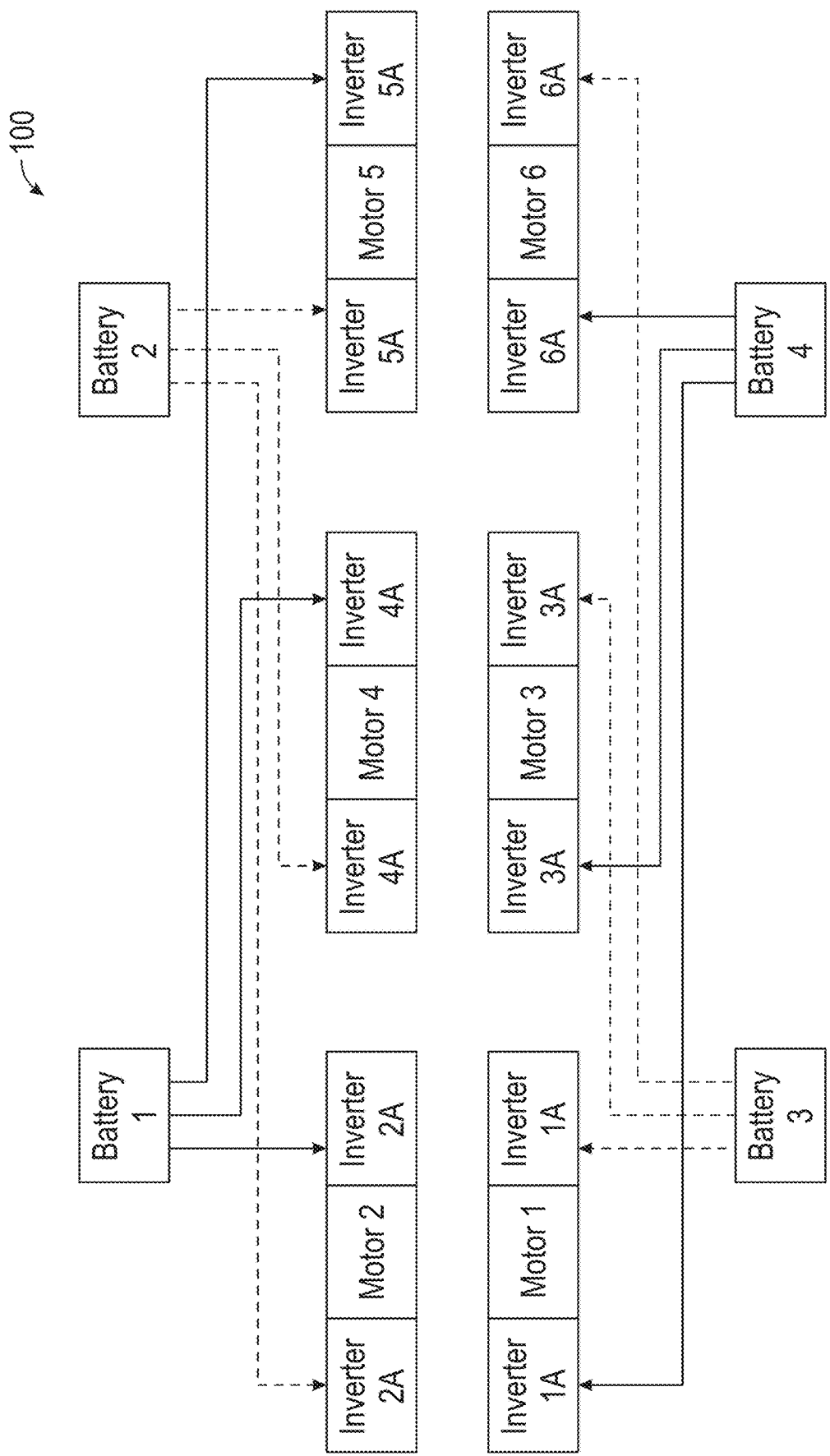
FIG. 20 is a schematic representation of a variant of a power system architecture.

The motors driving the wing mounted propulsion assemblies 206, 207 and/or the motors driving the rear stabilizer mounted propulsion assemblies may each have two sets of windings. In some aspects, both winding sets are powered during flight. In some aspects, each winding of the motor is powered by a different battery circuit. In some aspects, each motor may have more than two sets of windings. In variants, each motor can be configured to be separately and/or cooperatively powered via a plurality of inverters. In a specific example, each electric propulsion unit (EPU) can include two inverters (e.g., quad inverters), each powered by a separate battery (e.g., of a doublet pair, etc.), an example of which is shown in FIG. 20, In some embodiments, the electric motors of the aircraft are powered by rechargeable batteries. The use of multiple batteries driving one or more power busses enhances reliability, in the case of a single battery failure. In some embodiments, the batteries reside within the vehicle body on a rack with adjustable position such that the vehicle balance may be adjusted depending upon the weight of the pilot. FIG. 10 illustrates a battery location layout for a six battery system according to some embodiments of the present invention.

Figure 2A:
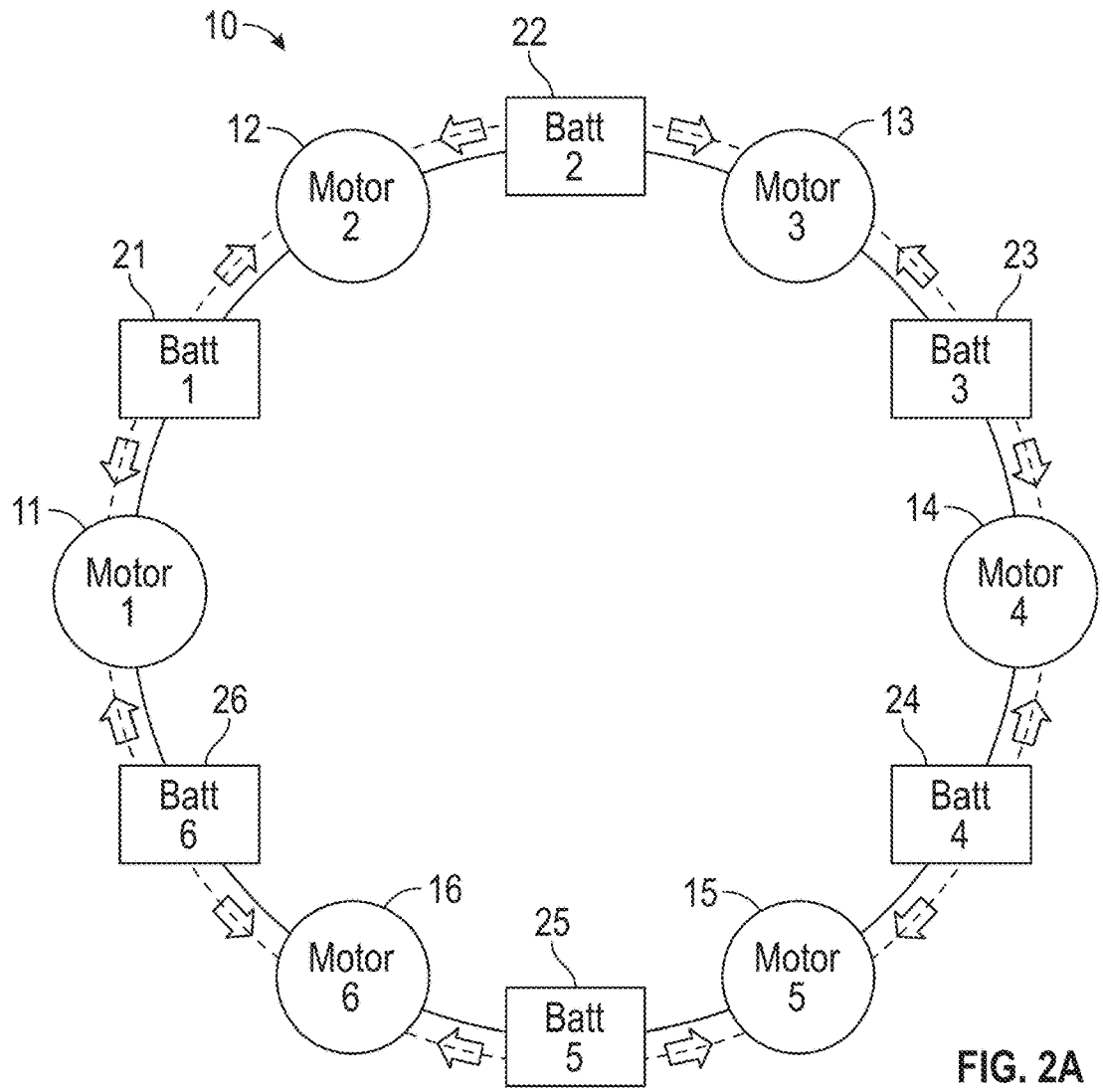
FIG. 2A is a layout of a flight system with a ring architecture according to some embodiments of the present invention.
Figure 2B:
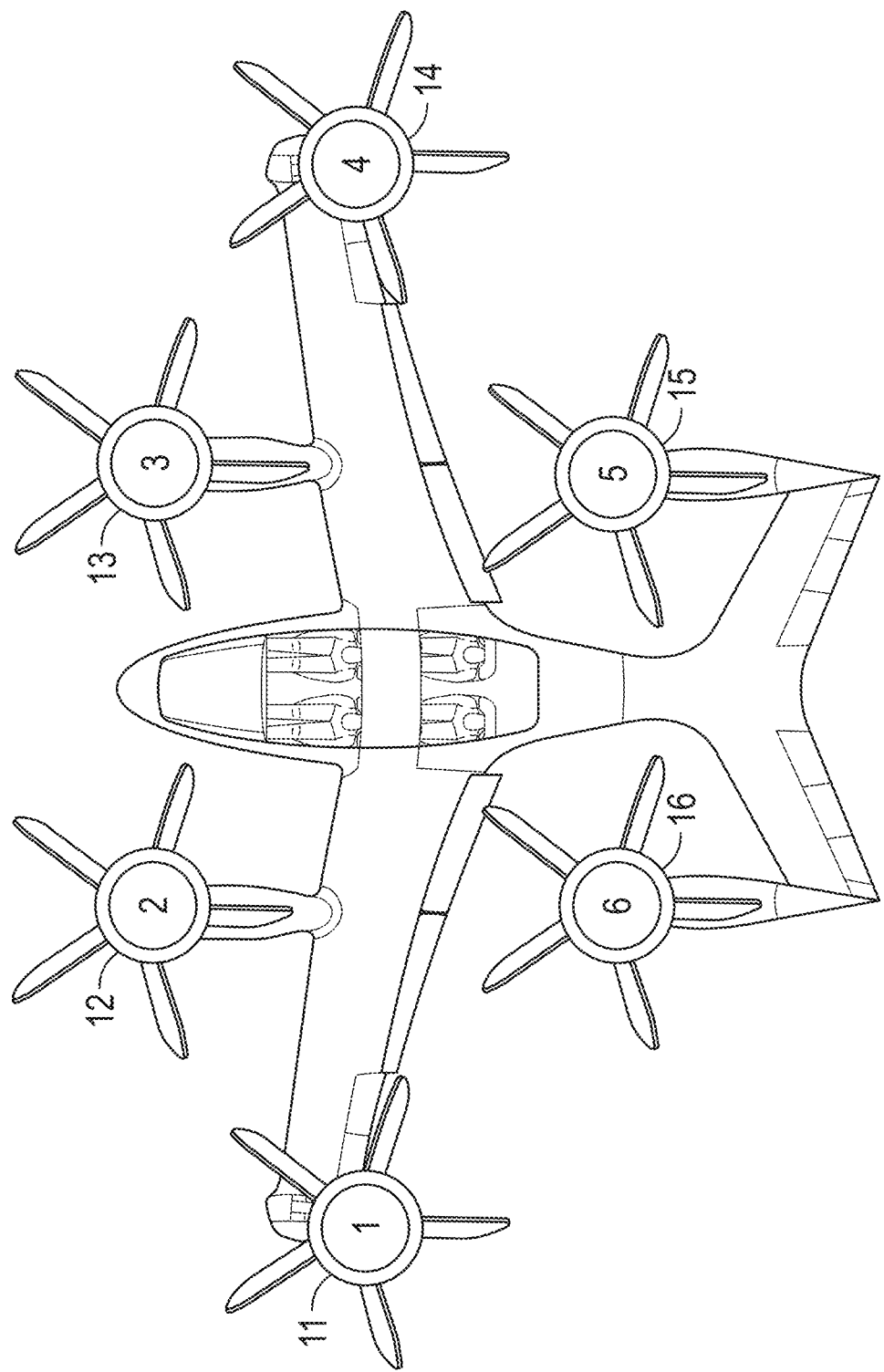
FIG. 2B is a layout identifying motor locations for the ring architecture according to some embodiments of the present invention.
Figure 2C:
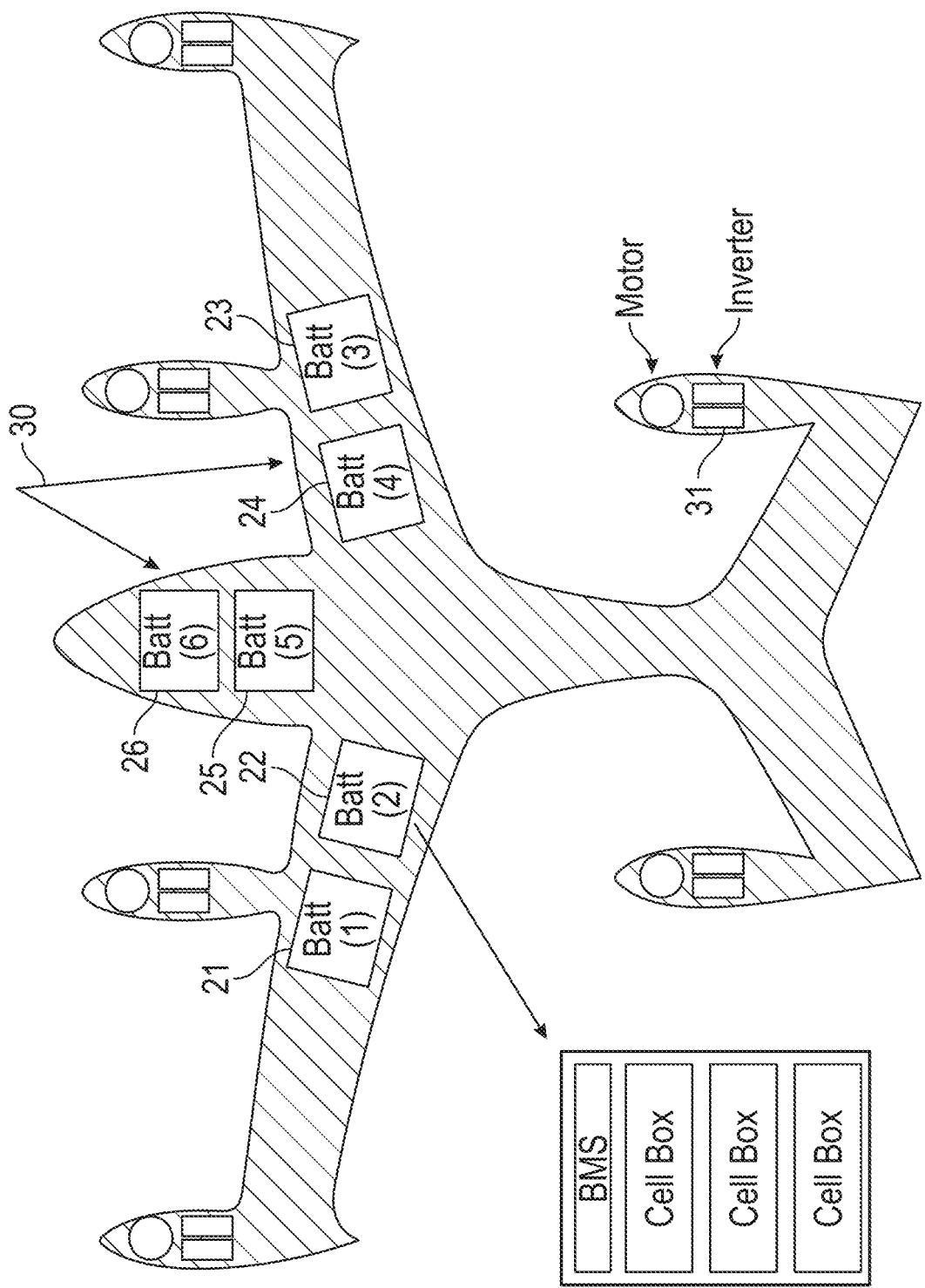
FIG. 2C is a layout of battery locations according to some embodiments of the present invention.

In some embodiments, as seen in FIG. 2A, a high reliability power system 10 for an electrically powered vertical take-off and landing aircraft has six motors and six batteries in a ring architecture. In this exemplary configuration, there are six motors and six batteries. Each of the batteries provides power to two motors, and each motor receives power from two batteries. FIG. 2B illustrates a layout of six motors on a VTOL aircraft in an exemplary embodiment using six propulsion assemblies and six batteries. FIG. 2C illustrates a layout of six batteries in a VTOL aircraft in an exemplary embodiment using six propulsion assemblies and six batteries. In an exemplary ring embodiment, there are six batteries and six motors. Each of the motors is powered by two separate batteries. The disparate locations 30 of the batteries also enhance the reliability and fault tolerance of the power system architecture. Each battery is powering two separate motors. In some aspects, each of the motors is wound with two sets of windings, and each set of windings receives power from a different battery. As discussed below with regard to FIG. 7, each of the six batteries supplies two power inverters 31, for a total of 12 power inverters. The nominal voltage of the batteries is 600V. Each of the six propulsion motors has two sets of windings, with each motor powered by two inverters, one for each set of windings. The two inverters powering a single motor each are supplied power by different batteries.

In an exemplary six motor six battery embodiment 10, the first motor 11 is coupled to the sixth battery 26 and the first battery 21. The second motor 12 is coupled to the first battery 21 and the second battery 22. The third motor 13 is coupled to the second battery 22 and the third battery 23. The fourth motor 14 is coupled to the third battery 23 and the fourth battery 24. The fifth motor 15 is coupled to the fourth battery 24 and the fifth battery 25. The sixth motor 16 is coupled to the fifth battery 25 and the sixth battery 26. In a nominal operating scenario, each battery splits its power distribution evenly between the two motors to which it is coupled, and each motor receives an equal amount of power from each battery to which it is coupled.

The fault tolerant aspect of the power system architecture according to embodiments of the present invention is adapted to withstand, and respond to, at least the following failures: the failure of a battery; the failure of a motor; or the failure of a motor inverter.

Figure 3:
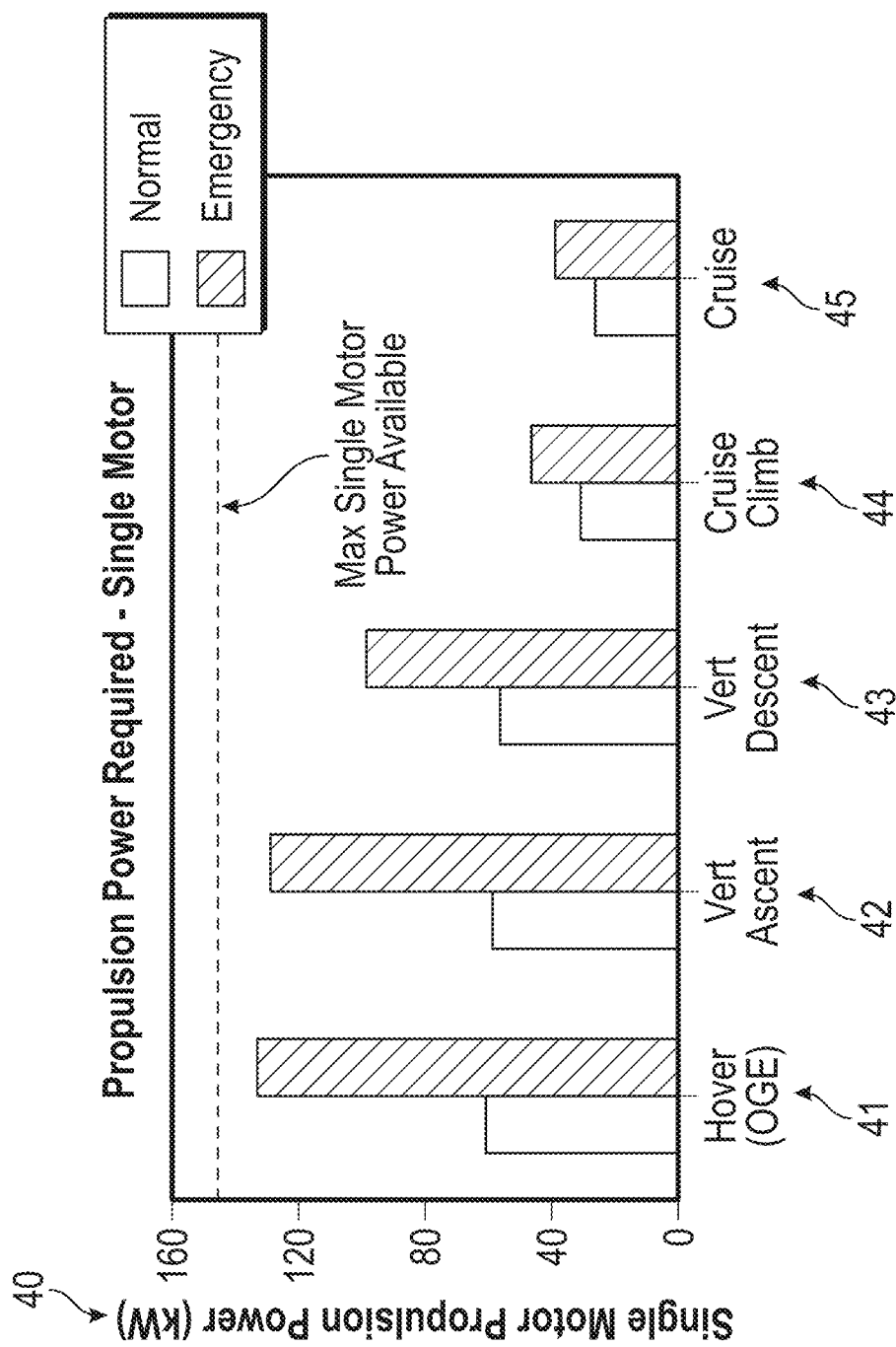
FIG. 3 is a motor power chart according to some embodiments of the present invention.

FIG. 3 is a bar graph (with bar pairs for each operating mode) of the power required for a single motor 40 in the six motor embodiment. The blue vertical bars (on the left side of the bar pair for each mode) illustrate nominal (normal) operating power, per motor, for the five different flight phases: hover 41, vertical ascent 42, vertical descent 43, cruise climb 44, and cruise 45. The hover, vertical ascent, and vertical descent modes are VTOL modes wherein the motors are rotated to a vertical thrust position as seen in FIG. 1A to FIG. 1D. The cruise climb and cruise phases are with the motors in a forward flight position, as seen in FIG. 1E to FIG. 1H. The red vertical bars (on the right side of the bar pair for each mode) represent emergency phase operation, as discussed below.

As seen in FIG. 3, the illustrative embodiment of a six motor six battery ring architecture system runs about 60 KW per motor in a VTOL mode during nominal conditions. This 60 KW compares to approximately the 150 KW maximum available power. In the case of a motor failure, however, more power may be diverted to remaining motors to maintain attitude and altitude control, as discussed further below.

Figure 4:
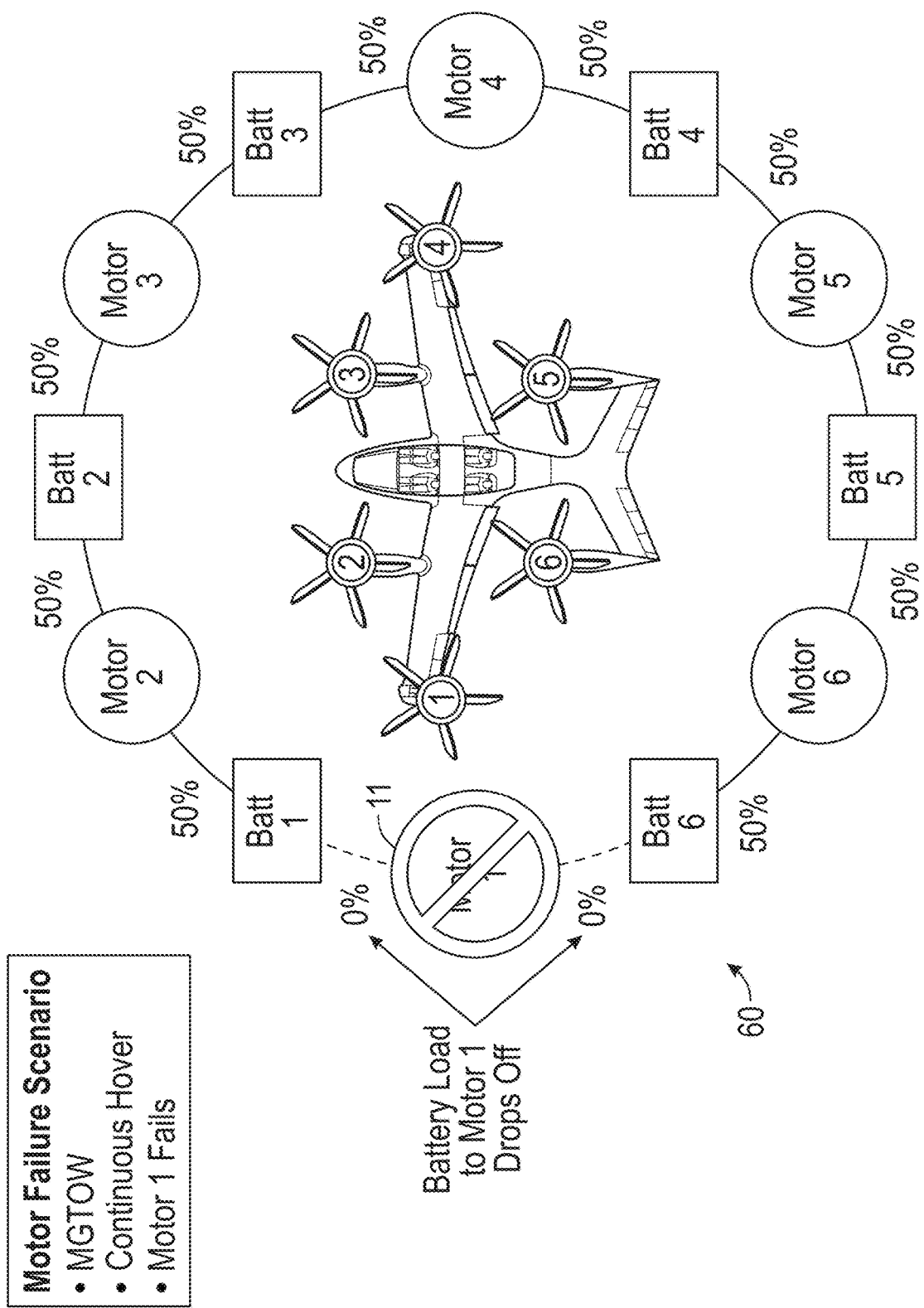
FIG. 4 is a failure scenario layout according to some embodiments of the present invention.
Figure 5:
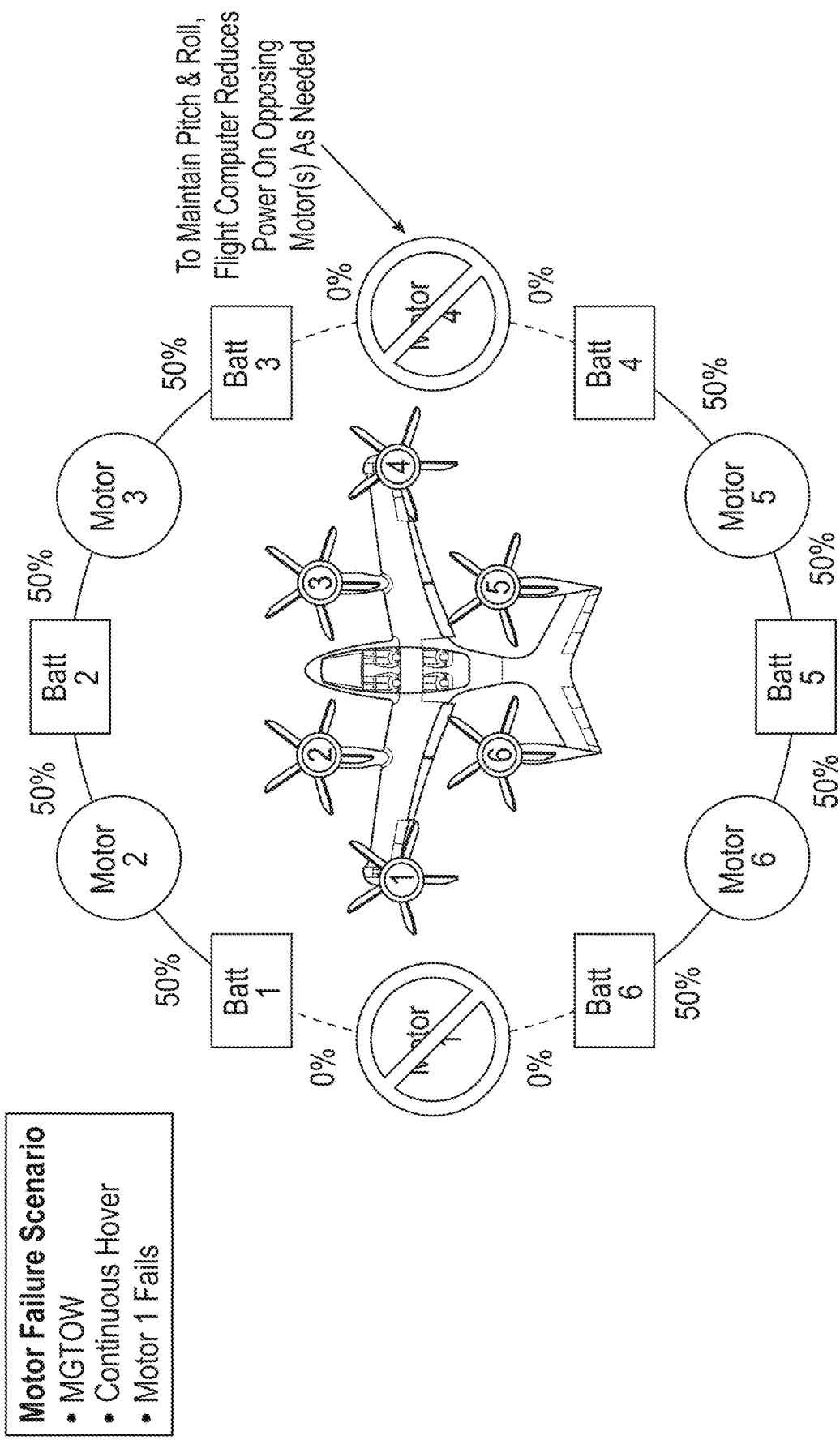
FIG. 5 is a failure compensation layout according to some embodiments of the present invention.
Figure 6:
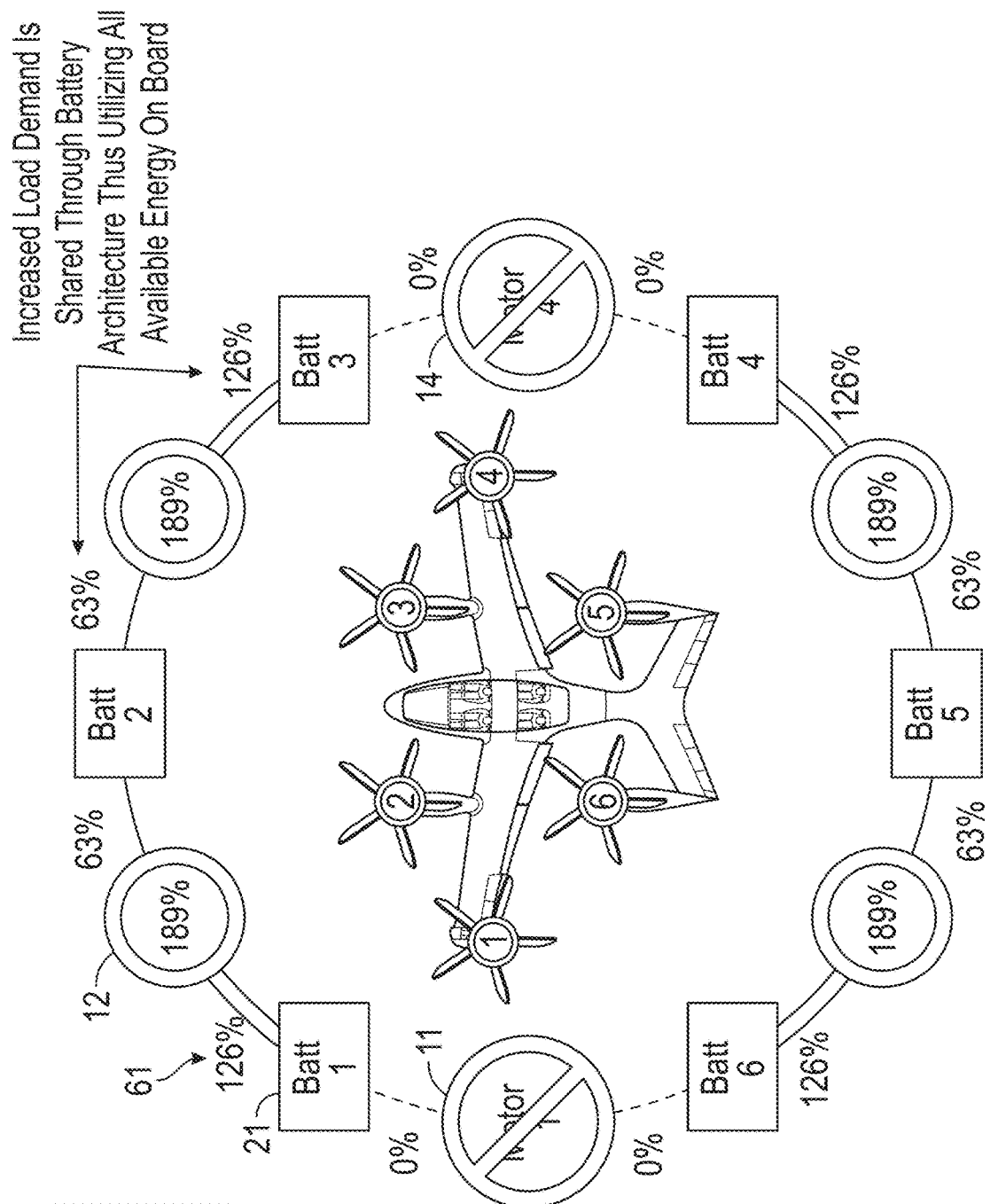
FIG. 6 is a failure compensation layout according to some embodiments of the present invention.

FIG. 4 illustrates a potential failure mode 60 wherein the first motor fails. As seen in the representation motor layout, the loss of the first motor 11 represents loss of thrust at the far port motor, which will have a significant impact on the attitude of the aircraft. The flight computer may immediately sense at least two things: first, that the motor has quit drawing current; second, that there is a disruption to the attitude of the aircraft. In order to maintain balance in the aircraft, the flight control computer will reduce power to the opposing motor(s) as needed. In this example, as seen in FIG. 5, the power to the fourth motor 14 will be reduced. The loss of lift due to the shutdown of two motors requires that the remaining four motors take more power and deliver more lift. FIG. 6 illustrates how the increased load demands in the second, third, fifth, and sixth motors are met by distributing more power from the batteries. Looking again at FIG. 3, the red vertical bars illustrate the power delivery required with the motor failure and then the motor shutdown of the opposing motor. The power down of the fourth motor and the increase in power to the second, third, fifth, and sixth motors may take place simultaneously in some aspects. In some aspects, the power down of the fourth motor and the increase in power to the second, third, fifth, and sixth motors may take place sequentially.

As seen in FIG. 6, with the first motor 11 failed and the fourth motor 14 powered down to balance the aircraft, the first battery 21 now only delivers power to the second motor 12. Similarly, the third battery only delivers power to the third motor, the fourth battery only delivers power to the fifth motor, and the sixth battery only delivers power to the sixth motor. The second battery delivers power to both the second and third motors, and the fifth battery delivers power to the fifth and sixth motors. Although illustrated as having the fourth motor running down to 0% power, in some aspects the cross motor may be run at a low level, in the range of 0-20% of nominal power, for example. As the first and sixth batteries are only providing power to a single motor, and as the third and fourth batteries are primarily only delivering power to a single motor, these batteries will provide more current 61 to their respective windings in the second, third, fifth, and sixth motors. The second and fifth batteries will split evenly between their adjacent motors. In the failure scenario illustrated in FIG. 6, each battery may be putting out the same amount of power, but two batteries are splitting their power delivery, and four motors are providing (or substantially providing) power to only a single motor. The increased load demand of the motors in this emergency mode is shared through the battery architecture to utilize the available energy onboard the aircraft. Although one motor has been disabled and a second motor has been powered down to accommodate attitude control concerns, each battery is still being used and delivering power.

Figure 7:
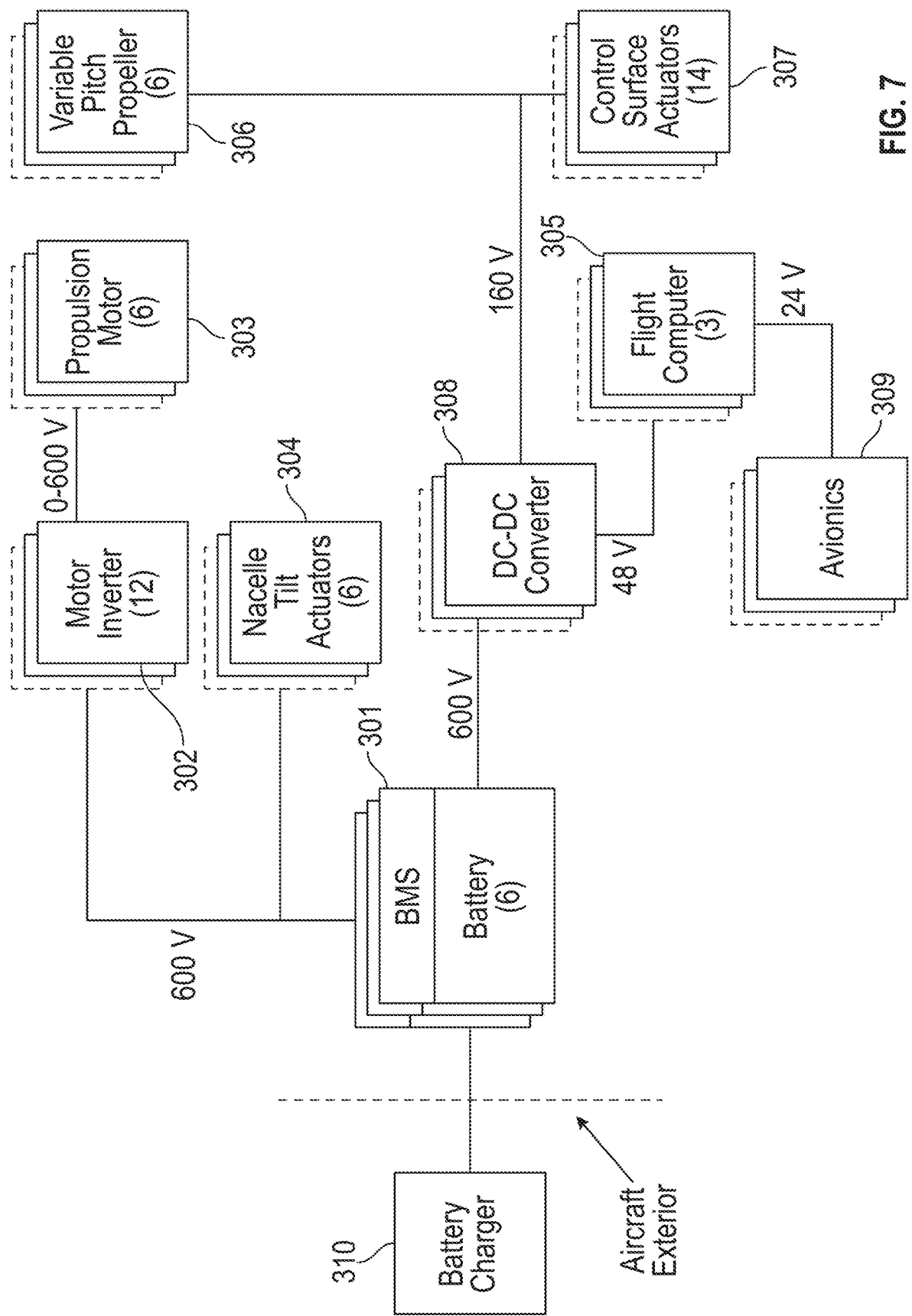
FIG. 7 is a power architecture layout according to some embodiments of the present invention.

In some embodiments, the vertical take-off and landing aircraft has an autonomous attitude control system adapted to withstand a power link failure, or complete motor failure, in a multi-battery system by load sharing to better equate battery discharge levels. In some aspects, each motor is driven on multiple complementary winding sets, with each winding set using a different load link and being driven by a different battery. FIG. 7 is an illustrative embodiment of the electrical system power architecture for a six motor six battery aircraft. Each of the six batteries 301 supplies two power inverters, for a total of 12 power inverters 302. The nominal voltage of the batteries is 600V. Each of the six propulsion motors 303 has two sets of windings, with each motor powered by two inverters, one for each set of windings. The two inverters powering a single motor each are supplied power by different batteries. In addition to supplying power to the motor inverters, the battery also supplies power to the rotor deployment mechanisms 304 (nacelle tilt actuators) which are used to deploy and stow the rotors during various flight modes (vertical take-off and landing configuration, forward flight configuration, and transition between).

Figure 18:
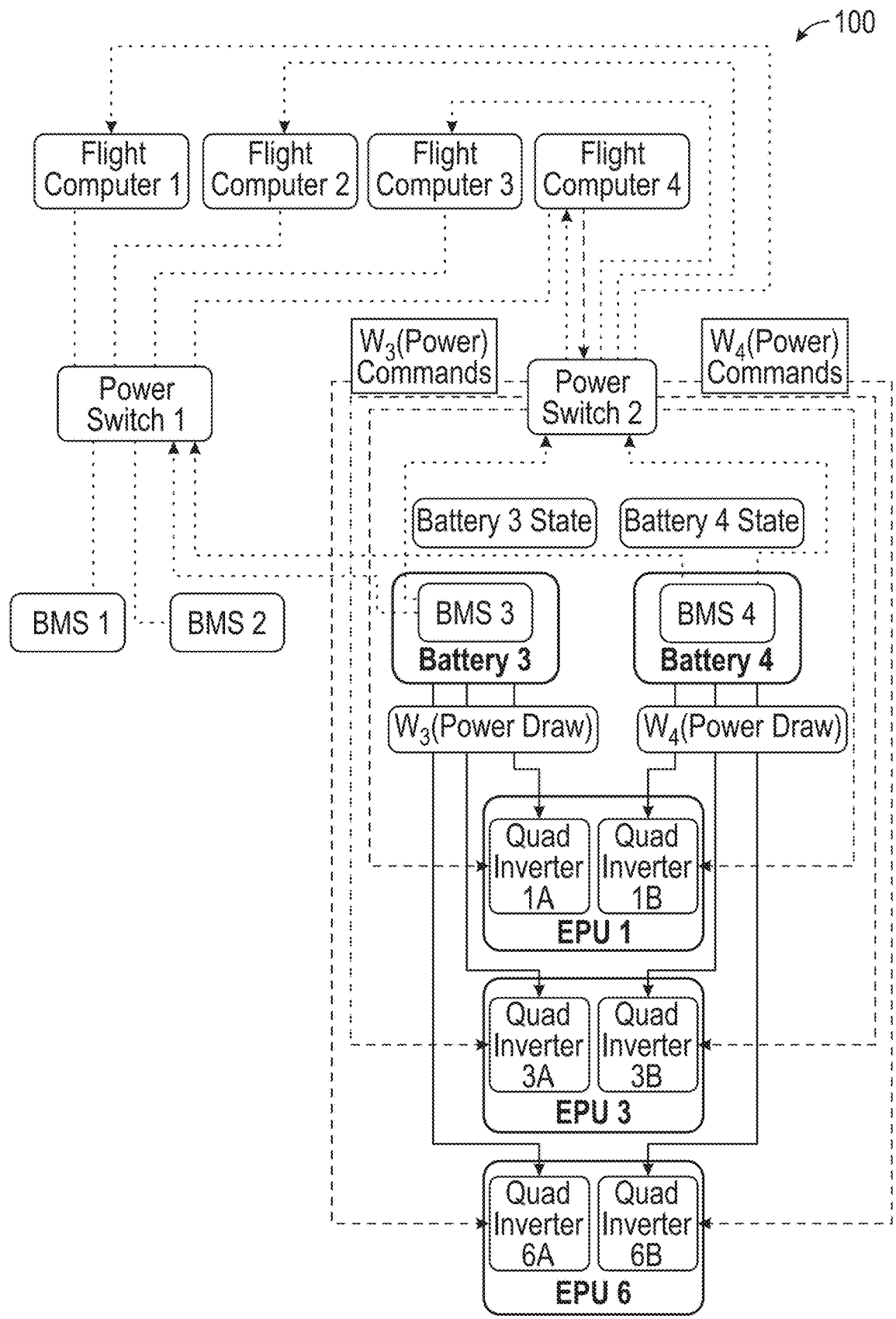
FIG. 18 is a schematic representation of a variant of a power system architecture.

A flight computer 305 monitors the current from each of the twelve motor power inverters 302 which are supplying power to the twelve winding sets in the six motors 303. The flight computer 305 may also control the motor current supplied to each of the 12 sets of windings of the six motors. In some embodiments, the batteries 301 also supply power to the blade pitch motors and position encoders of the variable pitch propellers 306. The batteries also supply power to control surface actuators 307 used to position various control surfaces on the airplane. The blade pitch motors and the control surface actuators 307 may receive power run through a DC-DC converter 308, stepping the voltage down from 600V to 160V, for example. A suite of avionics 309 may also be coupled to the flight computer. A battery charger 310 may be used to recharge the batteries 301, and the battery charger may be external to the aircraft and ground based. In variants, the flight computer can be implemented and communicatively connected within the power architecture as described in U.S. application Ser. No. 16/573,837, filed 17 Sep. 2019, which is incorporated in its entirety by this reference. In a specific example, a first set of batteries (e.g., doublet pair) can power a first switch set, and a second set of batteries (e.g., separate and distinct from the first set, remainder of the batteries, second doublet pair, etc.) can power a second switch set, the switch sets communicatively connecting the flight computers to the flight actuators (e.g., an example is shown in FIG. 18).

In the case of a failure, such as the failure of a motor, or of a power link to a motor, the compensations to power distribution to the various motors from the various batteries, as described above, may be done autonomously and onboard the aircraft. The compensations may be done without needing input from the pilot, for example.

In another failure scenario, a single winding on a motor may fail. In such a scenario, the opposing motor may be powered down somewhat while the motor with a sole remaining winding may be powered up somewhat. The power supplied by the batteries may be moderated to even out the discharge of the various batteries. In yet another failure scenario, a battery may fail. In that case the cross motor may be reduced 10-20%, with the sole battery remaining on the motor with the failed battery/inverter providing extra power, and differential power along the ring used to spread the battery discharge. In the case of a completely failed battery in the ring architecture, which would result in two motors each having one winding set go unpowered, the remaining winding set in each of the adjacent motors would take increased power from that winding set's battery, and there would be differentially adjusted power around the ring in order to best equalize the battery discharge rates. The cross motor would be partially powered down to maintain appropriate discharge rates.

Figure 8:
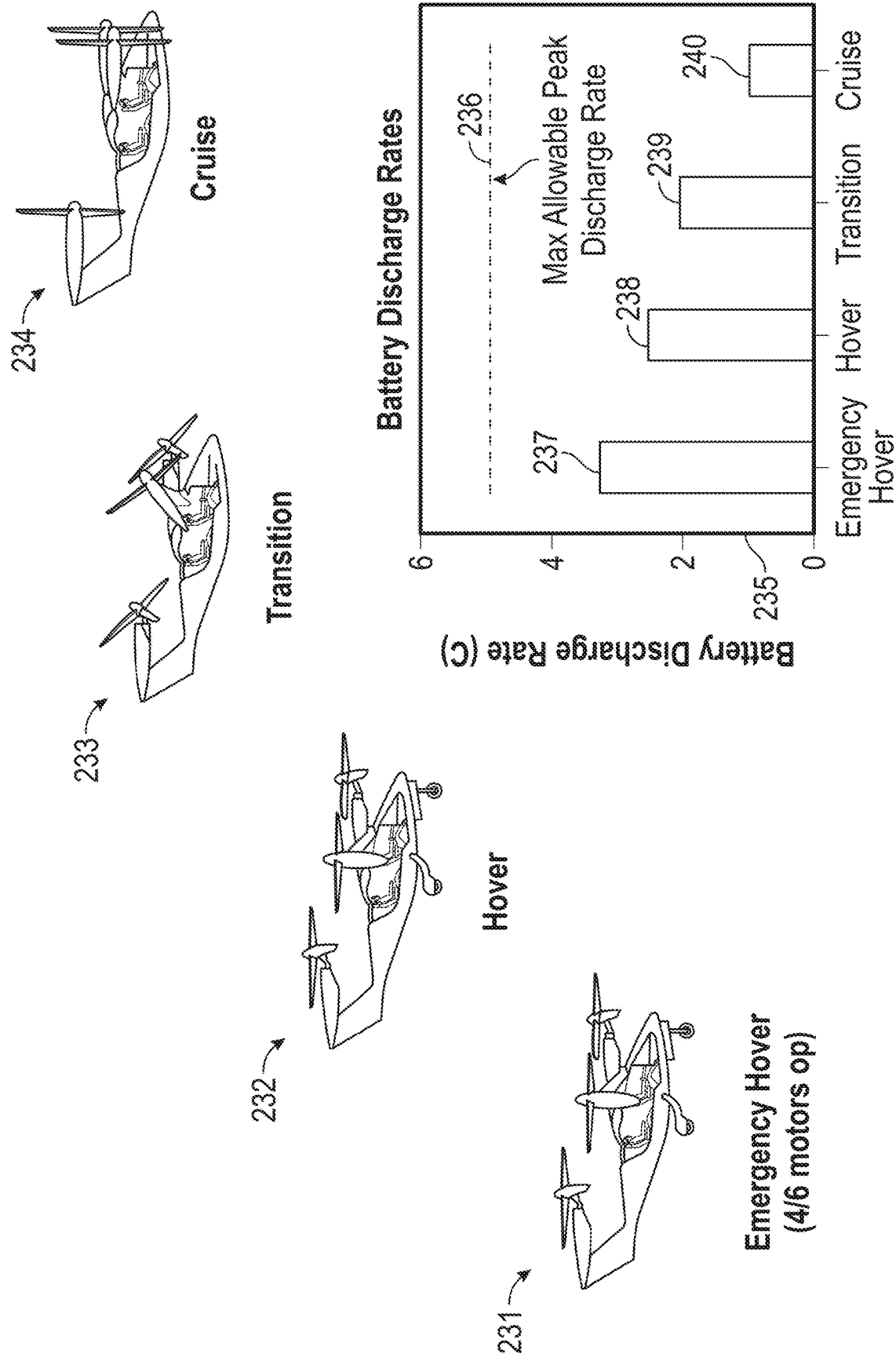
FIG. 8 is a battery discharge chart according to some embodiments of the present invention.

FIG. 8 illustrates four flight modes and a bar chart 235 of the battery discharge rates for each flight mode. The vertical axis in the bar chart is the battery discharge rate C. The battery discharge rate is a normalized coefficient wherein a 1 C discharge rate would discharge the battery in one hour. A 2 C discharge rate would discharge the battery in 30 minutes, a 3 C discharge rate would discharge the battery in 20 minutes, and so on. A maximum peak discharge rate 236, which is about 5 C in this exemplary embodiment, may be set by the limitations of the battery chemistry. The nominal flight modes are hover mode 232, transition mode 233, and cruise mode 234. The cruise discharge rate 240 may be approximately 1 C. As the aircraft approaches for landing, the aircraft will change to a transition mode 233, which may have a transition discharge rate 239 of approximately 2 C. The aircraft will then go into hover mode 232 as it lands, which may have a discharge rate 238 of approximately 2.5 C. In the case of a failed motor, the aircraft may go into an emergency hover mode 231, wherein a cross motor may be powered down to achieve attitude stability. The emergency hover discharge rate 237 may be over 3 C.

In an exemplary embodiment, the maximum gross take-off weight (MGTOW) may be 4200 pounds. The discharge rates are out of ground effect (OGE), with a total energy storage of all batteries of 150 kWh. In the case of an emergency landing in the emergency hover mode 231, the anticipated time using the high discharge rate at the emergency hover discharge rate 237 is approximately 1 minute.

Figure 9:
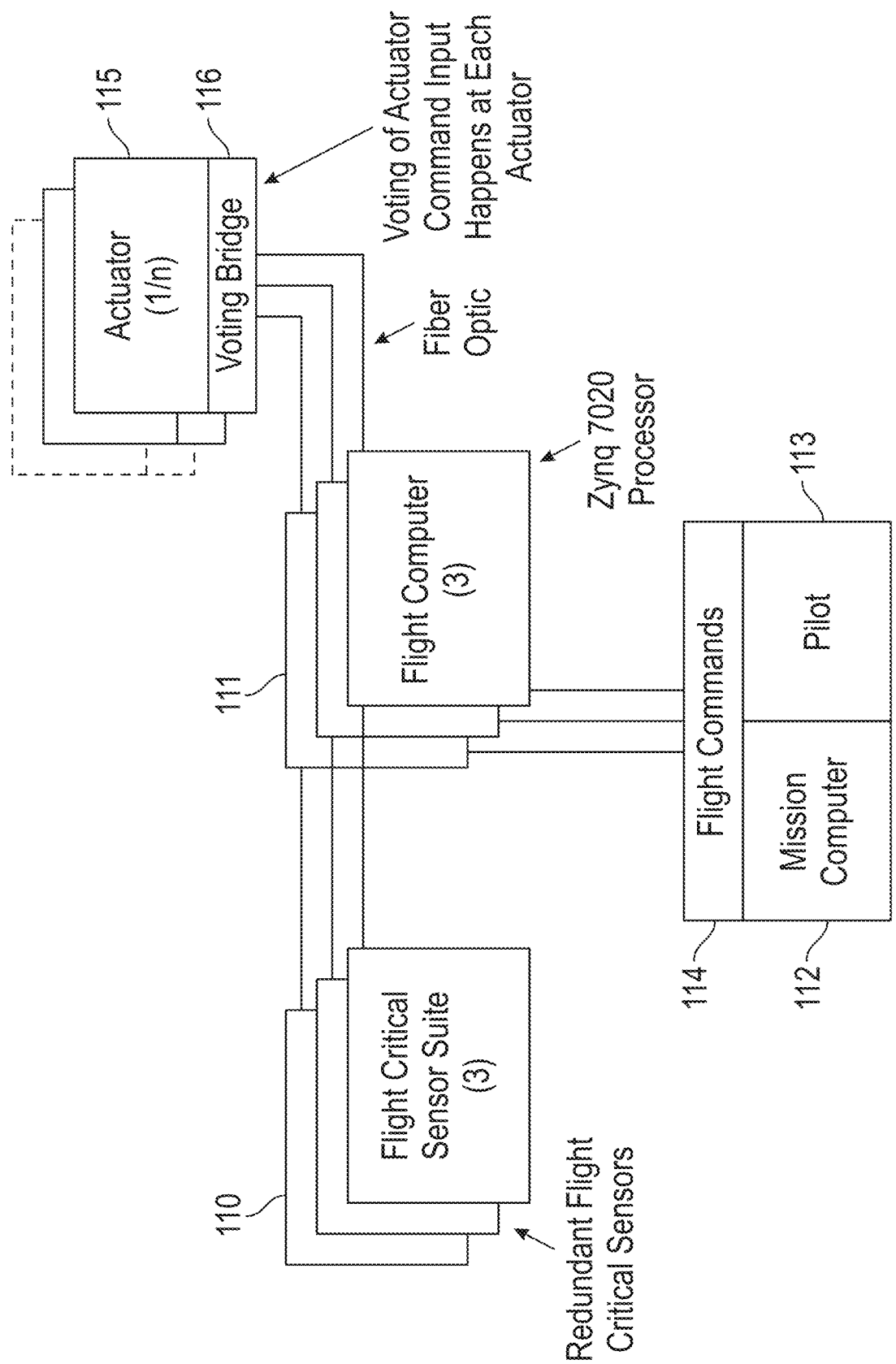
FIG. 9 is a flight control system architecture layout according to some embodiments of the present invention.

FIG. 9 illustrates a flight control system architecture for a high reliability electric powered aircraft according to some embodiments of the present invention. In an exemplary embodiment, the flight computer 111 of the control system receives flight commands 114 from the mission computer 112 and from the pilot 113. The flight computer may also receive inputs from a flight critical sensor suite 110. The flight critical sensors may be triply redundant. The flight computer may be triply redundant. The system may include a voting bridge 116 on each actuator 115. FIG. 10 illustrates the flight control software architecture according to some embodiments of the present invention.

Figure 11A:
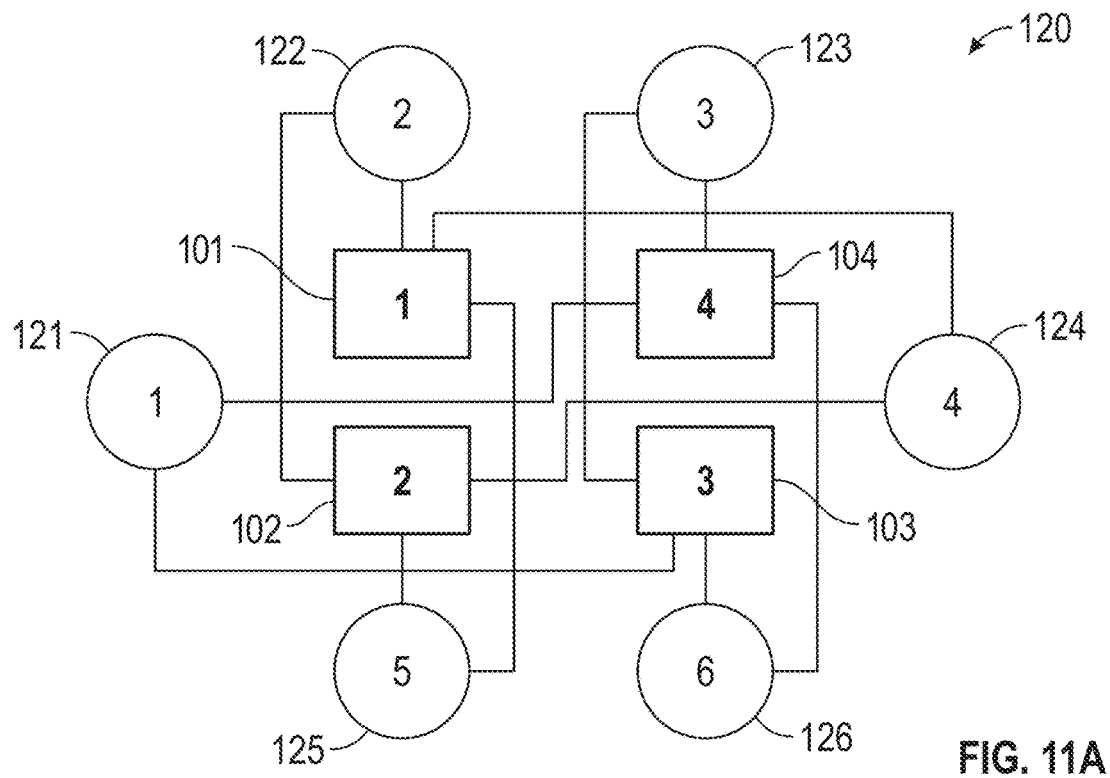
FIG. 11A is a layout of a flight power system with a doublet architecture according to some embodiments of the present invention.

In some embodiments of the present invention, other battery and motor architectures may be used which further enhance the fault tolerance of the system. In some aspects, as seen in FIG. 11A, a doublet architecture 120 is used which uses four batteries to the electric motors of six propulsion assemblies; a left wing tip propulsion assembly including a motor 121, a left wing propulsion assembly including a motor 122, a right wing propulsion assembly including a motor 123, a right wing tip propulsion assembly including a motor 124, a left rear propulsion assembly including a motor 125, and a right rear propulsion assembly including a motor 126. In the doublet architecture, each battery provides power to one or motors on each side of the aircraft longitudinal centerline. By linking a battery that powers the furthest outboard to a motor on the other side of the centerline of the aircraft, a battery failure then has its effect more spread out across the aircraft, reducing the amount of attitude offset due to the battery failure. In the case of a motor failure at the first motor 121, for example, there may still be an instantaneous reduction in power to the fourth motor to compensate for the failure. But the compensation regime for power sharing in a doublet architecture using the remaining motors will allow for lower inverter loads in an inverter optimized system as compared to the ring architecture that was disclosed above. Also, the compensation regime for power sharing in a doublet architecture using the remaining motors will allow for lower battery loads in a battery optimized system as compared to the ring architecture.

Figure 11B:
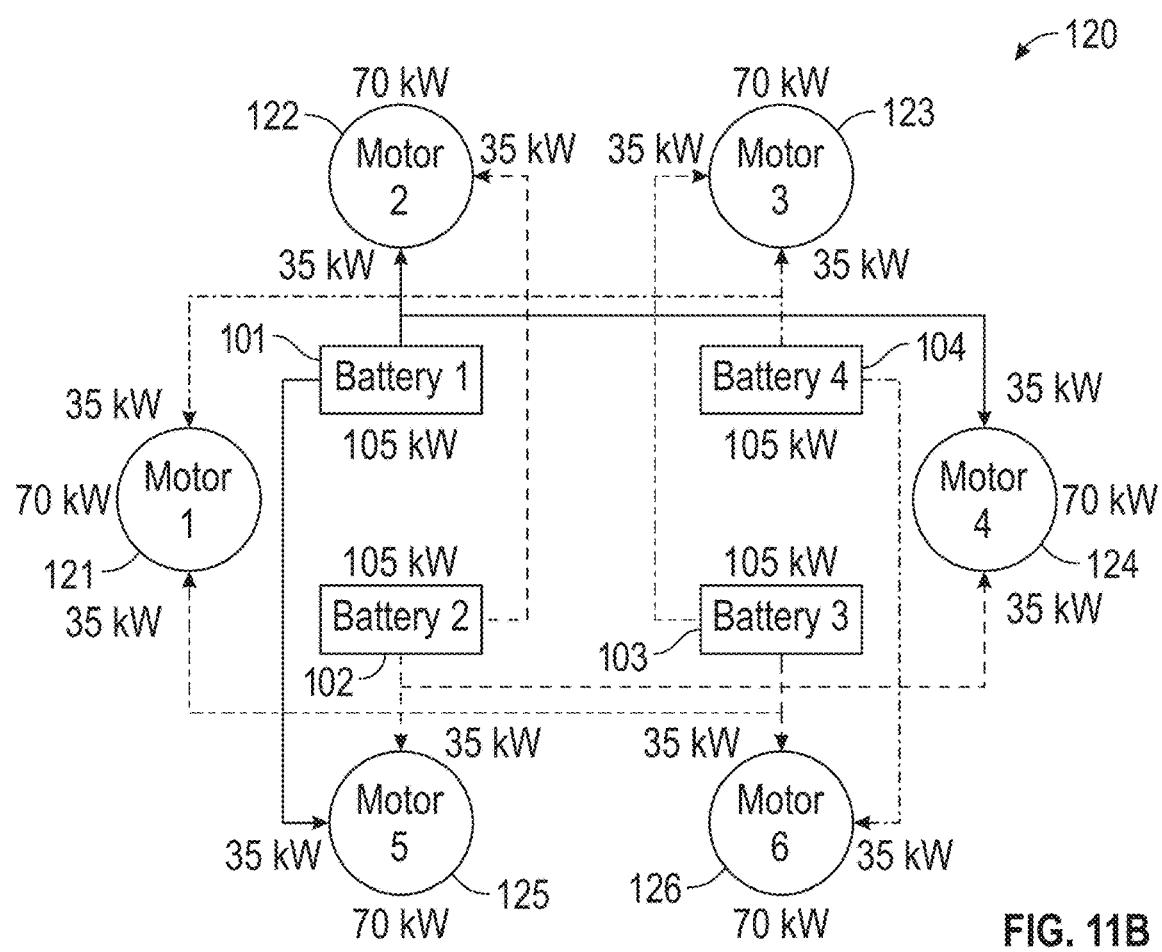
FIG. 11B is a layout of a flight power system with a doublet architecture according to some embodiments of the present invention.

FIG. 11B illustrates a nominal operating condition for the doublet architecture 120 wherein each of the four batteries 101, 102, 103, 104 provides 35 KW to one winding of three different motors, for a total of 105 KW delivered per battery, and a total of 70 KW received per motor, for a total delivery of 420 kW. Each motor is receiving power from three batteries.

Figure 11C:
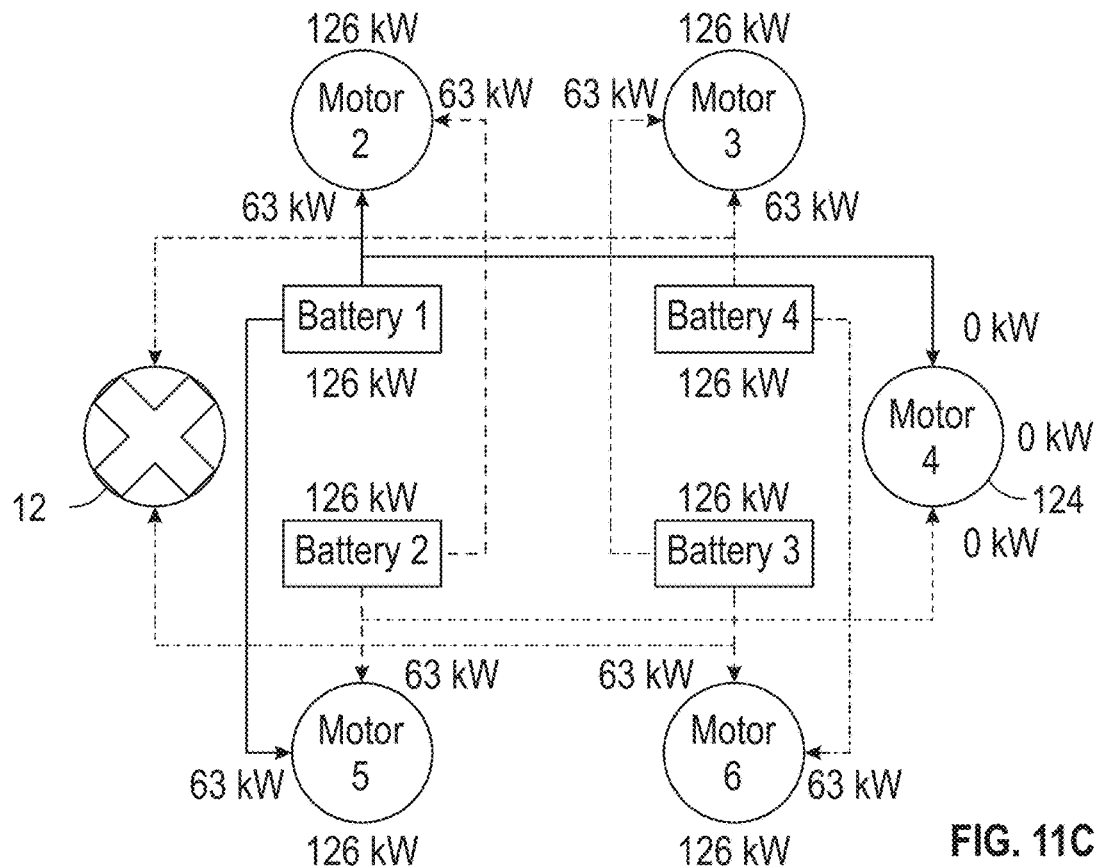
FIG. 11C is a layout of a flight power system with a doublet architecture with a motor failure according to some embodiments of the present invention.

FIG. 11C illustrates a motor failure condition, in this exemplary case the motor 121 of the left wing tip propulsion assembly. As illustrated, the motor 124 on the right wing tip has been unpowered and is no longer drawing any power, in order to offset the loss of the left wing tip motor. Each of the batteries is now powering two motors instead of the prior three, and each motor is receiving power from two batteries, instead of the prior three. Each of the batteries is able to run at the same power output level, and each of the motor windings, and their associated inverters, are also able to run at the same power level.

Figure 11D:
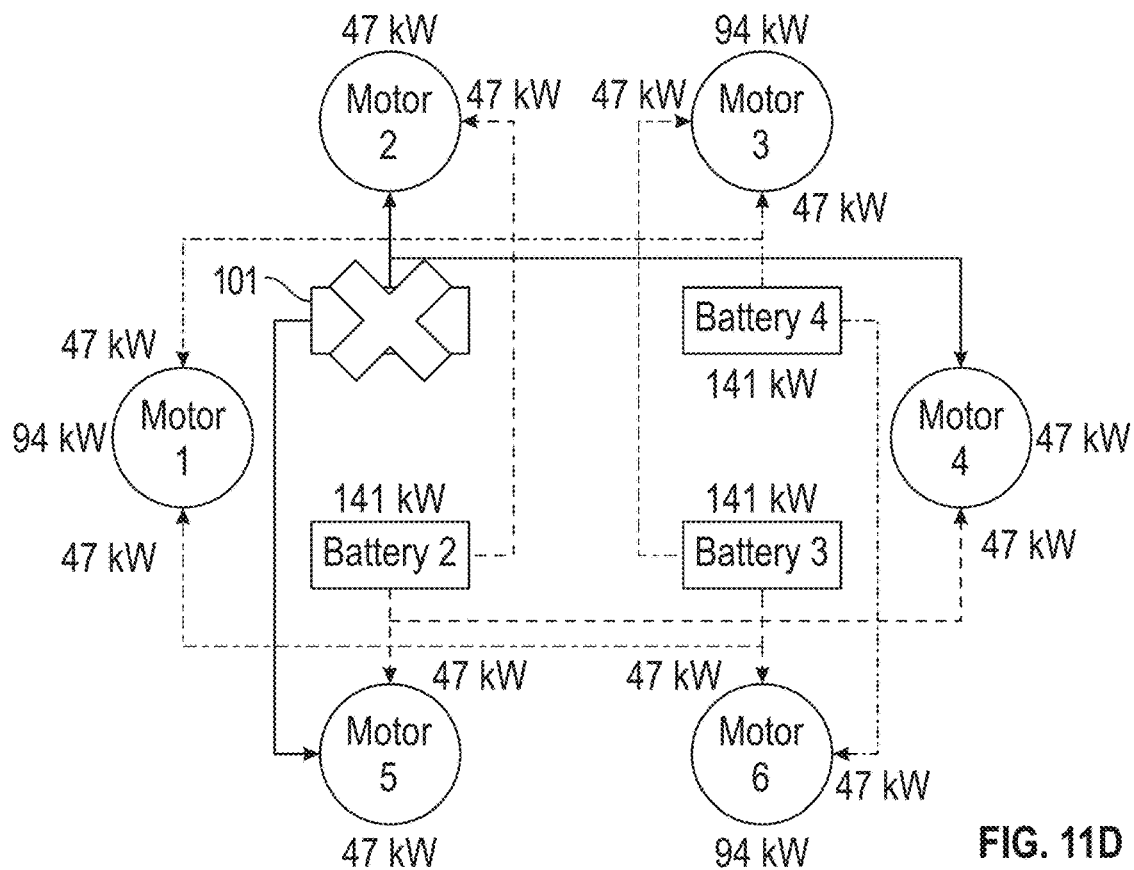
FIG. 11D is a layout of a flight power system with a doublet architecture with a battery failure according to some embodiments of the present invention.

FIG. 11D illustrates a battery failure condition, in this exemplary case the first battery 101. In this circumstance, each remaining battery provides the same power output level, although the different motors run at different power levels in order to balance the thrust generated on each side of the aircraft longitudinal centerline.

FIG. 12 illustrates a six battery six motor hexagram architecture according to some embodiments of the present invention. In the hexagram architecture illustrated in FIG. 12, each of the six batteries powers two motors, as with the ring architecture. And each motor is powered by two batteries. However, the first battery provides power to the first and third motor, the second battery provides power to the second and fourth motor, and so on. The hexagram architecture creates two separate rings encompassing the first, third, and sixth motors, and the second, fourth, and fifth motors. By linking a battery that powers the furthest outboard to a motor on the other side of the centerline of the aircraft, a battery failure then has its effect more spread out across the aircraft, reducing the amount of attitude offset due to the battery failure. In the case of a motor failure at the first motor, for example, there may still be an instantaneous reduction in power to the fourth motor to compensate for the failure. But the compensation regime for power sharing in a hexagonal architecture using the remaining motors will allow for lower inverter loads in an inverter optimized system as compared to the ring architecture. Also, the compensation regime for power sharing in a hexagonal architecture using the remaining motors will allow for lower battery loads in a battery optimized system as compared to the ring architecture. FIG. 16 illustrates the maximum loads in the inverters, batteries, and motors for inverter-optimized, battery-optimized, and motor-optimized solutions for the various motor-battery architectures described herein during a battery failure. The hexagram architecture is indicated with a symbol, as opposed to a name like the other architectures, in FIG. 16.

FIG. 13 and FIG. 14 illustrate six motor four battery systems according to some embodiments of the present invention. FIG. 13 illustrates a star architecture using four batteries to power six motors. Each battery is coupled to three motors. FIG. 14 illustrates a mesh architecture with four batteries and six motors.

However, the power architecture can be integrated into and/or implemented in conjunction with an aircraft including any suitable number and/or arrangement of EPUs, motors, propulsion assemblies. Likewise, the aircraft can include any suitable number and/or arrangement of batteries (packs, cells, modules, etc.).

Figure 15A:
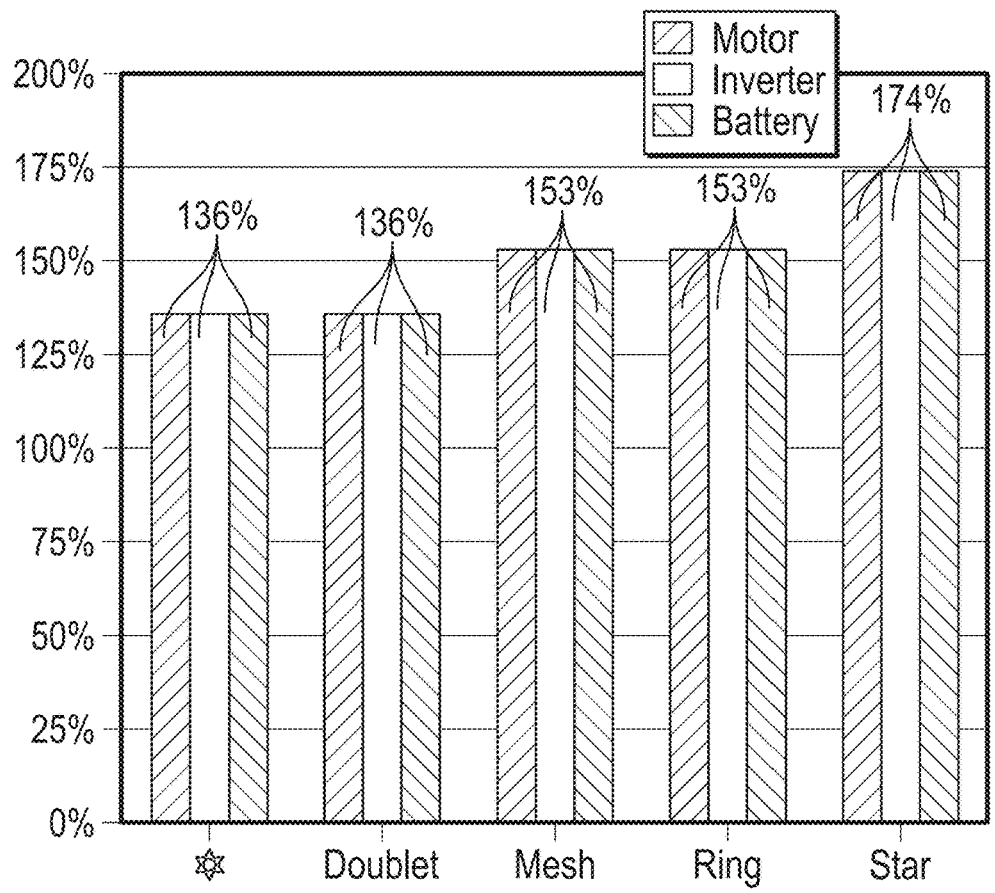
FIG. 15A to FIG. 15C presents information regarding battery failure operations according to some embodiments of the present invention.
Figure 15B:
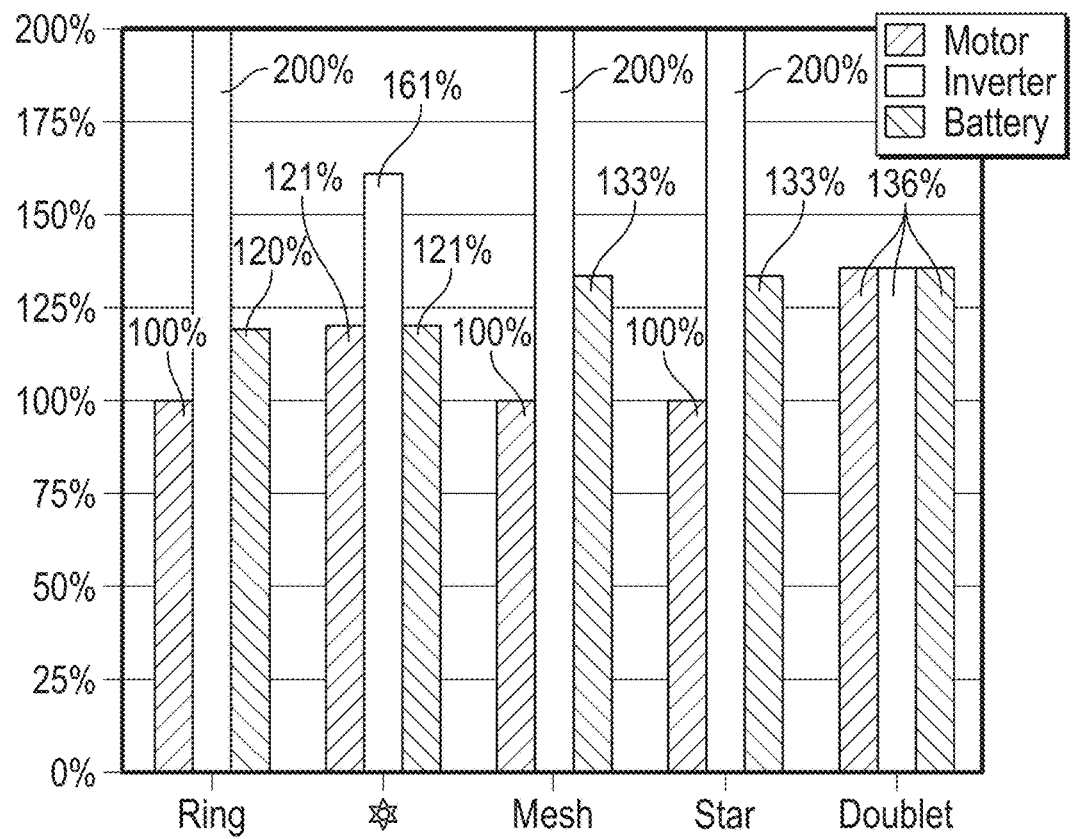
Figure 15C:
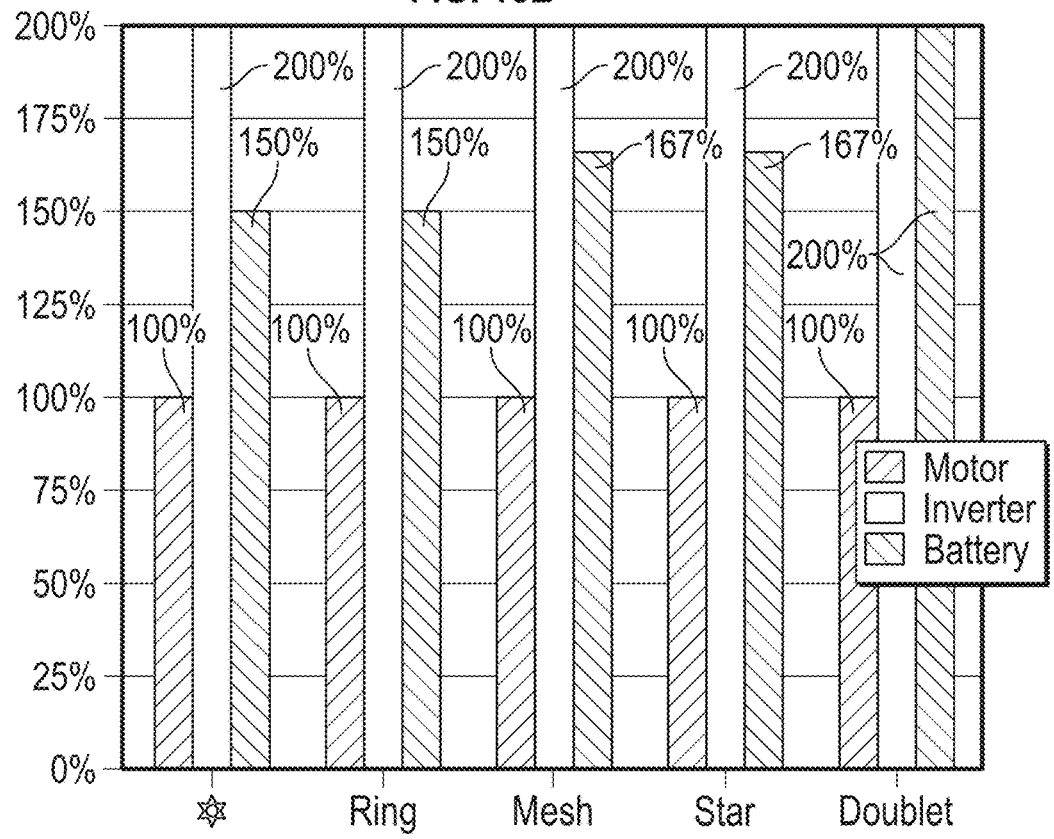
Figure 17:
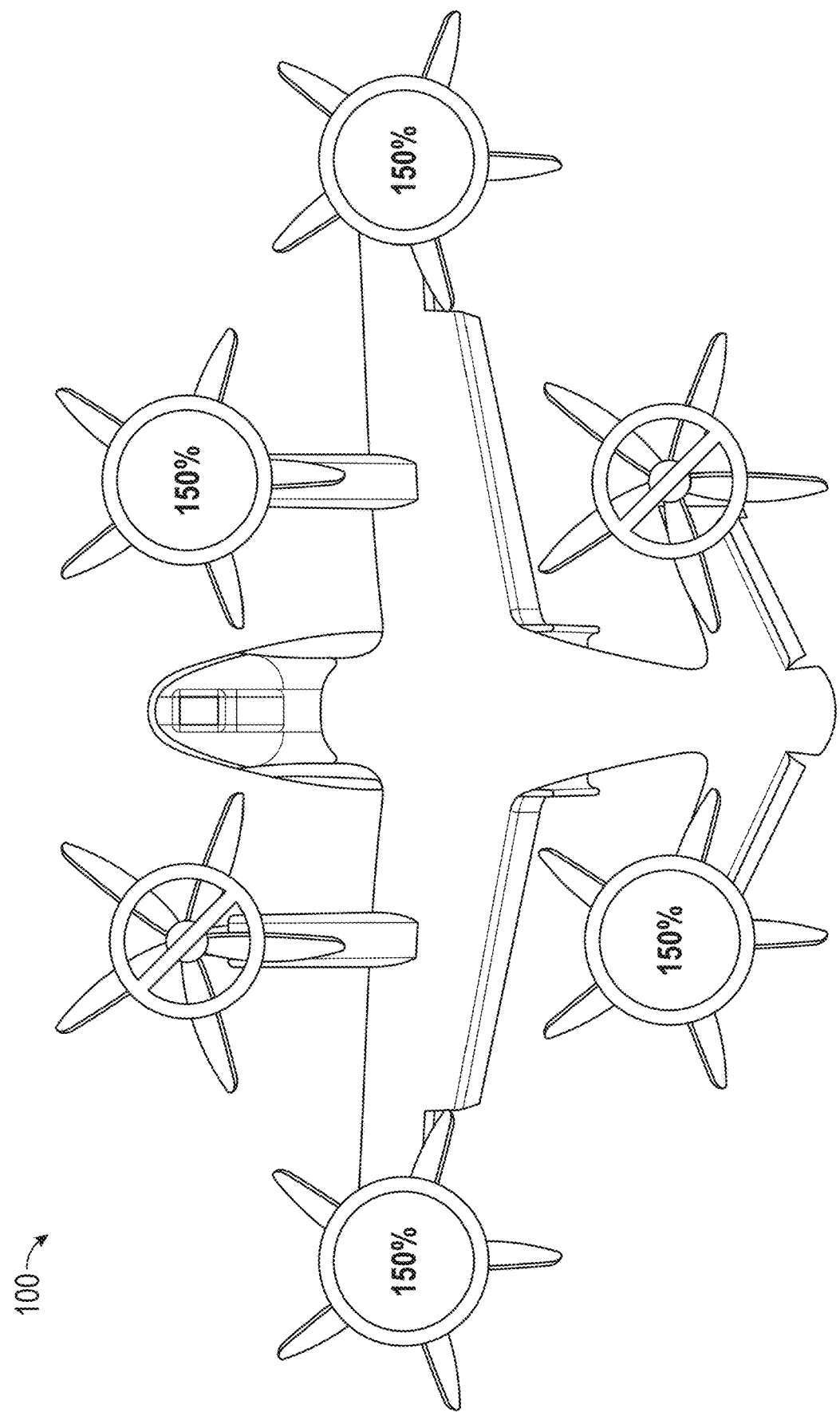
FIG. 17 is a diagrammatic representation of a variant of a power distribution in a multiple failure scenario.

FIG. 15A, FIG. 15B, and FIG. 15C illustrate the maximum loads in the inverters, batteries, and motors, respectively, for inverter-optimized, battery-optimized, and motor-optimized solutions for the various motor-battery architectures described herein during a motor failure. The hexagram architecture is indicated with a symbol, as opposed to a name like the other architectures. Accordingly, FIG. 17 illustrates an example thrust distribution in a two-motor inoperable scenario.

4. Flight Actuators

Flight actuators and/or landing gear can include redundancies which functions to preserve control authority in the event of a failure (e.g., mechanical, electrical, thermal, communication, etc.). Flight actuator and/or landing gear redundancy can include: duplicative redundancy (e.g., multiple instances of a control surface and/or actuator on the same side of a sagittal midplane of the aircraft), multiplicative communication channels (e.g., to distinct switch sets, an example is shown in FIG. 18), redundant power inputs (e.g., where the flight actuator includes multiple sets of windings configured to separately and/or cooperatively drive actuation), redundant positional feedback/sensing, and/or any other suitable redundancies. Redundant pairs/sets flight actuators are preferably distributed symmetrically about the aircraft, but can alternatively be distributed asymmetrically and/or otherwise suitably distributed. There is preferably at least one set of redundant control surfaces and/or flight actuators (driving said control surfaces) on each side of the sagittal midplane of the aircraft, and more preferably at least one set of redundant flight actuators on each side (left/right) of the main wing and the rear stabilizer. However, redundant sets of flight actuators can be otherwise suitably distributed.

Figure 19:
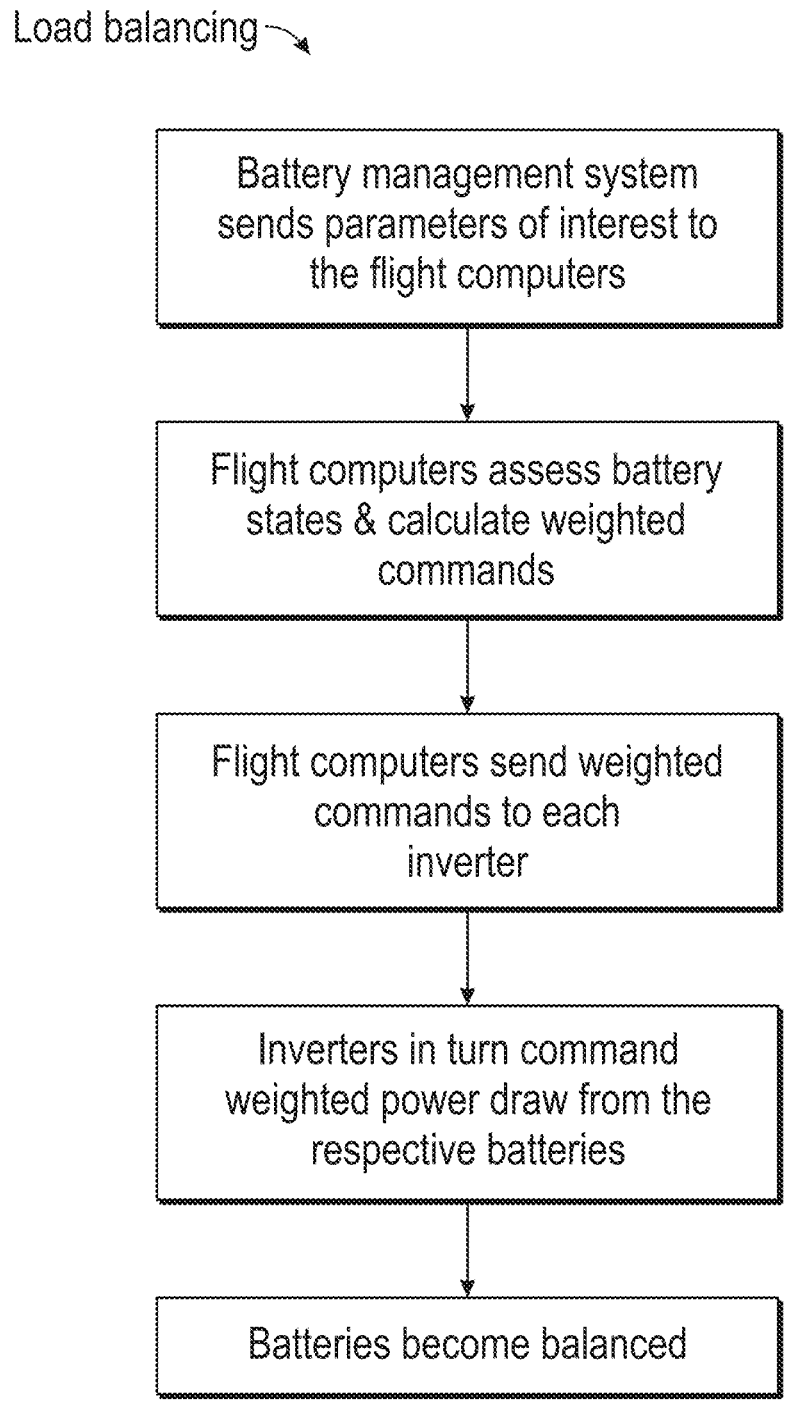
FIG. 19 is a diagrammatic representation of battery balancing for a variant of the power system.
Figure 21:
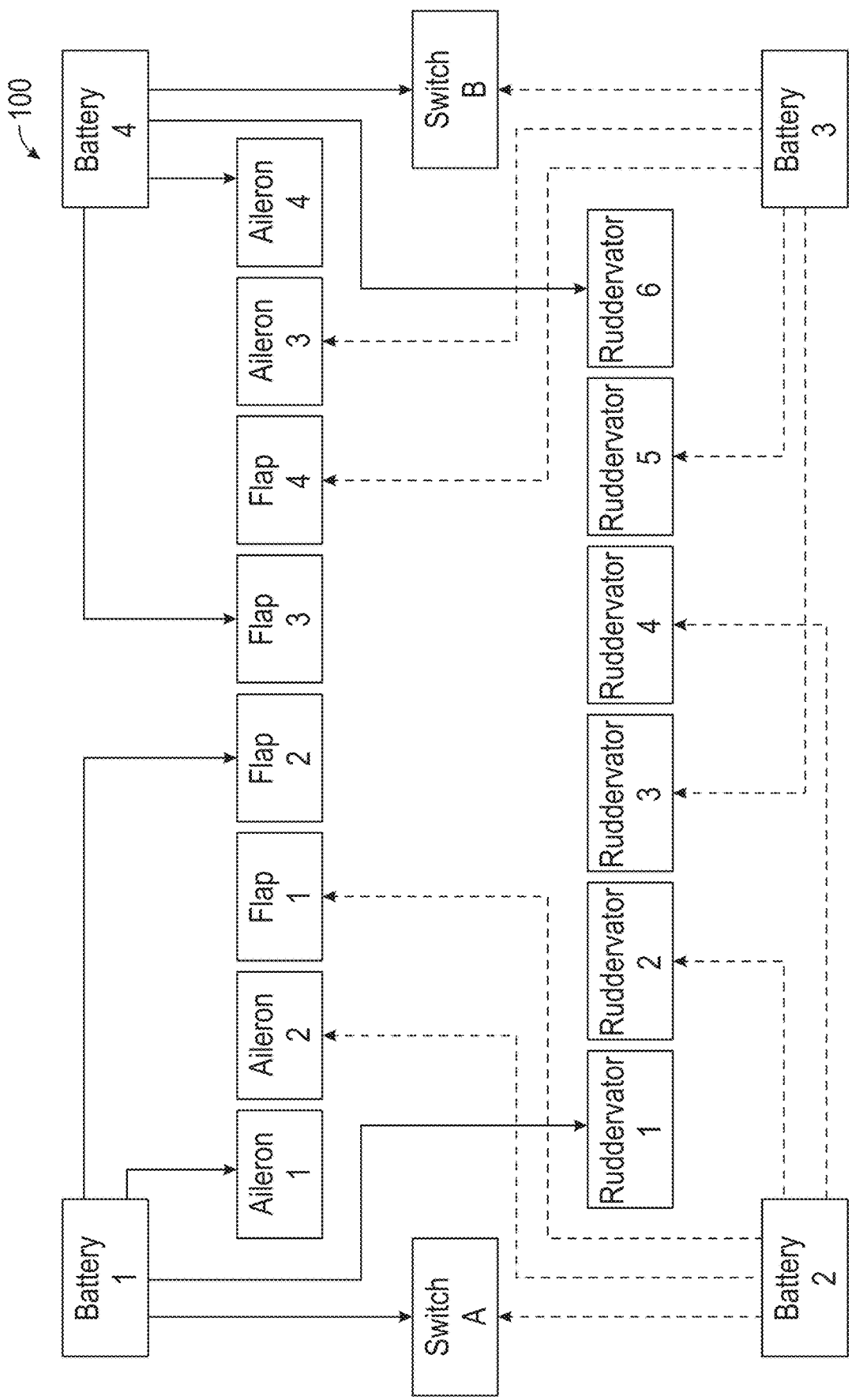
FIG. 21 is a schematic representation of a variant of a power system architecture.
Figure 24A:
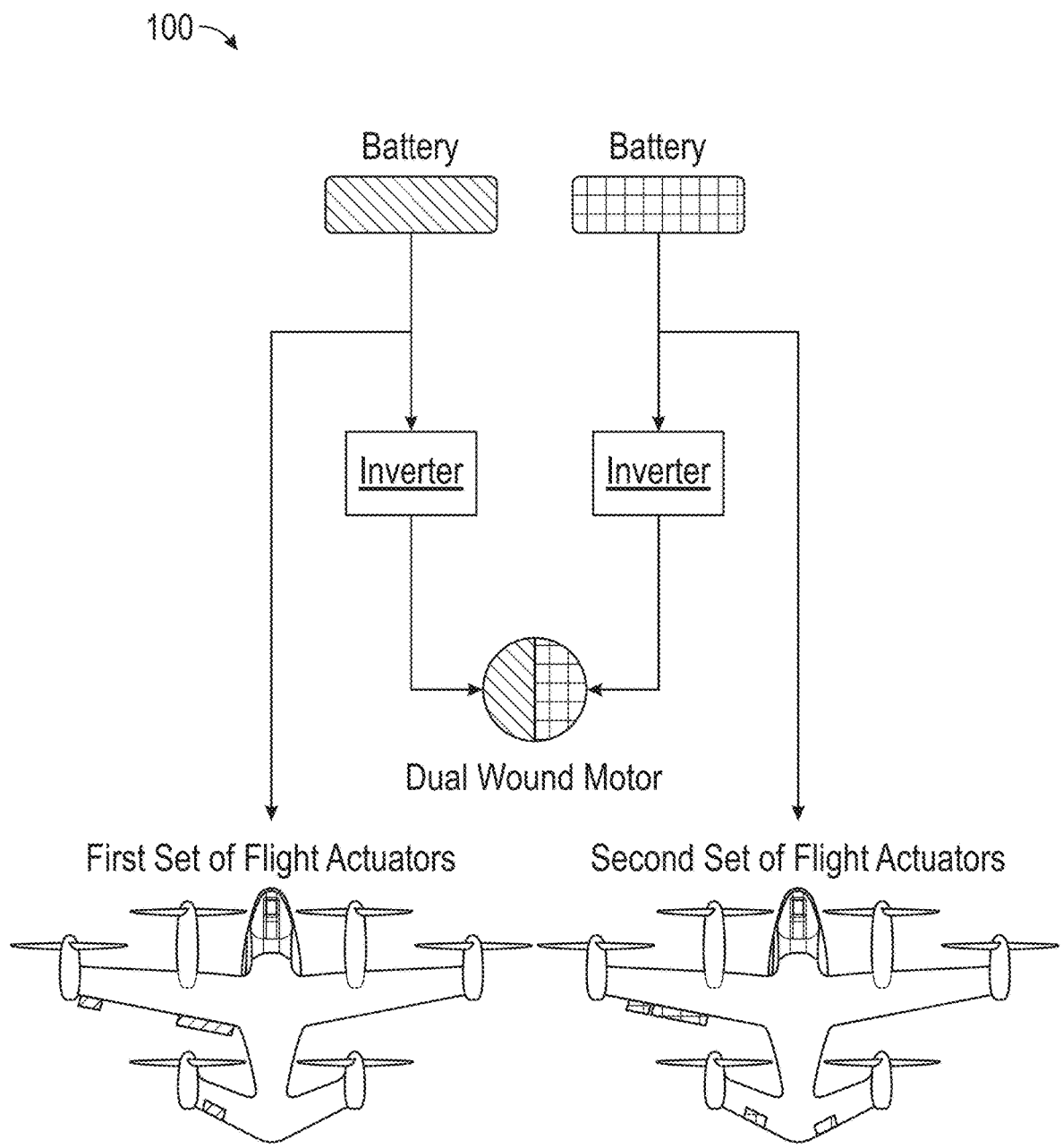
FIG. 24A to FIG. 24D are diagrammatic representations of a first, second, third, and fourth example of operating conditions of a variant of the power system architecture, respectively.
Figure 24B:
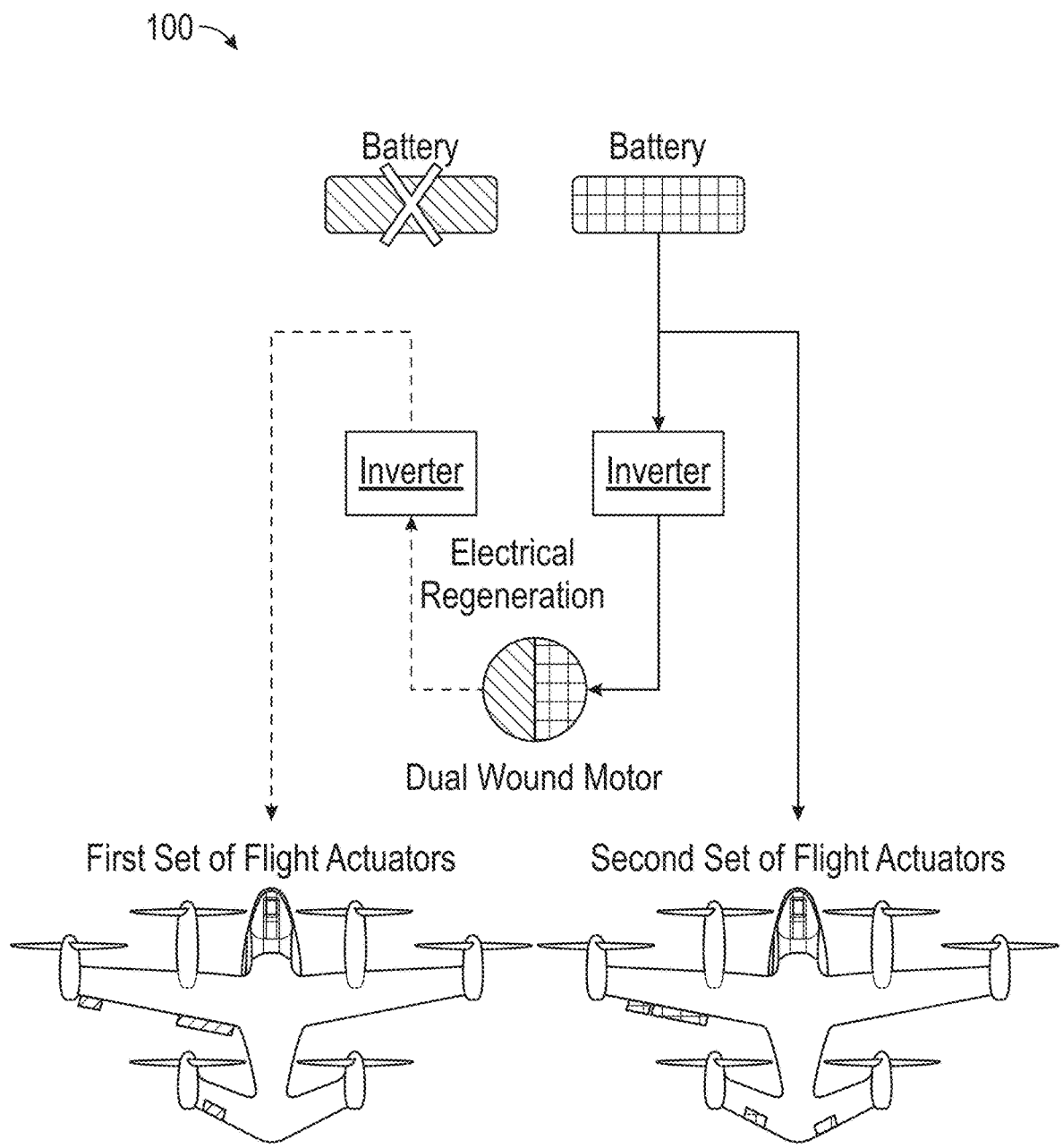
Figure 24C:
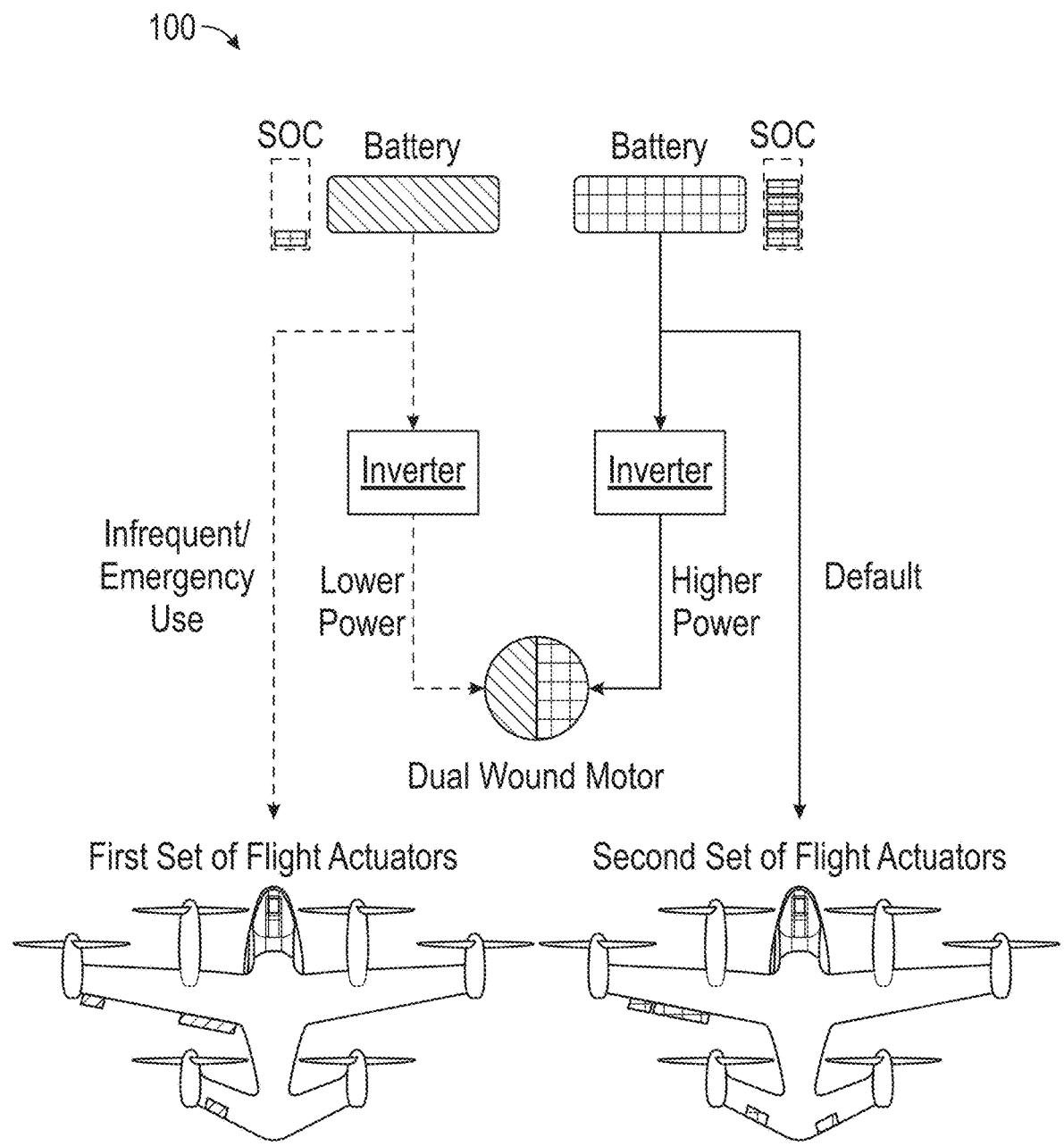
Figure 24D:
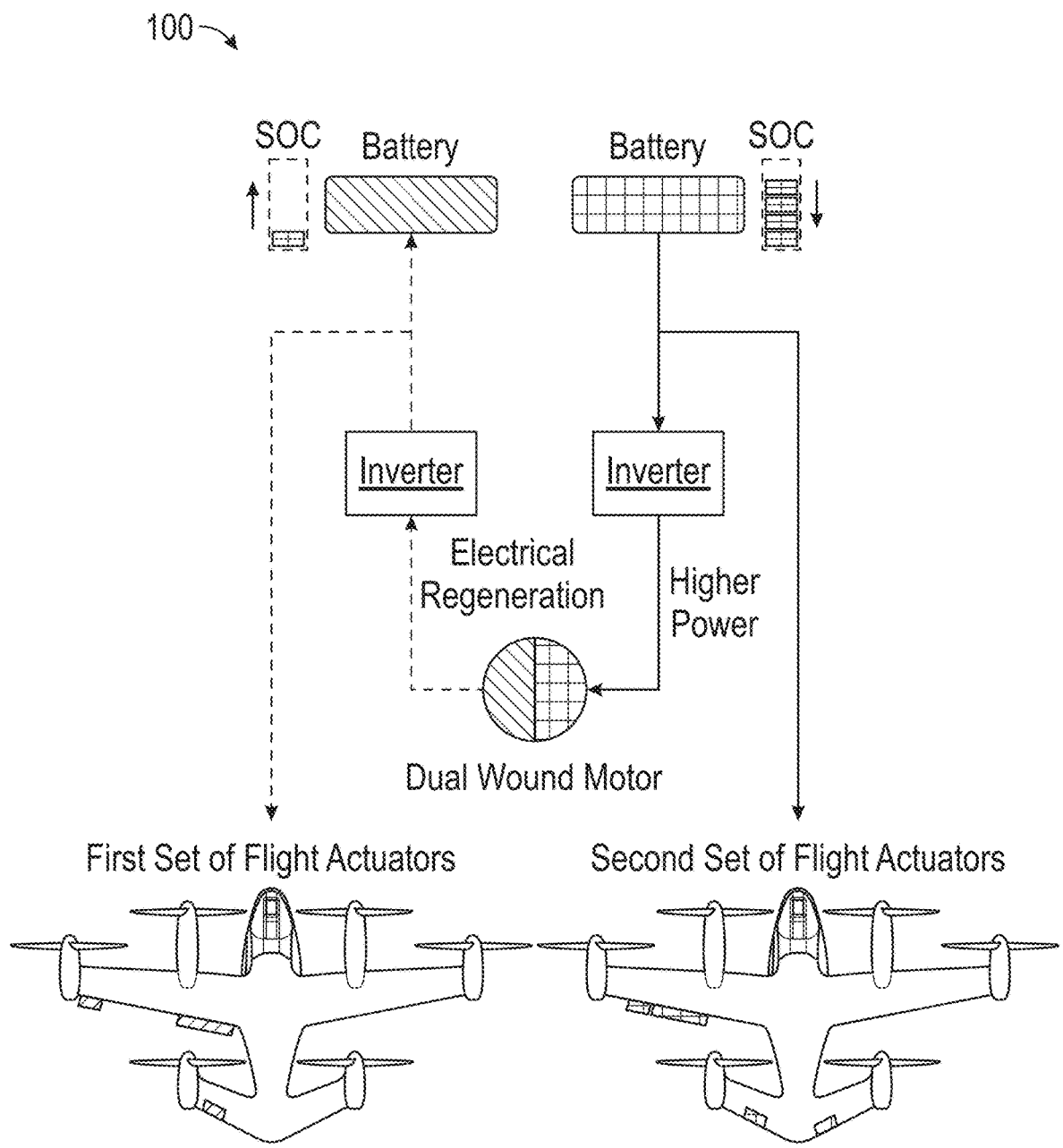

Preferably, each flight actuator can be supplied with power from a single battery (e.g., by a single power connection; an example is shown in FIG. 21; etc.), but can additionally or alternatively be powered by a plurality of batteries (e.g., via a single power connection; indirectly; by multiple connections; by individual connections; etc.) and/or otherwise suitably powered. In such cases, duplicative/redundant flight actuators can separately and/or cooperatively drive actuation of their respective control surfaces in order to affect a commanded aircraft control. In an example, a specific aircraft maneuver can be achieved by fully deploying a first control surface, but can alternatively be achieved by fully deploying a second (redundant) control surface and/or by partially deploying the first and the second control surfaces (e.g., cooperatively influencing aircraft forces/moments). More preferably, flight actuators associated with duplicative control surfaces are powered by a pair of batteries connected to respective sets of windings of one or more dual-wound motors of the aircraft, an example of which is shown in FIG. 24A. In such variants, battery pack failure and/or full charge depletion of one battery of a pair can be accommodated by electrically regenerating power using one set of windings of a dual wound motor (electrically connected to both batteries of the doublet pair), which can be used to power the flight actuators coupled to the failed battery (an example is shown in FIG. 24B) and/or charge the depleted battery (an example is shown in FIG. 24D). Likewise, paired batteries (connected to the respective sets of windings of one or more dual wound motors) can be load balanced to accommodate differences in state of charge (SOC), an example of which is shown in FIG. 19. In such variants, flight computers can determine a weighted thrust distribution (e.g., across all the motors, an example of which is shown in FIG. 17) and/or a weighted power distribution (e.g., for each winding of a dual wound motor) which achieves a desired power output, and communicate this power to the inverters, which draw the appropriate proportion of power from the respective batteries (e.g., different current through each set of windings of a dual-wound motor, an example is shown in FIG. 24C). In such variants, the flight actuators can additionally or alternatively preferentially draw power from the paired battery with a higher state of charge and/or the flight actuators connected to the higher power battery can be considered the "default" actuators, with the remaining actuators reserved for infrequent and/or emergency use, such as in the case of mechanical failure of a default flight actuator or when approaching the bounds of a flight control envelope (e.g., aggressive banking approaching a minimum turning radius, etc.). Load balancing between "unpaired" motors can be achieved by commanding a thrust distribution which de-weights the motors (and/or motor windings therein) associated with batteries having a lower net state of charge (SOC), thereby resulting in different depletion rates among the batteries.

Flight actuators can be subdivided into sets/pairs if they are redundant (e.g., can interchangeably/cooperatively affect the same generic aircraft control authority) and are separately powered by paired batteries. Flight actuator pairs are preferably located on the same side of the sagittal midplane of the aircraft and/or adjacent to one another (e.g., along a rear portion of the main wing, along a rear portion of the rear stabilizer, etc.), but can be otherwise suitably arranged/distributed. However, flight actuators can alternatively be construed to define any other suitable redundant and/or non-redundant sets/groups.

However, flight actuators can be otherwise suitably powered and/or operated in conjunction with various load balancing schemes.

5. Examples

Figure 22:
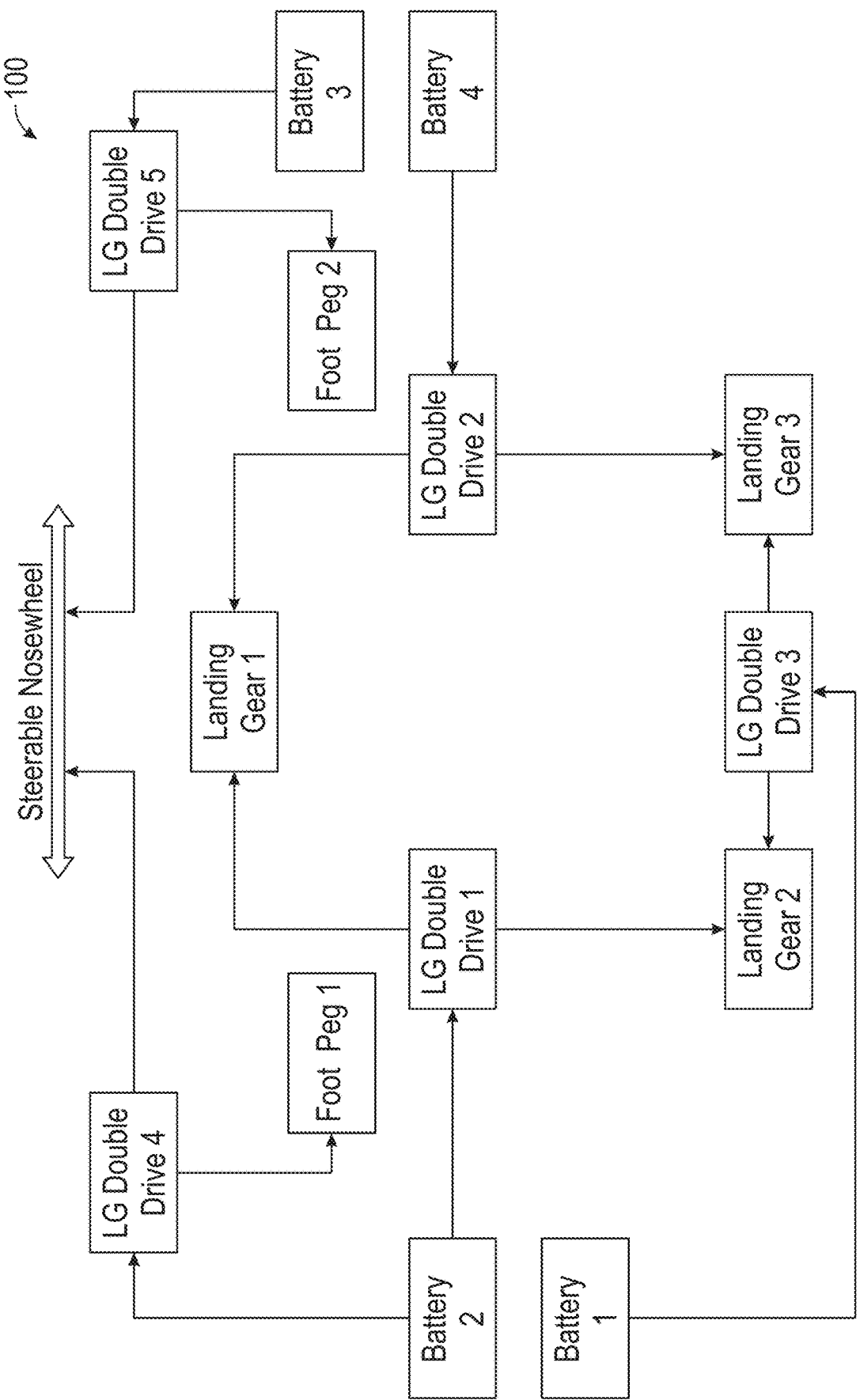
FIG. 22 is a schematic representation of a variant of a power system architecture.

Redundant flight actuators (and/or control surfaces driven thereby) and/or landing gear can be associated with (e.g., powered by) paired batteries and/or unpaired batteries. In a first example, the aircraft can include two wing flaps on each side of the sagittal midplane of the aircraft (e.g., 4 wing flaps: 2 left and 2 right). The two left wing flaps (mounted to the main wing) are preferably associated with (e.g., driven by actuators powered by) the first and second batteries of a first battery pair, respectively. The two right wing flaps are preferably associated with (e.g., powered by) the first and second batteries of a second battery pair (e.g., where the intersection of the first and second battery pairs is null), respectively. However, the first example can likewise hold for ailerons in place of flaps, and/or any other suitable control surfaces on the main wing or rear stabilizer. In a second example, the aircraft can include a three ruddervators (e.g., mounted to the rear stabilizer 204) on each side of the sagittal midplane of the aircraft (e.g., 6 ruddervators: 3 left and 3 right). The three left ruddervators are preferably associated with the first battery of a first battery pair, the second battery of a first battery pair, and the first battery of a second battery pair (e.g., unpaired with either the first or second batteries of the first battery pair), respectively. However, the second example can likewise hold for elevators, rudders, ailerons, and/or any other suitable control surfaces in place of ruddervators (e.g., on either the main wing or rear stabilizer). In a third example, landing gear actuators can be dual would and powered by paired batteries. In a fourth example, landing gear actuators can be dual wound and redundantly powered by unpaired batteries. In a fifth example, each of a plurality of dual wound landing gear actuators (e.g., 4) is powered by a different combination of batteries (an example is shown in FIG. 22). In a sixth example, the landing gear on the aircraft is fixed (e.g., in a deployed configuration). However, in variants, any flight actuators (and/or control surfaces driven thereby) and/or landing gear on the aircraft can be powered as in any combination and/or permutation of a set of the aforementioned examples. However, flight actuators and/or landing gear can include any other suitable redundancies.

In one or more embodiments, an electric aircraft comprising: a battery pair comprising a first and second battery; a first propulsion assembly comprising: a dual-wound electric motor comprising a first and second set of windings connected to the first and second batteries, respectively; and a propeller coupled to the dual-wound electric motor; a pair of control surfaces arranged on a first side of the mid-sagittal plane of the aircraft, the pair comprising a first and a second control surface; and a first and a second flight actuator electrically connected to the first and second batteries, respectively, wherein the first and second flight actuators are mechanically connected to the first and second control surfaces, respectively.

In one or more embodiments, first flight actuator is not redundantly powered by the second battery.

In one or more embodiments, the aircraft is configured to equilibrate a state of charge (SoC) of the first and second batteries based on a weighted power distribution of the first and second sets of windings.

In one or more embodiments, the aircraft further comprising a second and third propulsion assembly, each comprising a respective dual-wound electric motor and a respective propeller, the first and second batteries connected to a respective set of windings of the dual-wound electric motor of each of the second and third propulsion assemblies.

In one or more embodiments, the electric aircraft further comprising: a first motor inverter electrically coupled to the first set of windings and the first control surface; and a second motor inverter electrically coupled to the second set of windings, wherein the second battery is selectively connected to the first flight actuator in a propulsive mode of the second motor inverter and a regenerative mode of the first motor inverter.

In one or more embodiments, each battery of the battery pair is sized to be capable of independently powering the first propulsion assembly above a power threshold of the motor.

In one or more embodiments, the first battery is arranged on the first side of the midsagittal plane and the second battery is arranged on a second side of the midsagittal plane, opposite the first side.

In one or more embodiments, the first battery is arranged within an inboard portion of a wing of the aircraft, wherein the second battery is arranged within an outboard portion of the wing relative to the inboard portion.

In one or more embodiments, the electric aircraft further comprising: a second battery pair comprising a third and fourth battery; a second propulsion assembly comprising: a second dual-wound electric motor comprising a third and fourth set of windings connected to the third and fourth batteries, respectively; and a propeller coupled to the dual-wound electric motor; a second pair of control surfaces comprising a third and a fourth control surface symmetrically opposing the first and second control surfaces across the midsagittal plane, respectively; and a third and a fourth flight actuator electrically connected to the third and fourth batteries and mechanically connected to the third and fourth control surfaces, respectively.

In one or more embodiments, during a failed state of the third actuator: the third control surface is in a deployed position, and the first actuator is configured to actuate the first control surface to mirror the deployed position of the third control surface.

In one or more embodiments, the electric aircraft comprising a plurality of propulsion assemblies comprising the first and second propulsion assemblies, wherein the electric aircraft is further configured to accommodate a failure state of the first propulsion assembly by: reducing a first power provision to the second propulsion assembly; and increasing a respective power provision to each of a remainder of the plurality of propulsion assemblies.

In one or more embodiments, the electric aircraft further comprising: a fifth control surface adjacent to the first and second control surfaces and arranged on a first side of the mid-sagittal plane; and a fifth flight actuator electrically connected to the third battery and mechanically connected to the fifth control surface.

In one or more embodiments, the first, second, and third control surfaces are ruddervators.

In one or more embodiments, the third battery is larger than the fourth battery and the third battery symmetrically opposes the first battery across the midsagittal plane.

In one or more embodiments, the first and second control surfaces are duplicative.

In one or more embodiments, a method comprising: determining a flight command for an electric aircraft, the electric aircraft comprising: a battery pair comprising a first and a second battery; and a propulsion assembly comprising a propeller coupled to a dual-wound motor, the dual wound motor having a first and a second set of windings connected to the first and second batteries of the battery pair, respectively; determining a battery state for each battery of the battery pair; determining a weighted power distribution relative to the battery states of the first and second batteries, the weighted power distribution comprising a first weight associated with the first battery and a second weight associated with the second battery; based on the flight command and the first weight, supplying power from the first battery to the first set of windings of a propulsion assembly of the plurality; while supplying power to the first set of windings, regeneratively harvesting power from the propeller at the second set of windings based on the second weight; and supplying the regeneratively harvested power to a first flight actuator.

In one or more embodiments, the first and second batteries are arranged on opposing sides of a midsagittal plane of the electric aircraft and are asymmetric about the midsagittal plane.

In one or more embodiments, the electric aircraft further comprises: a second flight actuator, wherein the second and first flight actuators are electrically connected to the first and second batteries, respectively; and a duplicative pair of control surfaces arranged on a first side of the mid-sagittal plane of the aircraft, the pair comprising a first and a second control surface, wherein the first and second flight actuators are mechanically connected to the first and second control surfaces, respectively.

In one or more embodiments, the method further comprising cooperatively actuating the duplicative pair of actuators based on a flight command.

In one or more embodiments, a method comprising: determining a flight command for an electric aircraft, the electric aircraft comprising: a battery pair comprising a first and a second battery; and a plurality of propulsion assemblies, each comprising a propeller coupled to a dual-wound motor, the dual wound motor having a first and a second set of windings connected to the first and second batteries of the battery pair, respectively; a pair of control surfaces arranged on a first side of the mid-sagittal plane of the aircraft, the pair comprising a first and a second control surface; and a first and a second flight actuator electrically connected to the first and second batteries, respectively, the first and second flight actuators mechanically connected to the first and second control surfaces, respectively; determining a battery state for each battery of the battery pair; based on the battery state, load balancing the battery pair, comprising: determining a weighted power distribution relative to the battery states of the first and second batteries, the weighted power distribution comprising a first weight associated with the first battery and a second weight associated with the second battery; and based on the flight command, supplying power to a propulsion assembly of the plurality based on the first and second weights.

In one or more embodiments, supplying power to the propulsion assembly comprises: based on the first weight, supplying power from the first battery to the first set of windings of a propulsion assembly of the plurality; while supplying power to the first set of windings, regeneratively harvesting power from the propeller at the second set of windings based on the second weight; and supplying the regeneratively harvested power to the second battery.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. The embodiments described herein may include physical structures, as well as methods of use. Accordingly, departures from such details may be made without departing from the spirit or scope of the applicant's general invention.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

The invention claimed is:

1. A vertical takeoff and landing aircraft, comprising:
a fuselage;
a starboard wing secured to the fuselage;
a port wing secured to the fuselage;
a first tilt rotor coupled to the starboard wing, the first tilt rotor being operationally tiltable between a lift-generating position and a thrust-generating position;
a second tilt rotor coupled to the port wing, the second tilt rotor being operationally tiltable between a lift-generating position and a thrust generating position;
a first battery;
a second battery;
a pair of control surfaces arranged on a first side of the mid-sagittal plane of the aircraft, the pair comprising a first and a second control surface; and
a first flight actuator electrically connected to the first battery and a second flight actuator electrically connected to the second battery, wherein the first and second flight actuators are mechanically connected to the first and second control surfaces respectively.

2. The vertical takeoff and landing aircraft of claim 1, wherein the first flight actuator is not redundantly powered by the second battery.

3. The vertical takeoff and landing aircraft of claim 1, wherein the first tilt rotor and the second tilt rotor each comprise a respective dual-wound electric motor and a respective propeller, the first and second batteries connected to different sets of windings in each of the first tilt rotor and the second tilt rotor.

4. The vertical takeoff and landing aircraft of claim 3, wherein the first battery is arranged on the first side of the midsagittal plane and the second battery is arranged on a second side of the midsagittal plane, opposite the first side.

5. The vertical takeoff and landing aircraft of claim 3, wherein the first battery is arranged within an inboard portion of a wing of the aircraft, wherein the second battery is arranged within an outboard portion of the wing relative to the inboard portion.

6. The vertical takeoff and landing aircraft of claim 1, wherein the first tilt rotor and the second tilt rotor each include a dual-wound electric motor comprising a first set of windings and a second set of windings, the aircraft further comprising:
a first motor inverter electrically coupled to the first set of windings of each dual-wound electric motor and the first control surface; and
a second motor inverter electrically coupled to the second set of windings of each dual- wound electric motor,
wherein the second battery is selectively connected to the first flight actuator in a propulsive mode of the second motor inverter and a regenerative mode of the first motor inverter.

7. The vertical takeoff and landing aircraft of claim 1, wherein the first battery is arranged on the first side of the midsagittal plane and the second battery is arranged on a second side of the midsagittal plane, opposite the first side.

8. The vertical takeoff and landing aircraft of claim 1, wherein the first battery is arranged within an inboard portion of a wing of the aircraft, wherein the second battery is arranged within an outboard portion of the wing relative to the inboard portion.

9. The vertical takeoff and landing aircraft of claim 1, further comprising:
a third battery;
a fourth battery;
a second pair of control surfaces comprising a third and a fourth control surface symmetrically opposing the first and second control surfaces across the midsagittal plane, respectively; and
a third and a fourth flight actuator electrically connected to the third and fourth batteries and mechanically connected to the third and fourth control surfaces, respectively.

10. The vertical takeoff and landing aircraft of claim 9, wherein during a failed state of the third actuator:
the third control surface is in a deployed position, and
the first actuator is configured to actuate the first control surface to mirror the deployed position of the third control surface.

11. The vertical takeoff and landing aircraft of claim 10, further comprising:
a fifth control surface adjacent to the first and second control surfaces and arranged on a first side of the mid-sagittal plane; and
a fifth flight actuator electrically connected to the third battery and mechanically connected to the fifth control surface.

12. The vertical takeoff and landing aircraft of claim 11, wherein the first, second, and third control surfaces are ruddervators.

13. The vertical takeoff and landing aircraft of claim 11, wherein the third battery is larger than the fourth battery, wherein the third battery symmetrically opposes the first battery across the midsagittal plane.

14. The vertical takeoff and landing aircraft of claim 1, wherein the first and second control surfaces are duplicative.

15. The vertical takeoff and landing aircraft of claim 2, further comprising:
a third battery;
a fourth battery;

a second pair of control surfaces comprising a third and a fourth control surface symmetrically opposing the first and second control surfaces across the midsagittal plane, respectively; and a third and a fourth flight actuator electrically connected to the third and fourth batteries and mechanically connected to the third and fourth control surfaces, respectively.

16. The vertical takeoff and landing aircraft of claim 15, wherein during a failed state of the third actuator:

the third control surface is in a deployed position, and the first actuator is configured to actuate the first control surface to mirror the deployed position of the third control surface.

17. The vertical takeoff and landing aircraft of claim 16, further comprising:

a fifth control surface adjacent to the first and second control surfaces and arranged on a first side of the mid-sagittal plane; and a fifth flight actuator electrically connected to the third battery and mechanically connected to the fifth control surface.

18. The vertical takeoff and landing aircraft of claim 3, further comprising:

a third battery;

a fourth battery;

a second pair of control surfaces comprising a third and a fourth control surface symmetrically opposing the first and second control surfaces across the midsagittal plane, respectively; and a third and a fourth flight actuator electrically connected to the third and fourth batteries and mechanically connected to the third and fourth control surfaces, respectively.

19. The vertical takeoff and landing aircraft of claim 18, wherein during a failed state of the third actuator:

the third control surface is in a deployed position, and the first actuator is configured to actuate the first control surface to mirror the deployed position of the third control surface.

20. The vertical takeoff and landing aircraft of claim 19, further comprising:

a fifth control surface adjacent to the first and second control surfaces and arranged on a first side of the mid-sagittal plane; and a fifth flight actuator electrically connected to the third battery and mechanically connected to the fifth control surface.

\* \* \* \* \*